(12) United States Patent
Park

(10) Patent No.: US 11,271,633 B2
(45) Date of Patent: Mar. 8, 2022

(54) COMMUNICATION METHOD AND DEVICE FOR ULTRA-HIGH-SPEED VEHICLE

(71) Applicant: ELECTRONICS AND TELECOMMUNICATIONS RESEARCH INSTITUTE, Daejeon (KR)

(72) Inventor: Soon Gi Park, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 2 days.

(21) Appl. No.: 16/637,736

(22) PCT Filed: Oct. 5, 2018

(86) PCT No.: PCT/KR2018/011777
§ 371 (c)(1),
(2) Date: Feb. 7, 2020

(87) PCT Pub. No.: WO2019/074242
PCT Pub. Date: Apr. 18, 2019

(65) Prior Publication Data
US 2020/0186233 A1    Jun. 11, 2020

(30) Foreign Application Priority Data

Oct. 12, 2017 (KR) .......... 10-2017-0132491
Jan. 18, 2018 (KR) .......... 10-2018-0006463
Sep. 27, 2018 (KR) .......... 10-2018-0114744

(51) Int. Cl.
*H04B 7/08* (2006.01)
*H01Q 1/32* (2006.01)
(Continued)

(52) U.S. Cl.
CPC ........ *H04B 7/0834* (2013.01); *B61L 15/0027* (2013.01); *H01Q 1/32* (2013.01);
(Continued)

(58) Field of Classification Search
CPC .......... H04W 16/26; H04W 16/32; H04W 36/0027; H04W 72/046; H04W 72/1263;
(Continued)

(56) References Cited

U.S. PATENT DOCUMENTS 8,805,383 B2    8/2014 Park
8,948,690 B2    2/2015 Duerksen
(Continued)

FOREIGN PATENT DOCUMENTS

KR    101584550 B1 * 4/2010
WO    WO-2011126313 A2 * 10/2011 .......... H04W 72/046

OTHER PUBLICATIONS

Experimental demonstrations of RoF technologies for 5G indoor DAS applications by Seung-Hyun Cho; Hwan Seok Chung; Joonyoung Kim; Minkyu Sung; Joon ki Lee; Jong Hyun Lee Published in: 2018 23rd Opto-Electronics and Communications Conference (OECC) Jun. 2019 (Year: 2019).*

(Continued)

*Primary Examiner* — William D Cumming
(74) *Attorney, Agent, or Firm* — Rabin & Berdo, P.C.

(57) ABSTRACT

A communication device for an ultra-high-speed vehicle comprises a processor for performing a radio resource control function for communication between a first mobile device and the communication device, and a plurality of distributed antennas (DAs) positioned in a path of the first mobile device and transmitting or receiving a signal according to a control of the processor. The communication device also comprises a memory for storing at least one command executed by the processor. The at least one command is executed to configure a first sliding window including n DAs corresponding to a first position of the first mobile device, among the plurality of DAs, and perform communication with the first mobile device located at the first position by (Continued)

using the n DAs. Therefore, the performance of a communication system can be improved.

12 Claims, 69 Drawing Sheets

(51) Int. Cl.
| | |
|---|---|
| H04W 84/00 | (2009.01) |
| H04W 16/32 | (2009.01) |
| H04W 4/02 | (2018.01) |
| H04B 17/318 | (2015.01) |
| B61L 15/00 | (2006.01) |

(52) U.S. Cl.
CPC .......... *H04B 17/318* (2015.01); *H04W 4/027* (2013.01); *H04W 16/32* (2013.01); *H04W 84/005* (2013.01)

(58) Field of Classification Search
CPC ............... H04W 12/084; H04W 76/15; H04W 36/0077; H04W 12/41; H04W 74/0033; H04W 72/044; H04W 12/044; H04W 74/0833
USPC ...................................... 455/7, 450; 370/329
See application file for complete search history.

(56) References Cited

U.S. PATENT DOCUMENTS

| | | | | |
|---|---|---|---|---|
| 9,125,112 | B2* | 9/2015 | Gao | H04W 36/0027 |
| 9,497,673 | B2* | 11/2016 | Blankenship | H04W 12/041 |
| 9,538,524 | B2* | 1/2017 | Han | H04W 72/044 |
| 9,894,537 | B2* | 2/2018 | Chow | H04B 10/25756 |
| 9,998,964 | B2* | 6/2018 | Blankenship | H04W 36/0077 |
| 9,998,973 | B2* | 6/2018 | Gao | H04W 36/22 |
| 10,057,916 | B2* | 8/2018 | Barabell | H04B 17/318 |
| 10,477,441 | B2* | 11/2019 | Blankenship | H04W 36/00835 |
| 10,477,612 | B2* | 11/2019 | Park | H04W 4/06 |
| 10,524,181 | B2* | 12/2019 | Kim | H04W 4/70 |
| 10,536,959 | B2* | 1/2020 | Barabell | H04W 72/046 |
| 10,554,343 | B2* | 2/2020 | Park | H04W 72/121 |
| 10,555,363 | B2* | 2/2020 | Park | H04W 4/06 |
| 2014/0051348 | A1* | 2/2014 | Chow | H04W 16/26 455/7 |
| 2015/0223216 | A1* | 8/2015 | Han | H04W 72/044 370/329 |
| 2015/0264582 | A1 | 9/2015 | Brighenti et al. | |
| 2015/0336594 | A1 | 11/2015 | Yoon et al. | |
| 2016/0037550 | A1* | 2/2016 | Barabell | H04W 72/046 455/450 |
| 2017/0090473 | A1 | 3/2017 | Cooper et al. | |
| 2017/0214437 | A1 | 7/2017 | Zasowski | |
| 2017/0238141 | A1 | 8/2017 | Lindoff et al. | |
| 2018/0041936 | A1* | 2/2018 | Kim | H04L 5/0053 |
| 2018/0184473 | A1* | 6/2018 | Park | H04L 41/0893 |
| 2018/0192466 | A1* | 7/2018 | Park | H04W 74/0833 |
| 2018/0234212 | A1* | 8/2018 | Park | H04L 1/1812 |
| 2018/0352561 | A1* | 12/2018 | Barabell | H04B 17/318 |
| 2019/0150214 | A1* | 5/2019 | Zhou | H04L 1/1621 370/329 |
| 2020/0092901 | A1* | 3/2020 | Barabell | H04W 72/1263 |
| 2020/0137656 | A1* | 4/2020 | Kim | H04W 72/048 |
| 2020/0186233 | A1* | 6/2020 | Park | B61L 15/0027 |

OTHER PUBLICATIONS

Characterization of an Interleaved F-DAS MIMO indoor propagation channel by Tarlazzi, L. • Faccin, P. • Vitucci, E.M. • Fuschini, F. • Degli-Esposti, V. Published in: 2010 Loughborough Antennas & Propagation Conference (pp. 505-508) Nov. 2010 (Year: 2010).*

M. Sung et al., "RoF-Based Radio Access Network for 5G Mobile Communication Systems in 28 GHz Millimeter-Wave," in Journal of Lightwave Technology, vol. 38, No. 2, pp. 409-420, Jan. 15, 15, 2020, doi: 10.1109/JLT.2019.2942636. (Year: 2020).*

Masson, E. et al., "Railway Applications Requiring Broadband Wireless Communications", Broadband Wireless Communications for Railway Application, Studies in Systems, Decision and Control 82, 2017, pp. 35-79, DOI 10.1007/978-3-319-47202-7_2.

Xu, Xiaodong, "Access Control and Handover Strategy for Multiple Access Points Cooperative Communication in Vehicle Environments", Intech Open, Feb. 13, 2013, ISBN 978-953-51-0992-1, pp. 97-115.

\* cited by examiner

FIG. 34

| synchronization packet type | unique ID | destination count | destination address | AT count | AT #1 |
|---|---|---|---|---|---| probe request packet #A
(communication node #A →
communication node #B)

| synchronization packet type | unique ID | AT count | AT #2 | AT #3 |
|---|---|---|---|---| probe response packet #A
(communication node #B →
communication node #A)

FIG. 35 probe request packet #B
(communication node #A →
communication node #B)

| synchronization packet type | unique ID | destination count | destination address | AT count | AT #1 | PDU count | PDU #1 size | PDU #2 size | PDU #1 | PDU #2 | probe response packet #B
(communication node #B →
communication node #A)

| synchronization packet type | unique ID | AT count | AT #2 | AT #3 |

FIG. 37 probe request packet #C
(communication node #A →
communication node #B)

| synchronization packet type | unique ID | destination count | destination address #1 | destination address #2 | AT count | AT #1 |
|---|---|---|---|---|---|---| probe request packet #D
(communication node #B →
communication node #C)

| synchronization packet type | unique ID | destination count | destination address #2 | AT count | AT #2 |
|---|---|---|---|---|---| probe response packet #C
(communication node #B →
communication node #A)

| synchronization packet type | unique ID | AT count | AT #2 | AT #3 | AT #4 | AT #5 |
|---|---|---|---|---|---|---| probe response packet #D
(communication node #C →
communication node #B)

| synchronization packet type | unique ID | AT count | AT #3 | AT #4 |
|---|---|---|---|---|

FIG. 39

| synchronization packet type | unique ID | destination count | destination address #1 | destination address #2 | destination address #3 | AT count | AT #1 |
|---|---|---|---|---|---|---|---| probe request packet #E
(communication node #A →
communication node #B)

| synchronization packet type | unique ID | destination count | destination address #2 | destination address #3 | AT count | AT #2 |
|---|---|---|---|---|---|---| probe request packet #F
(communication node #B →
communication node #C)

| synchronization packet type | unique ID | destination count | destination address #3 | AT count | AT #3 |
|---|---|---|---|---|---| probe request packet #G
(communication node #C →
communication node #D)

FIG. 40 probe response packet #E
(communication node #B →
communication node #A)

| synchronization packet type | unique ID | AT count | AT #2 | AT #3 | AT #4 | AT #5 | AT #6 | AT #7 | probe response packet #F
(communication node #C →
communication node #B)

| synchronization packet type | unique ID | AT count | AT #3 | AT #4 | AT #5 | AT #6 | probe response packet #G
(communication node #D →
communication node #C)

| synchronization packet type | unique ID | AT count | AT #4 | AT #5 |

FIG. 43

| synchronization packet type | AT | unique ID | predicted SFN/SF | SDU count | SDU#1 size | SDU#2 size | SDU#3 size | SDU #1 | SDU #2 | SDU #3 |

FIG. 46

| synchronization packet type | AT | unique ID | signal strength | received SFN/SF | SDU count | SDU #1 size | SDU #2 size | SDU #3 size | SDU #1 | SDU #2 | SDU #3 |

COMMUNICATION METHOD AND DEVICE FOR ULTRA-HIGH-SPEED VEHICLE

TECHNICAL FIELD

The present invention relates to a technique of communications for ultrahigh-speed vehicle, and more particularly, to a communication technique for supporting communications between an ultrahigh-speed vehicle and a ground network.

BACKGROUND ART

Communications between a base station and a vehicle moving at a high speed (e.g., a train moving at a speed of 350 km/h or less) may be performed based on a cellular communication scheme. Also, a communication network dedicated for vehicles may be installed in a form where base stations each of which has cell coverage of several kilometers are installed along a movement path of the vehicles. In this case, communications between the vehicle moving at a speed of up to 500 km/h and the base stations may support a transmission rate of several megabits per second (Mbps) to several tens of Mbps.

Also, communications will be supported for a long-term evolution-railway (LTE-R)-based or a 5G communication system for vehicles moving at speeds below 500 km/h. In addition, a communication system based on a leaky coaxial cable (LCX) may be used for a high-speed train or a magnetic levitation train. The LCX-based communication system may support communications for vehicles moving at a speed of about 600 km/h or less (e.g., magnetic levitation train). In the LCX-based communication system, a radiation cable may be segmented into units each having a predetermined length, and communications may be performed based on radio waves generated by leakage currents of the segmented cables. In this case, installation and maintenance costs may increase because a constant interval should be maintained between the cable and the receiving node, and precise alignment is required at the time of cable installation. Also, as the length of the cable becomes longer, the reception performance may decrease as a signal loss increases, a handover may occur between the segmented cables, and the performance may deteriorate at the point where the handover occurs.

When the above-described communication schemes are used, a data transmission rate at a boundary between cells (or, segmented cables) may deteriorate, and as the vehicle speed increases, the data transmission rate tends to decrease due to the Doppler effect. In this reason, at an ultrahigh speed (e.g., 1200 km/h), communications become almost impossible with the conventional communication schemes. That is, when communications are performed based on the cellular communication scheme, the communication quality may be deteriorated due to increase of the Doppler effect, and the handover procedure may be frequently performed, thereby degrading the communication performance. Also, the communication schemes described above have limitations in supporting communications for ultrahigh-speed vehicles (e.g., trains traveling at speeds greater than 1220 km/h). Therefore, new functions and designs are needed to overcome the above-described problems.

DISCLOSURE

Technical Problem

The present invention is directed to providing a method and an apparatus for providing a communication service to an ultrahigh-speed vehicle.

Technical Solution

A communication apparatus, according to a first embodiment of the present invention for achieving the above-described objective, may comprise a processor performing a radio resource control function for the communication between the communication apparatus and the first mobile apparatus, a plurality of distributed antennas (DAs) located along a movement path of the first mobile apparatus, which transmit and receive signals under control of the processor, and a memory storing at least one instruction executed by the processor. The at least one instruction may be configured to configure a first sliding window comprising n DAs corresponding to a first position of the first mobile apparatus among the plurality of DAs; perform communication with the first mobile apparatus located at the first position using the n DAs; reconfigure the first sliding window to include m DAs corresponding to a second position among the plurality of DAs, when the first mobile apparatus moves from the first position to the second position; and perform communication with the first mobile apparatus located at the second position using the m DAs, wherein one or more DAs among the n DAs are identical to one or more DAs among the m DAs, each of n and m is an integer equal to or greater than 2, and the first position and the second position belong to the movement path.

Here, synchronization among the n DAs or the m DAs belonging to the first sliding window may be maintained by the processor.

Here, when the communication with the first mobile apparatus located at the first position is performed, the n DAs may transmit and receive a same signal using a same radio resource.

Here, when the communication with the first mobile apparatus located at the second position is performed, the m DAs may transmit and receive a same signal using a same radio resource.

Here, a position of the first mobile apparatus may be estimated based on a signal received from the first mobile apparatus.

Here, a plurality of radio bearers (RBs) may be configured for the communication between the communication apparatus and the first mobile apparatus, and a cell-radio network temporary identifier (C-RNTI) for each of the RBs may be configured independently.

Here, the at least one instruction may be further configured to configure a second sliding window comprising k DAs corresponding to a third position of a second mobile apparatus moving along the movement path among the plurality of DAs; and perform communication with the second mobile apparatus located at the third position by using the k DAs, wherein k is an integer equal to or greater than 2, and the second position belongs to the movement path.

Here, the k DAs may not be overlapped with the n DAs or the m DAs.

Here, a dedicated cell formed by the second sliding window may be different from a dedicated cell formed by the first sliding window.

Here, the communication using the k DAs may be performed simultaneously with the communication using the n DAs or the communication using the m DAs.

A communication method performed by a mobile apparatus, according to a second embodiment of the present invention for achieving the above-described objective, may comprise: when the mobile apparatus is located at a first position in the movement path, performing communication with a communication apparatus including a plurality of distributed antennas (DAs) through a sliding window comprising n DAs corresponding to the first position among the plurality of DAs located along the movement path; and when the mobile apparatus moves from the first position to a second position in the movement path, performing communication with the communication apparatus through the sliding window comprising m DAs corresponding to the second position among the plurality of DAs located along the movement path, wherein one or more DAs among the n DAs are identical to one or more DAs among the m DAs, and each of n and m is an integer equal to or greater than 2.

Here, a dedicated cell formed by the sliding window configured for the mobile apparatus located at the first position may be identical to a dedicated cell formed by the sliding window configured for the mobile apparatus located at the second position.

Here, in the communication between the mobile apparatus located at the first position and the n DAs, a same signal may be received from the n DAs by using a same radio resource.

Here, in the communication between the mobile apparatus located at the second position and the m DAs, a same signal may be received from the m DAs by using a same radio resource.

Here, information used for estimating a position of the mobile apparatus may be transmitted from the mobile apparatus to the communication apparatus, and the first position and the second position may be estimated based on the information by the communication apparatus.

Advantageous Effects

According to the present invention, a sliding window comprising a plurality of antennas can be moved according to a speed of an ultrahigh-speed vehicle (e.g., a train moving at a speed of 1220 km/h or more), thereby providing communication services to the ultrahigh-speed vehicle. Also, since the sliding window is moved according to the speed of the ultrahigh-speed vehicle, the communication quality may not be deteriorated, and the handover procedures can be minimized. Therefore, the performance of the communication system can be improved.

DESCRIPTION OF DRAWINGS

FIG. 34 is a block diagram illustrating a first embodiment of probe request/response packets used in a delay probe procedure.

FIG. 35 is a block diagram illustrating a second embodiment of probe request/response packets used in a delay probe procedure.

FIG. 37 is a block diagram illustrating a third embodiment of probe request/response packets used in a delay probe procedure.

FIG. 39 is a block diagram illustrating a fourth embodiment of a probe request packet used in a delay probe procedure.

FIG. 40 is a block diagram illustrating a fourth embodiment of a probe response packet used in a delay probe procedure.

FIG. 43 is a block diagram illustrating a first embodiment of a downlink packet.

FIG. 46 is a block diagram illustrating a first embodiment of an uplink packet.

MODES OF THE INVENTION

Figure 1:
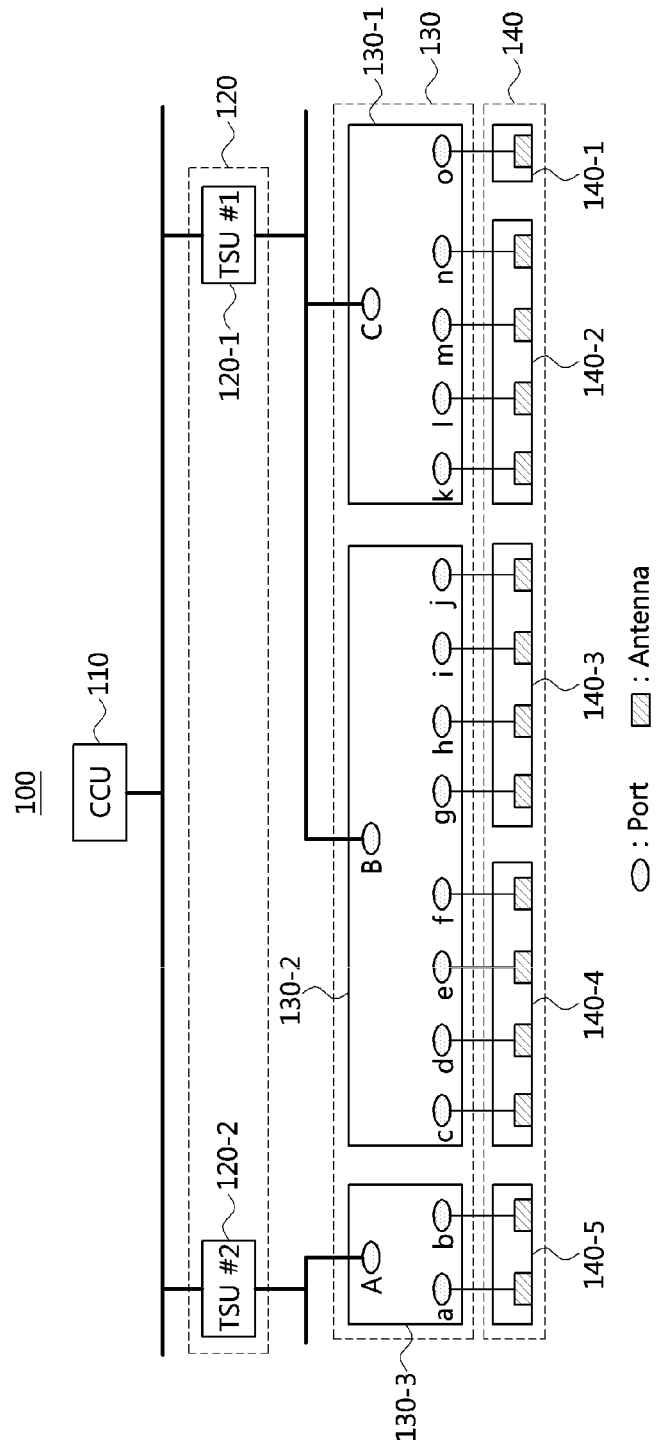
FIG. 1 is a block diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated. In the following embodiments, even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a ground communication apparatus is described, a corresponding vehicle may perform an operation corresponding to the operation of the ground communication apparatus. Conversely, when an operation of the vehicle is described, the corresponding ground communication apparatus may perform an operation corresponding to the operation of the vehicle.

FIG. 1 is a block diagram illustrating a first embodiment of a communication system.

Referring to FIG. 1, a communication system 100 may comprise a central communication unit (CCU) 110, a tube side unit (TSU) 120, a virtual active antenna controller (VA2C) 130, a line active antenna module (LA2M) 140, and the like. Here, the communication system 100 may be referred to as a 'ground network (GN)', a 'ground communication apparatus', or the like. The TSU 120 may comprise a plurality of TSUs 120-1 and 120-2, the VA2C 130 may comprise a plurality of VA2Cs 130-1, 130-2, and 130-3, and the LA2M 140 may comprise a plurality of LA2Ms 140-1, 140-2, 140-3, 140-4, and 140-5.

The CCU 110 may be connected to the TSU 120 that is a lower entity and may control and manage the TSU 120, the VA2C 130, and the LA2M 140. The CCU 110 may support at least one of a packet data convergence protocol (PDCP) function, a radio link control (RLC) function, and a radio resource control (RRC) function. Also, the CCU 110 may include a processor (e.g., a central processing unit (CPU)), a memory that stores instructions executed by the processor, and the like, and the processor of the CCU 110 may perform predefined operations.

The TSU 120 may be connected to the CCU 110 which is an upper entity and may be connected to at least one of the VA2C 130-1, 130-2, and 130-3 which are lower entities, and may manage and control at least one of the VA2C 130-1, 130-2, and 130-3. For example, the TSU 120-1 may be connected to the VA2C 130-1 and the VA2C 130-2, and the like. In this case, the TSU 120-1 may be connected to the VA2C 130-1 through a port #C and the VA2C 130-2 through a port #B. The TSU 120-2 may be connected to the VA2C 130-3 and the like. In this case, the TSU 120-2 may be connected to the VA2C 130-3 through a port #A. The TSU 120 may support at least one of a PDCP function, an RLC function, a medium access control (MAC) function, and a physical (PHY) function. Also, the TSU 120 may include a processor (e.g., CPU), a memory that stores instructions executed by the processor, and the like, and the processor of the TSU 120 may perform predefined operations.

The VA2Cs 130 may include a plurality of ports and may be connected to the TSU 120 which is an upper entity through upper ports (e.g., the ports #A to #C), and may be connected to the LA2M 140 which is a lower entity through ports #a to #o. One upper port (e.g., one or the ports #A to #C) in the VA2C 130 may be mapped to at least one lower port (e.g., ports #a to #o). The VA2C 130-1 may be connected to the LA2M 140-1 and the LA2M 140-2. In this case, each of the ports #k to #o may be mapped to each of antennas belonging to the LA2M 140-1 and the LA2M 140-2 based on one-to-one scheme. The VA2C 130-2 may be connected to the LA2M 140-3, the LA2M 140-4, and the like. In this case, each of the ports #c to #j may be mapped to each of antennas belonging to the LA2M 140-3 and LA2M 140-4 based on one-to-one scheme. The VA2C 130-3 may be connected to the LA2M 140-5 and the like. In this case, each of the ports #a and #b belonging to the VA2C 130-3 may be mapped to each of antennas belonging to the LA2M 140-5 based on one-to-one scheme.

The LA2M 140 may be connected to the VA2C 130, which is an upper entity. The LA2M 140 may comprise a plurality of antennas. The antenna belonging to the LA2M 140 may be referred to as a distributed antenna (DA), an active antenna component (AAC), a distributed unit (DU), or the like. The LA2M 140 may support at least one of a MAC function, a PHY function, and a radio frequency (RF) function. Also, the LA2M 140 may include a processor (e.g., CPU), memory that stores instructions executed by the processor, and the like, and the processor of the LA2M 140 may perform predefined operations.

Meanwhile, the LA2M 140 may be installed along a movement path (e.g., a rail, a hyperloop tube) of vehicles. When the vehicle moves along the movement path, communications between the vehicle and the communication system may be performed through the antenna installed in the vehicle and the antennas installed along the movement path, which correspond to a position of the vehicle.

Figure 2:
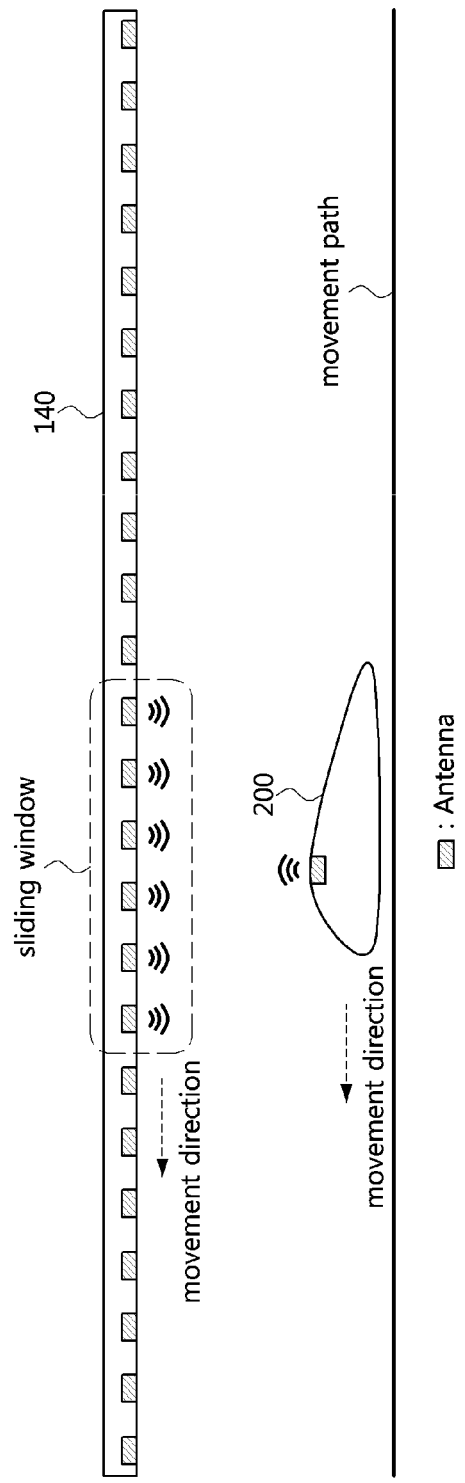
FIG. 2 is a conceptual diagram illustrating a first embodiment of a communication method between a vehicle and a communication system.

FIG. 2 is a conceptual diagram illustrating a first embodiment of a communication method between a vehicle and a communication system.

Referring to FIG. 2, the LA2M 140 may comprise the LA2M 140-1 to 140-5 of the communication system 100 shown in FIG. 1. The vehicle 200 may move along the movement path, and a sliding window may be configured according to the movement path of the vehicle 200. The sliding window may be configured by the CCU 110 and the TSU 120 of the communication system 100. Here, the vehicle 200 may be a high-speed train, an ultrahigh-speed train, a magnetic levitation train, a capsule of a hyperloop, or the like. The sliding window may comprise a plurality of antennas and the communication system 100 may communicate with the vehicle 200 using the plurality of antennas belonging to the sliding window. For example, among all the antennas belonging to the LA2M 140, the antennas belonging to the sliding window may operate in ON state (e.g., active state, enabled state), and communications may be performed between the antennas operating in ON state and the antenna installed in the vehicle 200. The antenna installed in the vehicle 200 may be referred to as DA, AAC, DU, etc. In the vehicle 200, the antenna may be installed in a capsule active antenna module (CA2M). A plurality of antennas may be installed in the vehicle 200, in which case the CA2M may comprise the plurality of antennas.

The sliding window may move according to a movement speed of the vehicle 200, and the movement of the sliding window brings an effect of movement of a base station. Therefore, the sliding window (e.g., the communication system 100 performing communications using the plurality of antennas belonging to the sliding window) may be referred to as a moving cell, a virtual base station, a ghost base station, or the like. One sliding window may be used dedicatedly for one vehicle 200.

In the LA2M 140, the antennas may be installed at regular spacing (e.g., 10 m). For example, when the installation spacing of the antennas is 10 m and the sliding window includes 50 antennas, the length of the sliding window may be 500 m. The number of antennas included in the sliding window may be variously configured, and the number of antennas belonging to the sliding window may be changed according to the installation spacing of the antennas. Also, received signal strength at the vehicle 200 may vary depending on the number of antennas belonging to the sliding window.

Figure 3:
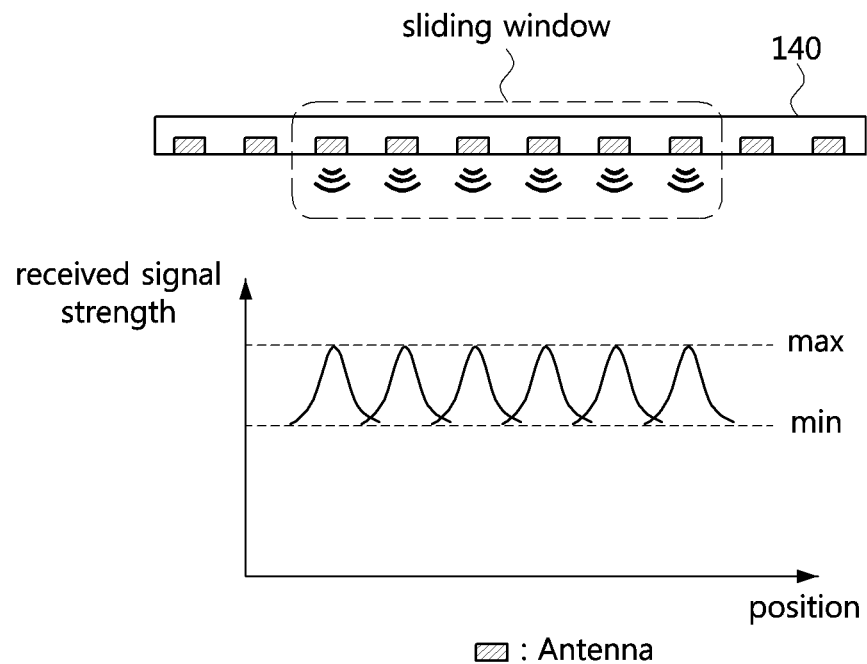
FIG. 3 is a graph illustrating a first embodiment of a received signal strength at a vehicle.
Figure 4:
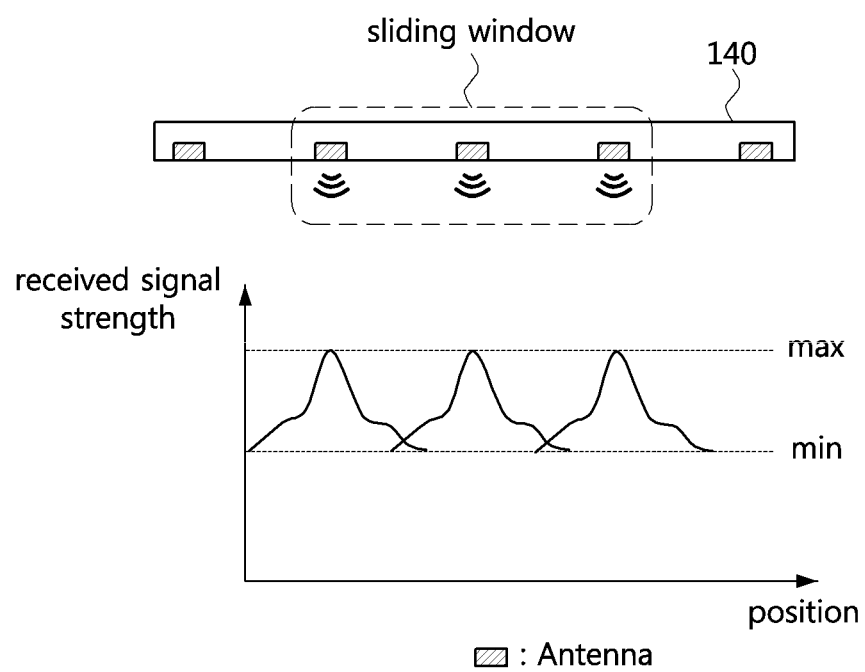
FIG. 4 is a graph illustrating a second embodiment of a received signal strength at a vehicle.

FIG. 3 is a graph illustrating a first embodiment of a received signal strength at a vehicle, and FIG. 4 is a graph illustrating a second embodiment of a received signal strength at a vehicle.

Referring to FIGS. 3 and 4, all the antennas in the sliding window may transmit signals in a joint transmission (JT) scheme. When the JT scheme is used, all the antennas belonging to the sliding window may transmit the same signal (e.g., control information, data, content, etc.) using the same time-frequency resource. The number of antennas in the sliding window of FIG. 3 may be twice the number of antennas in the sliding window of FIG. 4. In the vehicle 200, an average received signal strength may be determined between a maximum received signal strength and a minimum received signal strength. In FIG. 3, the maximum received signal strength may be equal to the maximum received signal strength in FIG. 4, and the minimum received signal strength in FIG. 3 may be higher than the minimum received signal strength in FIG. 4.

The minimum received signal strength may be related to the minimum guaranteed capacity of the vehicle 200 (e.g., the minimum target capacity of the downlink in the vehicle 200). The installation spacing of the antennas in the LA2M 140 may be determined in consideration of the minimum guaranteed capacity of the vehicle 200. For example, when the minimum guaranteed capacity of the vehicle 200 is low, the installation spacing of the antennas in the LA2M 140 may be relatively wide, and the installation cost of the communication system 100 may be reduced. That is, as the installation spacing of the antennas is decreased in the LA2M 140, the received signal strength may be improved in the vehicle 200, and as the installation spacing of the antennas is increased in the LA2M 140, the installation cost of the communication system may be reduced.

Meanwhile, the mapping relationship between the upper port and the lower ports in the VA2C 130 may be configured as follows according to the movement of the sliding window. Here, the sliding window may be configured to include 6 antennas, and may move according to the movement speed of the vehicle 200.

Figure 5:
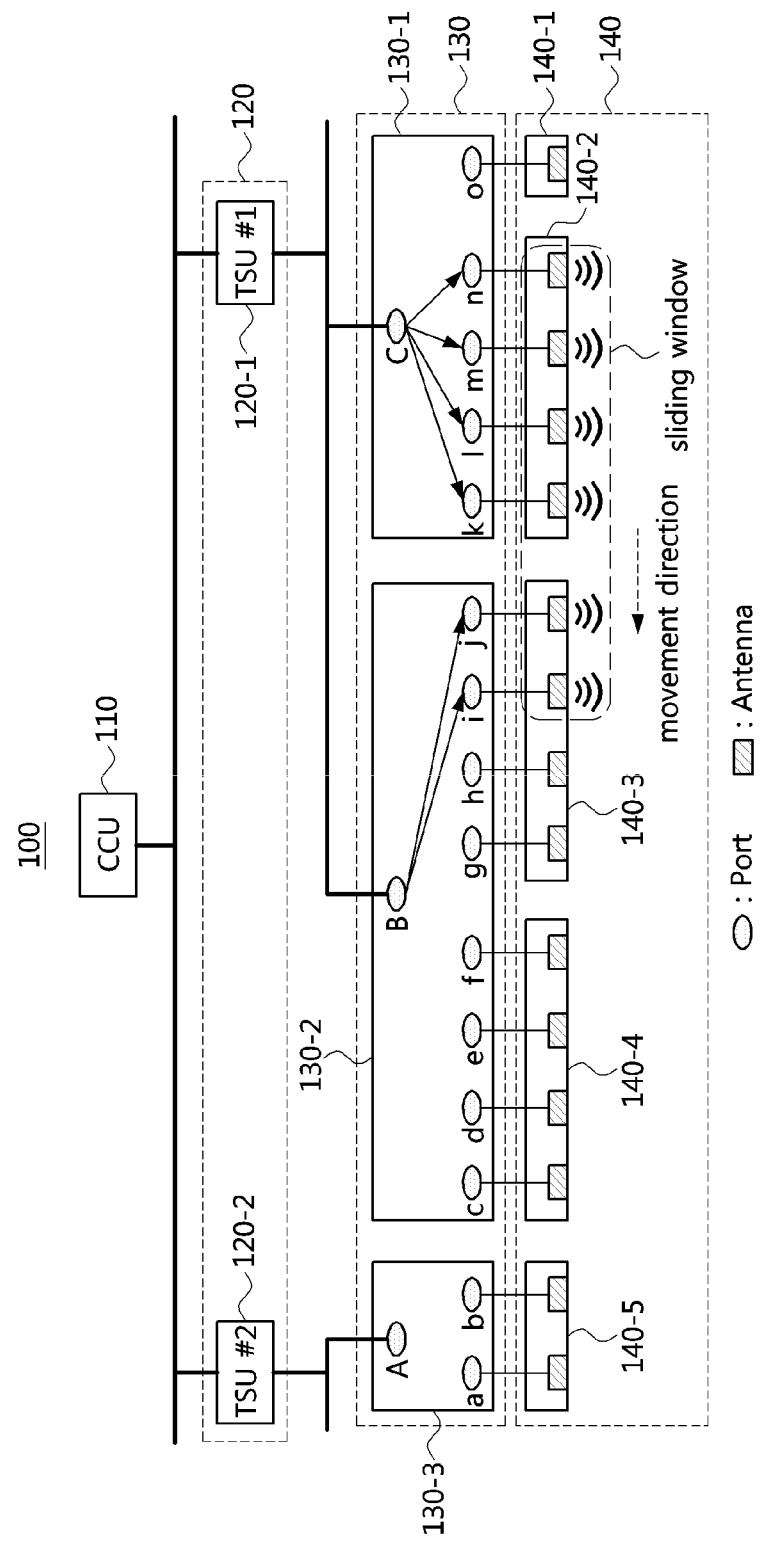
FIG. 5 illustrates a first embodiment showing a port mapping relationship in a VA2C of a communication system.

FIG. 5 illustrates a first embodiment showing a port mapping relationship in a VA2C of a communication system.

Referring to FIG. 5, the sliding window may be controlled and managed by the CCU 110 and the TSU 120-1 of the communication system 100, and include the antennas connected to the ports #k, #l, #m, and #n of the VA2C 130-1 and the antennas connected to the ports #i and #j of the VA2C 130-2. For example, the TSU 120-1 may transmit a signal to the port #C of the VA2C 130-1, and in the VA2C 130-1, the corresponding signal may be transmitted from the port #C to the ports #k, #l, #m, and #n in a multicast manner. Also, the TSU 120-1 may transmit a signal to the port #B of the VA2C 130-2, and in the VA2C 130-2, the corresponding signal may be transmitted from the port #B to the ports #i and #j in a multicast manner.

Figure 6:
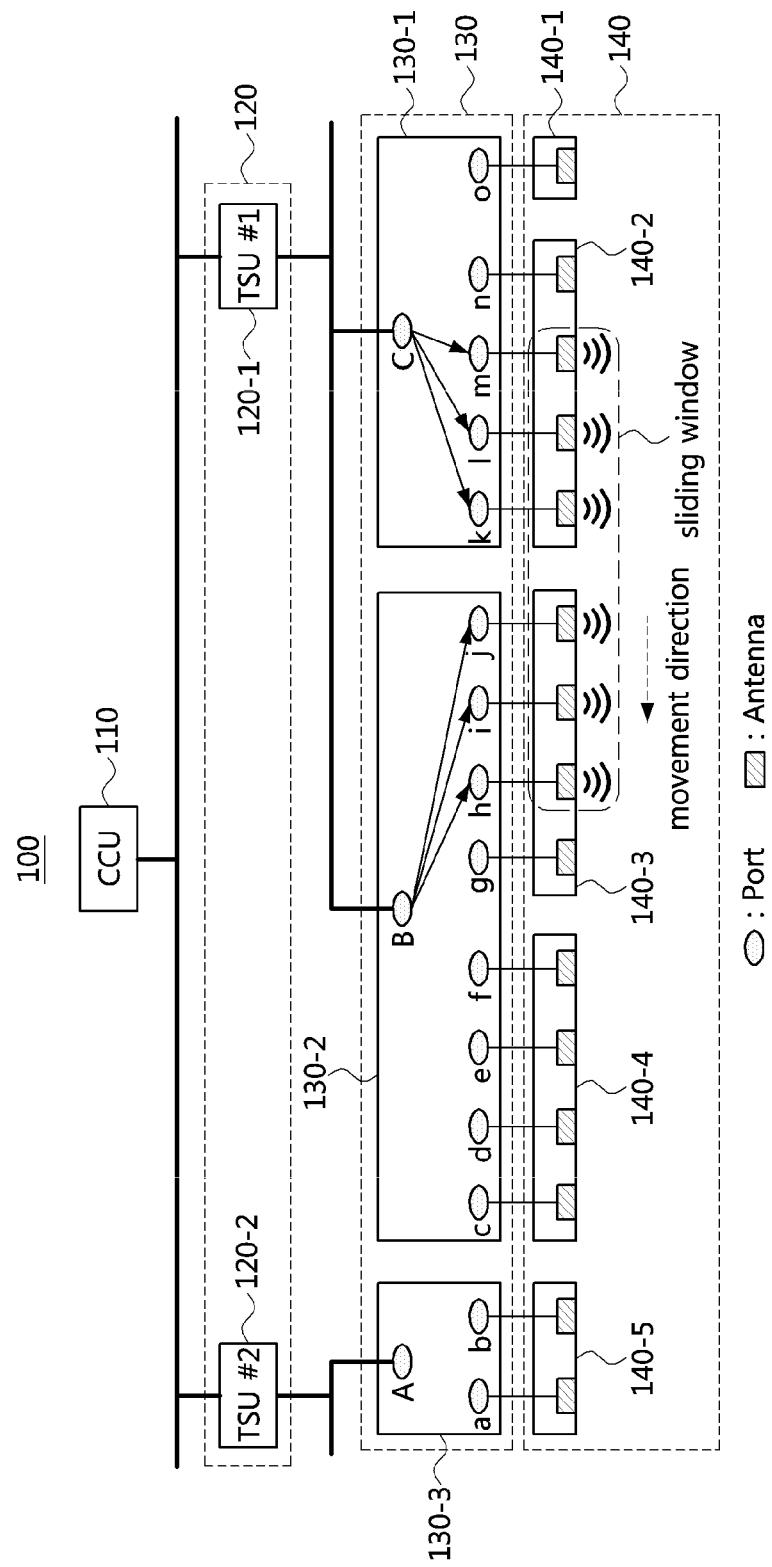
FIG. 6 illustrates a second embodiment showing a port mapping relationship in a VA2C of a communication system.

FIG. 6 illustrates a second embodiment showing a port mapping relationship in a VA2C of a communication system.

Referring to FIG. 6, the sliding window may be controlled and managed by the CCU 110 and the TSU 120-1 of the communication system 100, and include the antennas connected to the ports #k, #l, and #m of the VA2C 130-1 and the antennas connected to the ports #h, #i, and #j of the VA2C 130-2. When the sliding window of FIG. 6 is compared with the sliding window of FIG. 5, in the sliding window of FIG. 6, the antenna connected to the port #n of the VA2C 130-1 may be excluded (i.e., the connection between the port #C and the port #n is released), and the antenna connected to the port #h of the VA2C 130-2 may be added (i.e., the connection between the port #B and the port #h is added). For example, the TSU 120-1 may transmit a signal to the port #C of the VA2C 130-1, and in the VA2C 130-1, the corresponding signal may be transmitted from the port #C to the ports #k, #l, and #m in a multicast manner. Also, the TSU 120-1 may transmit a signal to the port #B of the VA2C 130-2, and in the VA2C 130-2, the corresponding signal may be transmitted from the port #B to the ports #h, #i, and #j in a multicast manner.

Figure 7:
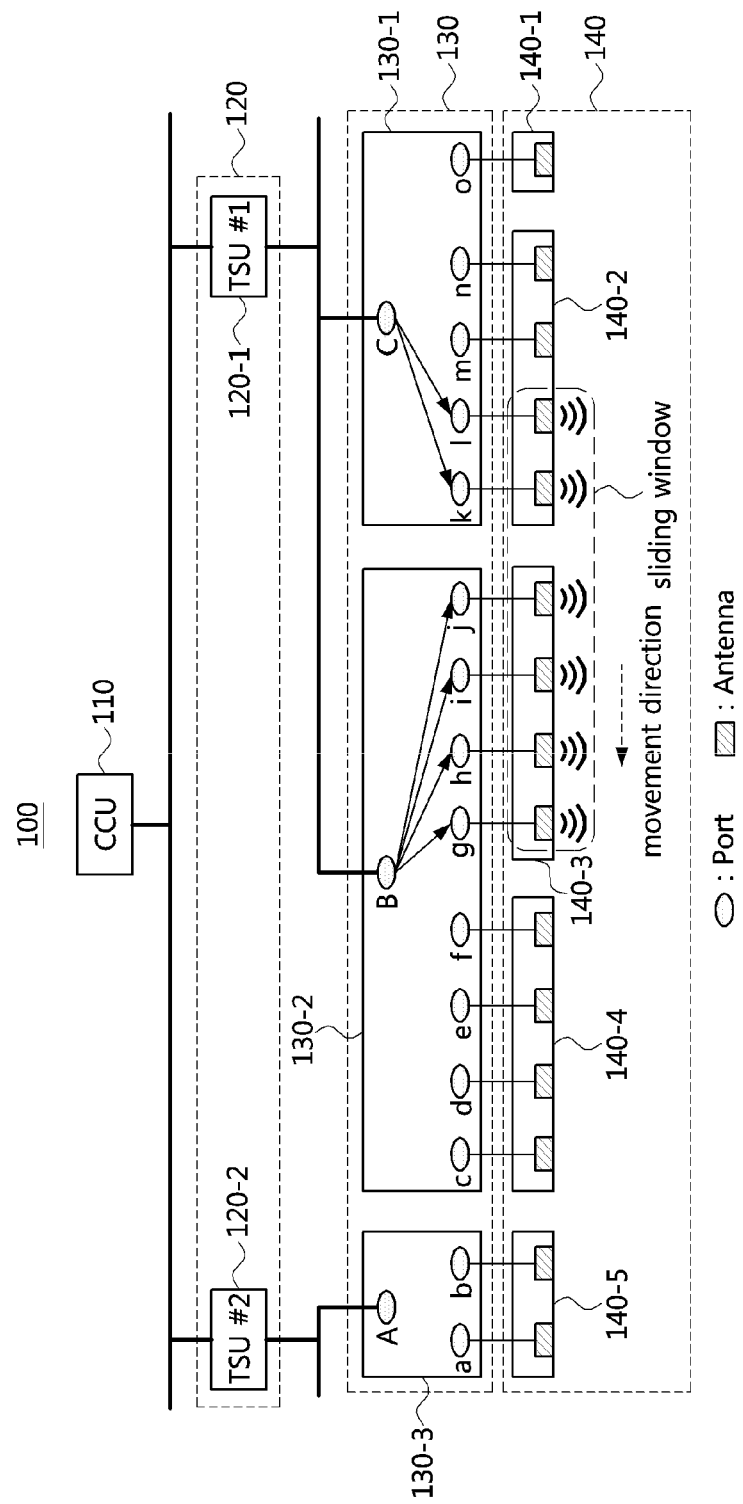
FIG. 7 illustrates a third embodiment showing a port mapping relationship in a VA2C of a communication system.

FIG. 7 illustrates a third embodiment showing a port mapping relationship in a VA2C of a communication system.

Referring to FIG. 7, the sliding window may be controlled and managed by the CCU 110 and the TSU 120-1 of the communication system 100, and include the antennas connected to the ports #k and #l of the VA2C 130-1 and the antennas connected to the ports #g, #h, #i, and #j of the VA2C 130-2. When the sliding window of FIG. 7 is compared with the sliding window of FIG. 6, in the sliding window of FIG. 7, the antenna connected to the port #m of the VA2C 130-1 may be excluded (i.e., the connection between the port #C and the port #m is released), and the antenna connected to the port #g of the VA2C 130-2 may be added (i.e., the connection between the port #B and the port #g is added). For example, the TSU 120-1 may transmit a signal to the port #C of the VA2C 130-1, and in the VA2C 130-1, the corresponding signal may be transmitted from the port #C to the ports #k and #l in a multicast manner. Also, the TSU 120-1 may transmit a signal to the port #B of the VA2C 130-2, and in the VA2C 130-2, the corresponding signal may be transmitted from the port #B to the ports #g, #h, #i, and #j in a multicast manner.

Figure 8:
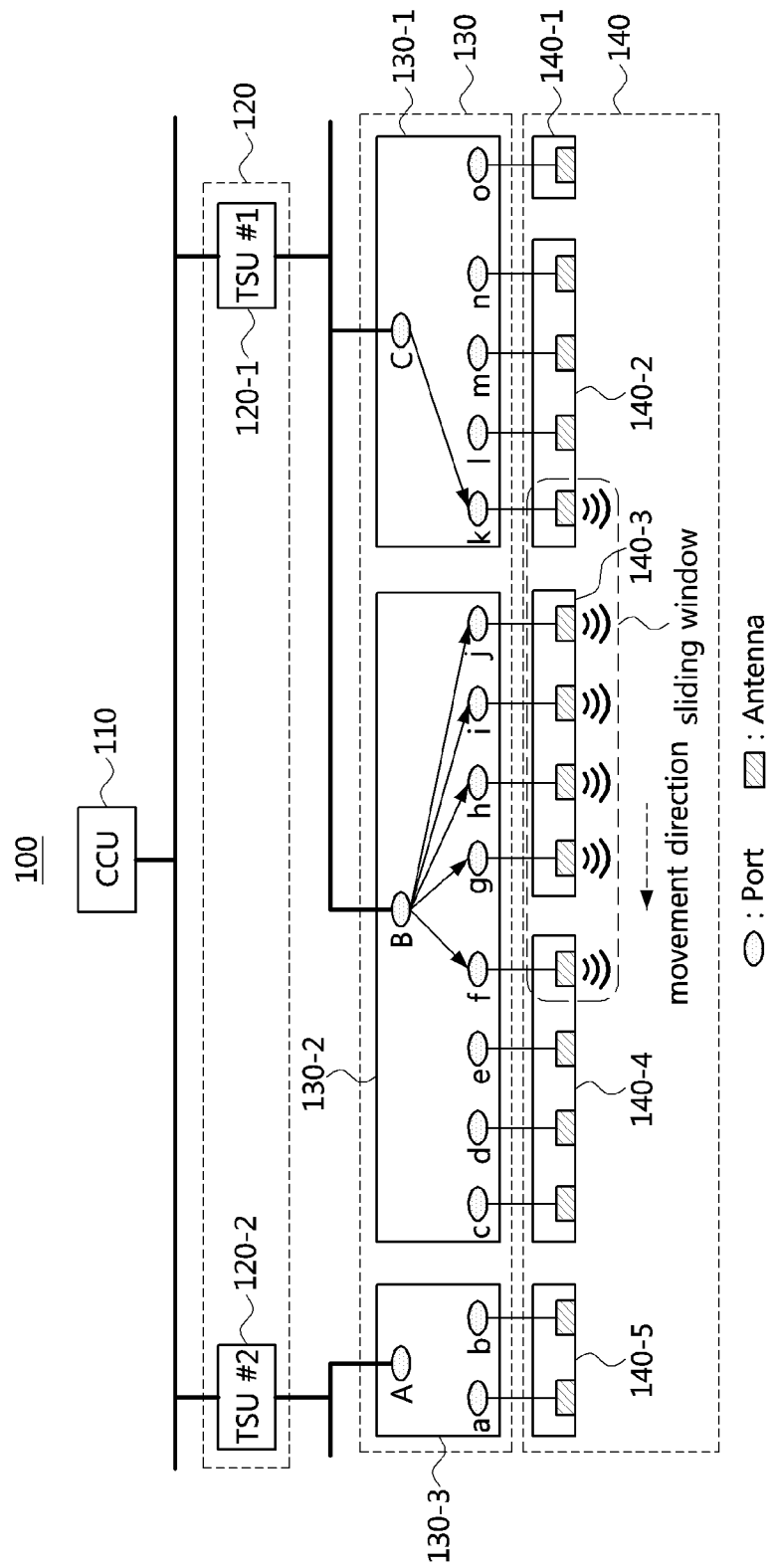
FIG. 8 illustrates a fourth embodiment showing a port mapping relationship in a VA2C of a communication system.

FIG. 8 illustrates a fourth embodiment showing a port mapping relationship in a VA2C of a communication system.

Referring to FIG. 8, the sliding window may be controlled and managed by the CCU 110 and the TSU 120-1 of the communication system 100, and include the antennas connected to the port #k of the VA2C 130-1 and the antennas connected to the ports #f, #g, #h, #i, and #j of the VA2C 130-2. When the sliding window of FIG. 8 is compared with the sliding window of FIG. 7, in the sliding window of FIG. 8, the antenna connected to the port #l of the VA2C 130-1 may be excluded (i.e., the connection between the port #C and the port #l is released), and the antenna connected to the port #f of the VA2C 130-2 may be added (i.e., the connection between the port #B and the port #f is added). For example, the TSU 120-1 may transmit a signal to the port #C of the VA2C 130-1, and in the VA2C 130-1, the corresponding signal may be transmitted from the port #C to the port #k. Also, the TSU 120-1 may transmit a signal to the port #B of the VA2C 130-2, and in the VA2C 130-2, the corresponding signal may be transmitted from the port #B to the ports #f, #g, #h, #i, and #j in a multicast manner.

Figure 9:
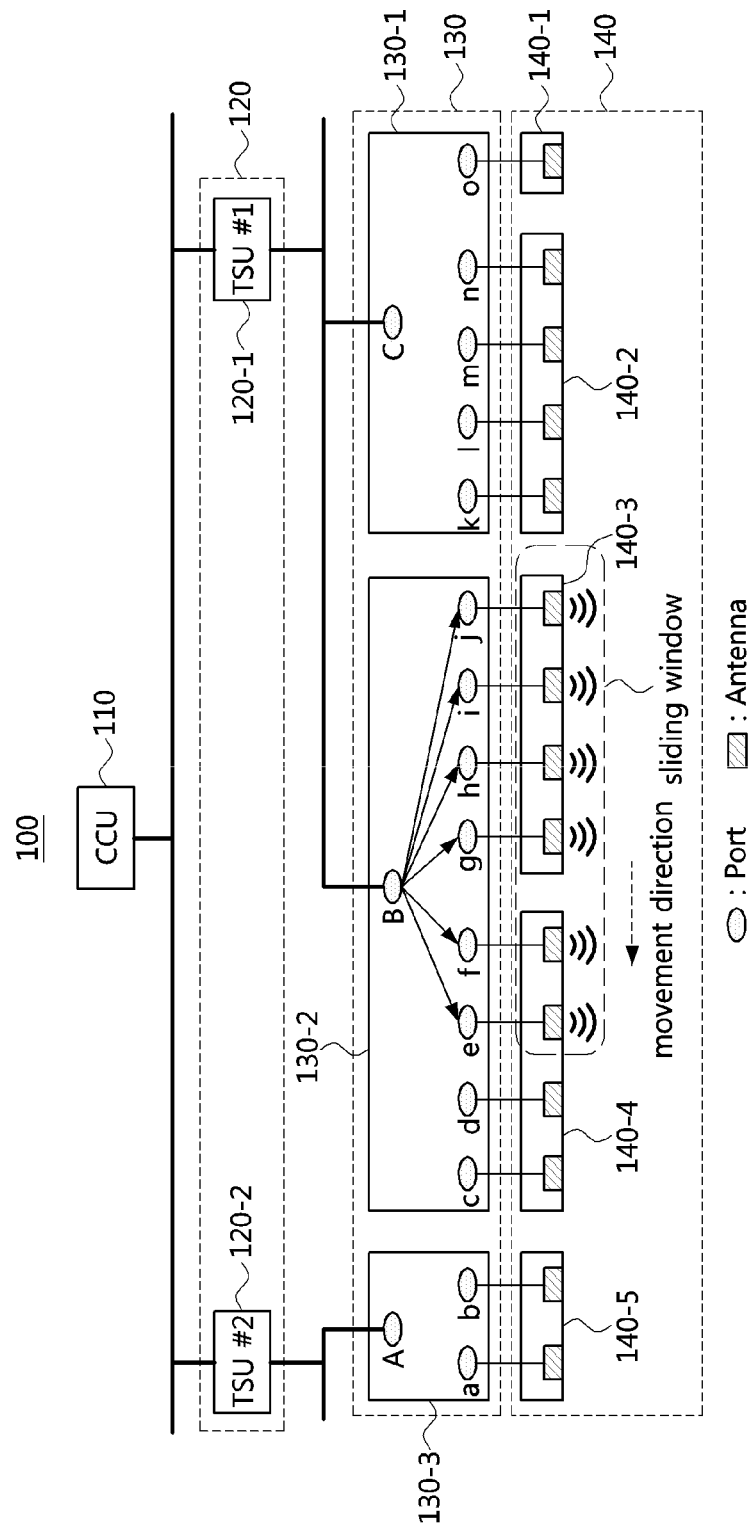
FIG. 9 illustrates a fifth embodiment showing a port mapping relationship in a VA2C of a communication system.

FIG. 9 illustrates a fifth embodiment showing a port mapping relationship in a VA2C of a communication system.

Referring to FIG. 9, the sliding window may be controlled and managed by the CCU 110 and the TSU 120-1 of the communication system 100, and include the antennas connected to the ports #e, #f, #g, #h, #i, and #j of the VA2C 130-2. When the sliding window of FIG. 9 is compared with the sliding window of FIG. 8, in the sliding window of FIG. 9, the antenna connected to the port #k of the VA2C 130-1 may be excluded (i.e., the connection between the port #C and the port #k is released), and the antenna connected to the port #e of the VA2C 130-2 may be added (i.e., the connection between the port #B and the port #e is added). For example, the TSU 120-1 may transmit a signal to the port #B of the VA2C 130-2, and in the VA2C 130-2, the corresponding signal may be transmitted from the port #B to the ports #e, #f, #g, #h, #i, and #j in a multicast manner. In this case, the TSU 120-1 may not transmit a signal to the port #C of the VA2C 130-1.

Figure 10:
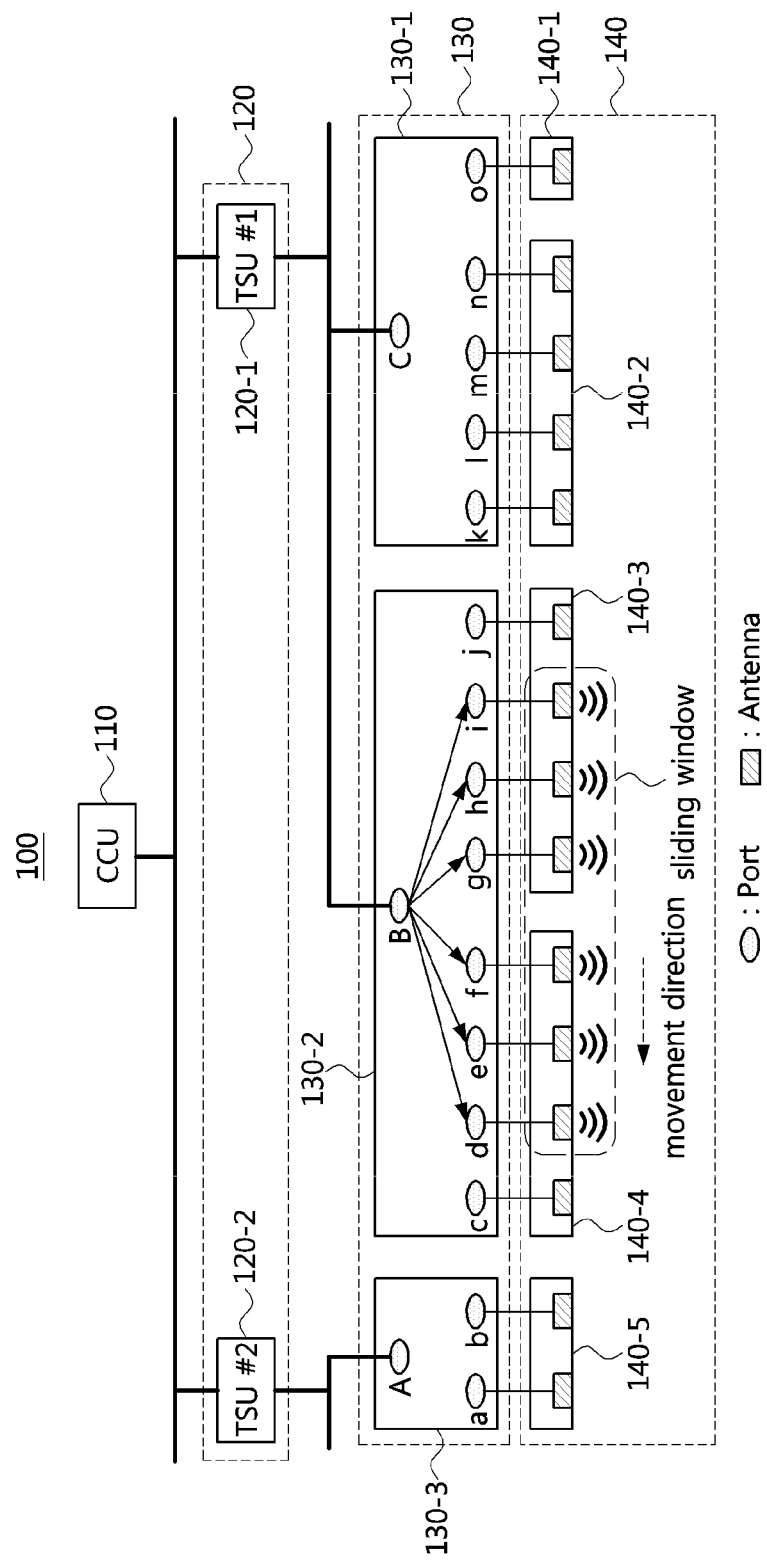
FIG. 10 illustrates a sixth embodiment showing a port mapping relationship in a VA2C of a communication system.

FIG. 10 illustrates a sixth embodiment showing a port mapping relationship in a VA2C of a communication system.

Referring to FIG. 10, the sliding window may be controlled and managed by the CCU 110 and the TSU 120-1 of the communication system 100, and include the antennas connected to the ports #d, #e, #f, #g, #h, and #i of the VA2C 130-2. When the sliding window of FIG. 10 is compared with the sliding window of FIG. 9, in the sliding window of FIG. 10, the antenna connected to the port #j of the VA2C 130-2 may be excluded (i.e., the connection between the port #B and the port #j is released), and the antenna connected to the port #d of the VA2C 130-2 may be added (i.e., the connection between the port #B and the port #d is added). For example, the TSU 120-1 may transmit a signal to the port #B of the VA2C 130-2, and in the VA2C 130-2, the corresponding signal may be transmitted from the port #B to the ports #d, #e, #f, #g, #h, and #i in a multicast manner.

Figure 11:
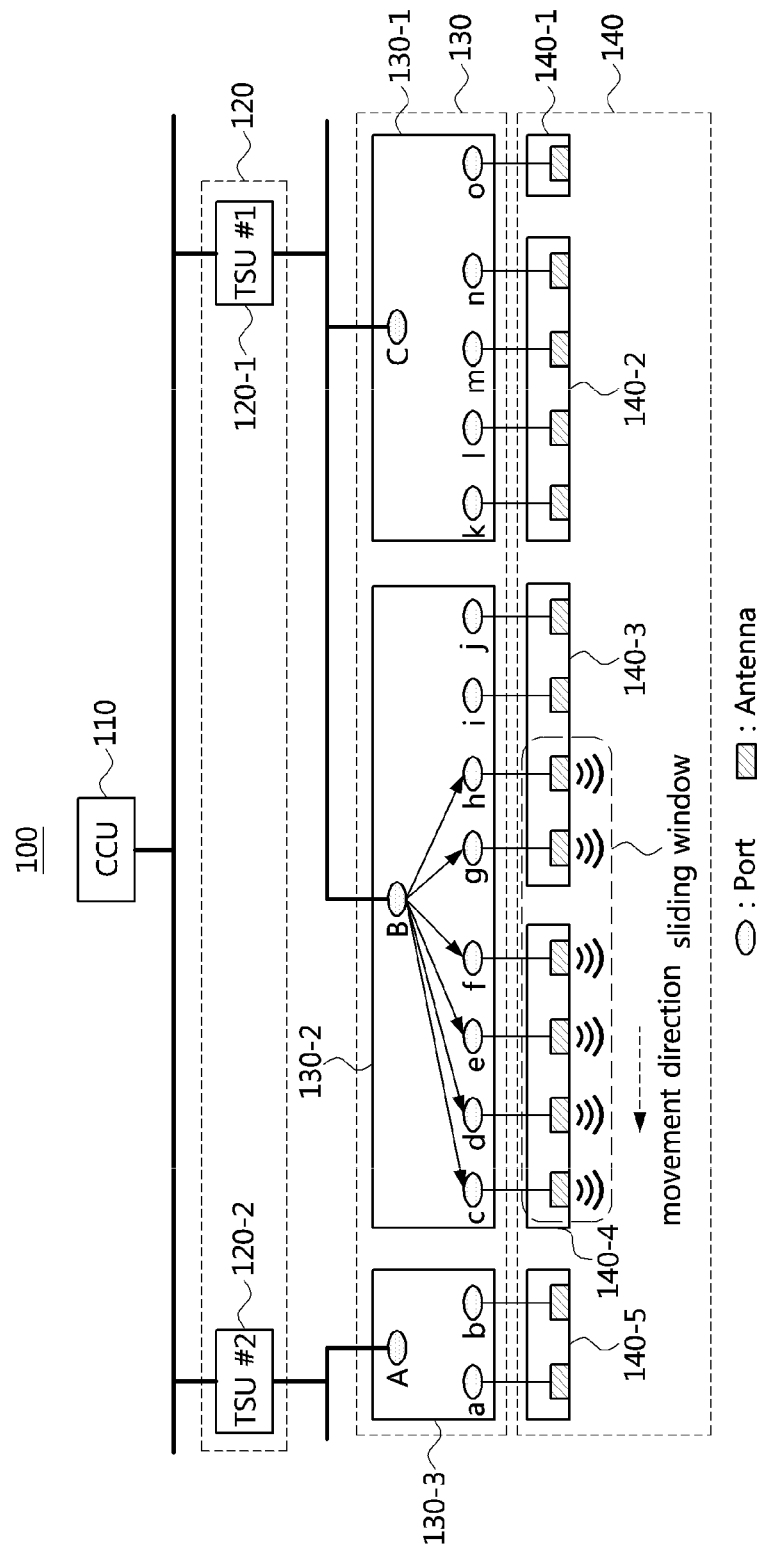
FIG. 11 illustrates a seventh embodiment showing a port mapping relationship in a VA2C of a communication system.

FIG. 11 illustrates a seventh embodiment showing a port mapping relationship in a VA2C of a communication system.

Referring to FIG. 11, the sliding window may be controlled and managed by the CCU 110 and the TSU 120-1 of the communication system 100, and include the antennas connected to the ports #c, #d, #e, #f, #g, and #h of the VA2C 130-2. When the sliding window of FIG. 11 is compared with the sliding window of FIG. 10, in the sliding window of FIG. 11, the antenna connected to the port #i of the VA2C 130-2 may be excluded (i.e., the connection between the port #B and the port #i is released), and the antenna connected to the port #c of the VA2C 130-2 may be added (i.e., the connection between the port #B and the port #c is added). For example, the TSU 120-1 may transmit a signal to the port #B of the VA2C 130-2, and in the VA2C 130-2, the corresponding signal may be transmitted from the port #B to the ports #c, #d, #e, #f, #g, and #h in a multicast manner.

Figure 12:
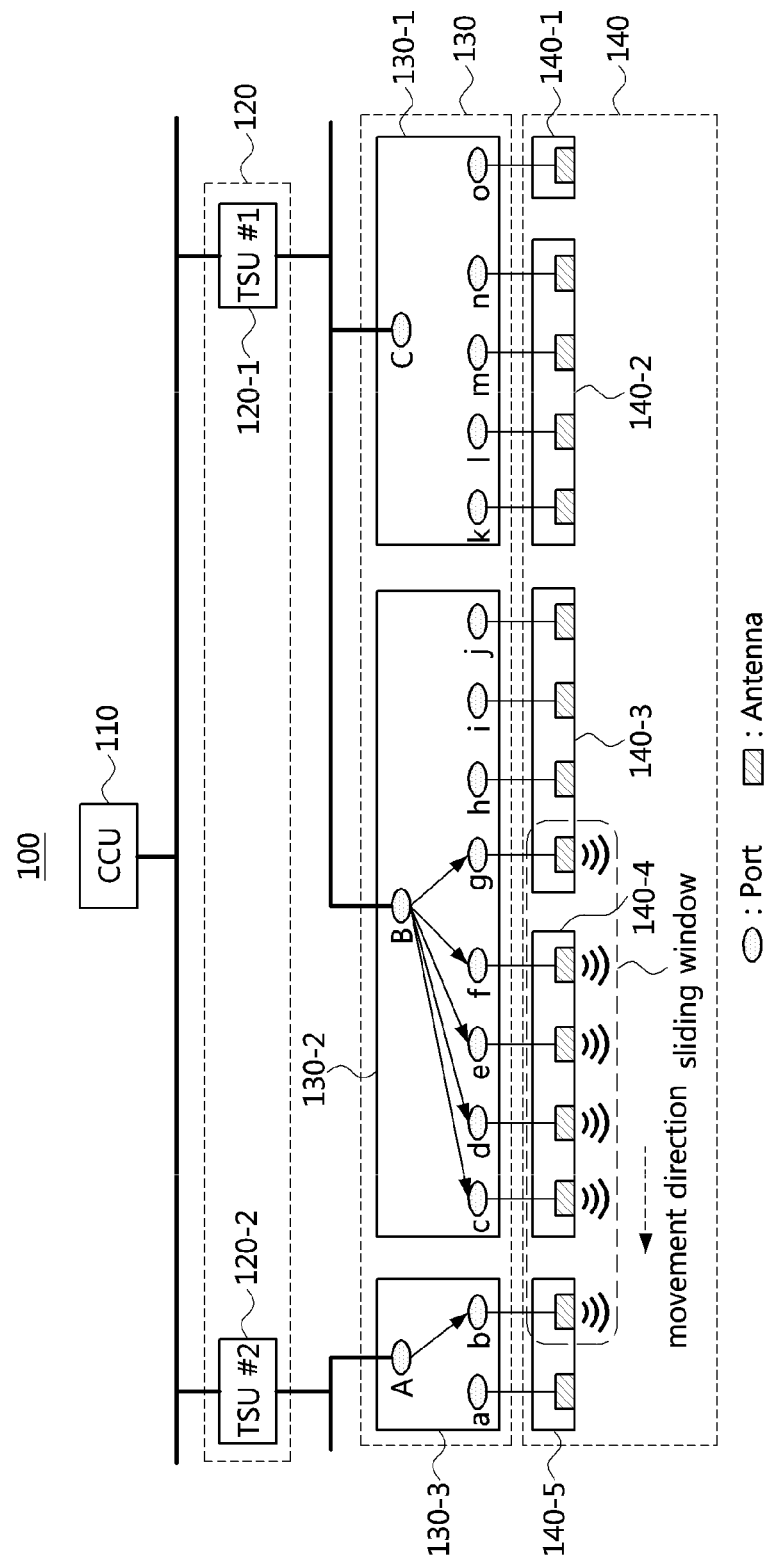
FIG. 12 illustrates an eighth embodiment showing a port mapping relationship in a VA2C of a communication system.

FIG. 12 illustrates an eighth embodiment showing a port mapping relationship in a VA2C of a communication system.

Referring to FIG. 12, the sliding window may be controlled and managed by the CCU 110, the TSU 120-1, and the TSU 120-2 of the communication system 100, and include the antennas connected to the ports #c, #d, #e, #f, and #g of the VA2C 130-2 and the antennas connected to the port #b of the VA2C 130-3. When the sliding window of FIG. 12 is compared with the sliding window of FIG. 11, in the sliding window of FIG. 12, the antenna connected to the port #h of the VA2C 130-2 may be excluded (i.e., the connection between the port #B and the port #h is released), and the antenna connected to the port #b of the VA2C 130-3 may be added (i.e., the connection between the port #A and the port #b is added). For example, the TSU 120-1 may transmit a signal to the port #B of the VA2C 130-2, and in the VA2C 130-2, the corresponding signal may be transmitted from the port #B to the ports #c, #d, #e, #f, and #g in a multicast manner. Also, the TSU 120-2 may transmit a signal to the port #A of the VA2C 130-3, and in the VA2C 130-3, the corresponding signal may be transmitted from the port #A to the port #b. Since the signals are transmitted by two TSUs 120-1 and 120-2, the synchronization between the TSU 120-1 and the TSU 120-2 (e.g., synchronization between signals (contents) transmitted from the TSU 120-1 and the TSU 120-2) may be configured by the CCU 110. Also, switching among the VA2Cs 130-1, 130-2, and 130-3 may be controlled by the CCU 110.

Figure 13:
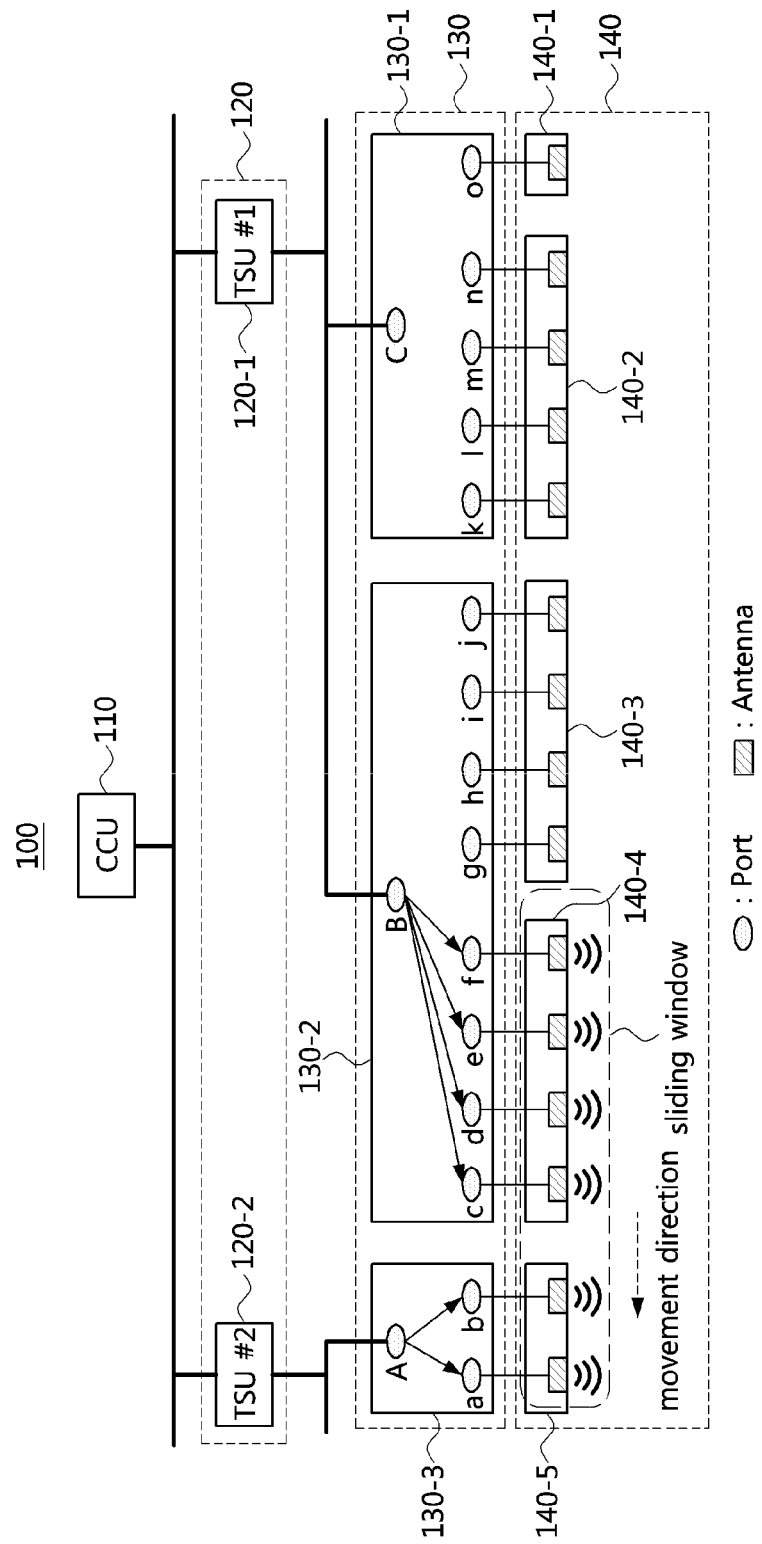
FIG. 13 illustrates a ninth embodiment showing a port mapping relationship in a VA2C of a communication system.

FIG. 13 illustrates a ninth embodiment showing a port mapping relationship in a VA2C of a communication system.

Referring to FIG. 13, the sliding window may be controlled and managed by the CCU 110, the TSU 120-1, and the TSU 120-2 of the communication system 100, and include the antennas connected to the ports #c, #d, #e, and #f of the VA2C 130-2 and the antennas connected to the ports #a and #b of the VA2C 130-3. When the sliding window of FIG. 13 is compared with the sliding window of FIG. 12, in the sliding window of FIG. 13, the antenna connected to the port #g of the VA2C 130-2 may be excluded (i.e., the connection between the port #B and the port #g is released), and the antenna connected to the port #a of the VA2C 130-3 may be added (i.e., the connection between the port #A and the port #a is added). For example, the TSU 120-1 may transmit a signal to the port #B of the VA2C 130-2, and in the VA2C 130-2, the corresponding signal may be transmitted from the port #B to the ports #c, #d, #e, and #f in a multicast manner. Also, the TSU 120-2 may transmit a signal to the port #A of the VA2C 130-3, and in the VA2C 130-3, the corresponding signal may be transmitted from the port #A to the ports #a and #b in a multicast manner. Since the signals are transmitted by two TSUs 120-1 and 120-2, the synchronization between the TSU 120-1 and the TSU 120-2 (e.g., synchronization between signals (contents) transmitted from the TSU 120-1 and the TSU 120-2) may be configured by the CCU 110.

On the other hand, in the CCU 110, TSU 120, VA2C 130 and LA2M 140 of the communication system 100, a protocol stack may be configured as follows.

Figure 14:
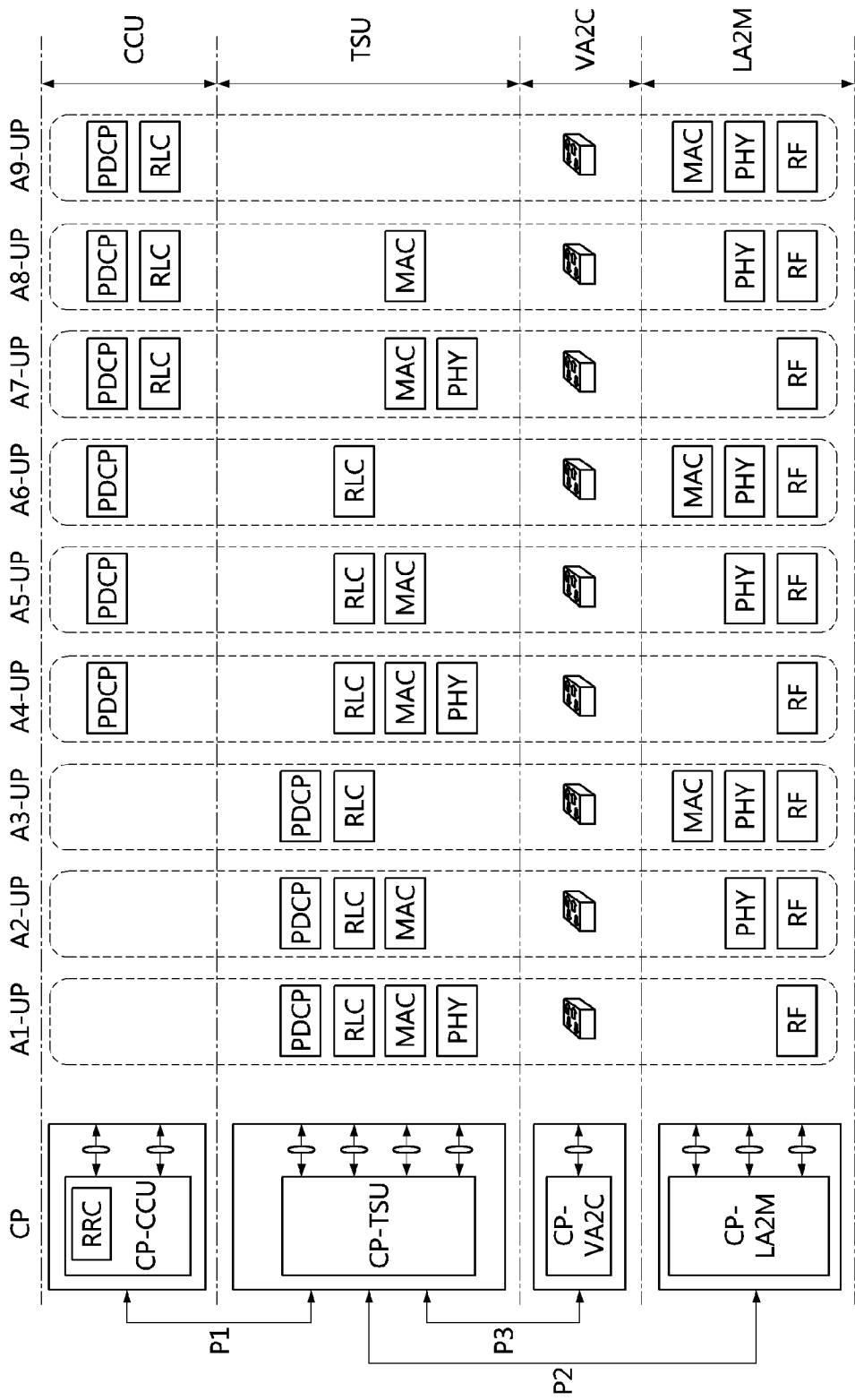
FIG. 14 is a conceptual diagram illustrating a first embodiment of a protocol stack of a communication system.

FIG. 14 is a conceptual diagram illustrating a first embodiment of a protocol stack of a communication system.

Referring to FIG. 14, in the communication system 100, a control plane (CP) protocol stack may include CP-CCU, CP-TSU, CP-VA2C and CP-LA2M. The CP-CCU may transmit a control primitive to the CP-TSU through a first path P1. The CP-TSU may receive the control primitive from the CP-CCU, and transmit a response/report for the received control primitive to the CP-CCU through the first path P1. The CP-TSU may transmit a control primitive to the CP-LA2M through a second path P2 for control of the CP-LA2M, and may receive a response/report for the control primitive from the CP-LA2M through the second path P2. The CP-TSU may transmit a control primitive to the CP-LA2C through a third path P3 for control of the CP-LA2C, and may receive a response/report for the control primitive from the CP-LA2C through the third path P3.

The CP-CCU may include an RRC layer. Therefore, the CP-CCU may support resource allocation/change/release operations in the sliding window, and may transmit RRC messages for the resource allocation/change/release operations. In addition, the CP-CCU may obtain position information of the vehicle 200, and may configure the sliding window based on the obtained position information. For example, the CP-CCU may configure the sliding window so that the sliding window corresponds to the position of the vehicle 200. The CP-CCU may configure one sliding window for one vehicle 200, and perform a resource allocation operation for the corresponding vehicle 200 within the configured sliding window.

When the resource allocation operation is performed, the CP-CCU may transmit a resource allocation message to the CP-TSU through the first path P1, the resource allocation message including a transport block size (TB), frequency resource allocation information, time resource allocation information (e.g., a transmission time interval (TTI) cycle), a hopping pattern, information on mapping between upper ports and lower ports in the VA2C 130, and the like. The CP-TSU may receive the resource allocation message through the first path P1, and identify the information included in the resource allocation message. The CP-TSU that has received the resource allocation message may transmit control information related to the resource allocation to the CP-LA2M (e.g., the plurality of CP-LA2Ms connected to the CP-TSU) through the second path, and transmit control information related to the resource allocation to the CP-VA2C (e.g., the plurality of CP-VA2Cs connected to the CP-TSU) through the third path. The CP-LA2M and CP-VA2C may operate based on the control information related to the resource allocation received from the CP-TSU. The control information transmitted from the CP-TSU to the CP-LA2M or the CP-VA2C may vary according to a type of a user plane (UP) (e.g., A1-UP, A2-UP, A3-UP, A4-UP, A5-UP, A6-UP, A7-UP, A8-UP, and A9-UP).

In the communication system 100, a protocol stack of the UP may be configured to A1-UP, A2-UP, A3-UP, A4-UP, A5-UP, A6-UP, A7-UP, A8-UP, A9-UP, or the like. The A1-UP, A2-UP, A3-UP, A4-UP, A5-UP or A6-UP may be used for downlink transmission. The protocol stacks of the UP used for uplink transmission may be the same as the protocol stacks of the UP used for downlink transmission. Alternatively, the UP protocol stacks used for uplink transmission may be different from the UP protocol stacks used for downlink transmission.

The LA2M 140 may include at least one of an RF layer, a PHY layer, and a MAC layer. The RF layer may include antennas (e.g., DA, AAC). The TSU 120 may include at least one of a PDCP layer, an RLC layer, a MAC layer, and a PHY layer. However, in the A9-UP, the TSU 120 may not include all of the PDCP layer, the RLC layer, the MAC layer, and the PHY layer. The CCU 110 may include at least one of a PDCP layer and an RLC layer. However, in the A1-UP, A2-UP and A3-UP, the CCU 110 may not include both the PDCP layer and the RLC layer. One layer may be located in the CCU 110, the TSU 120, or the LA2M 140. Alternatively, some functions of one layer may be performed by the CCU 110, the TSU 120, or the LA2M 140, and the remaining functions of the one layer may be performed by the entity that does not perform the some functions of the one layer among the entire entities (e.g., CCU 110, TSU 120, and LA2M 140).

The PDCP layer may be located in the TSU 120 (e.g., the TSU 120 in the A1-UP, A2-UP or A3-UP) or the PDCP layer may be located in the CCU 110 (e.g., the CCU 110 in the A4-UP, A5-UP, A6-UP, A7-UP, A8-UP or A9-UP) in order to reduce a processing power. The PDCP layer may not support internet protocol (IP) header compression. Alternatively, the PDCP layer may be omitted in the communication system.

In the A7-UP, A8-UP and A9-UP, the RLC layer may support an RLC acknowledged mode (AM). For example, when the RLC AM is supported, the transmitting communication node (e.g., the communication system 100 of FIG. 1) may transmit a packet to the receiving communication node (e.g., the vehicle 200 of FIG. 2) and store the transmitted packet in a buffer. The receiving communication node may receive the packet from the transmitting communication node, and may transmit a response message (e.g., an ACK message, a NACK message) to the transmitting communication node. When an ACK message is received in response to the packet from the receiving communication node, the transmitting communication node may discard the packet stored in the buffer (i.e., the packet transmitted to the receiving communication node). On the other hand, when a NACK message is received in response to the packet from the receiving communication node, the transmitting communication node may retransmit the packet stored in the buffer (i.e., the packet transmitted to the receiving communication node). When the RLC layer is located in the CCU 110, the operation in which the receiving communication node transmits the response message (e.g., ACK message or NACK message) for the received packet, and the operation in which the transmitting communication node retransmits the packet corresponding to the received NACK message may be easily performed. The communication system 100 may include the plurality of TSUs 120 and when the RLC layer is located in each of the plurality of TSUs 120 in the A1-UP to A6-UP, the CCU 110 may control and manage the RLC related operations performed by the plurality of TSUs 120.

Meanwhile, the communication nodes (e.g., the CCU 110, the TSU 120, the VA2C 130, and the LA2M 140) belonging to the communication system 100 may have a hierarchical tree structure. Here, the communication node may refer to a communication entity. In the communication system 100, the communication nodes may be synchronized based on a global positioning system (GPS), Institute of Electrical and Electronics Engineers (IEEE) 1588, and the like. A synchronization layer that performs a synchronization function according to a predefined synchronization protocol may be located in the CCU 110. Also, the synchronization protocol may be performed in the CCU 110 and the communication nodes (e.g., TSU 120, LA2M 140) that perform the MAC function.

Since the MAC layer is located in the TSU 120 in the A1-UP, A2-UP, A4-UP, A5-UP, A7-UP and A8-UP, the synchronization procedure may be performed between the CCU 110 and the TSU 120. Since the MAC layer is located in the LA2M 140 in the A3-UP, A6-UP, and A9-UP, the synchronization procedure may be performed between the CCU 110 and the LA2M 140. In this case, the TSU 120 may perform a relay function in the synchronization procedure between the CCU 110 and the LA2M 140. Since a connection structure between the communication nodes in the downlink communication procedure has a 1-to-N structure, the TSU 120 may be used as a transport layer when an IP multicast function is used. Here, N may be an integer of 2 or more.

Meanwhile, downlink resources used for downlink communication in the communication system 100 may be allocated as follows.

Figure 15:
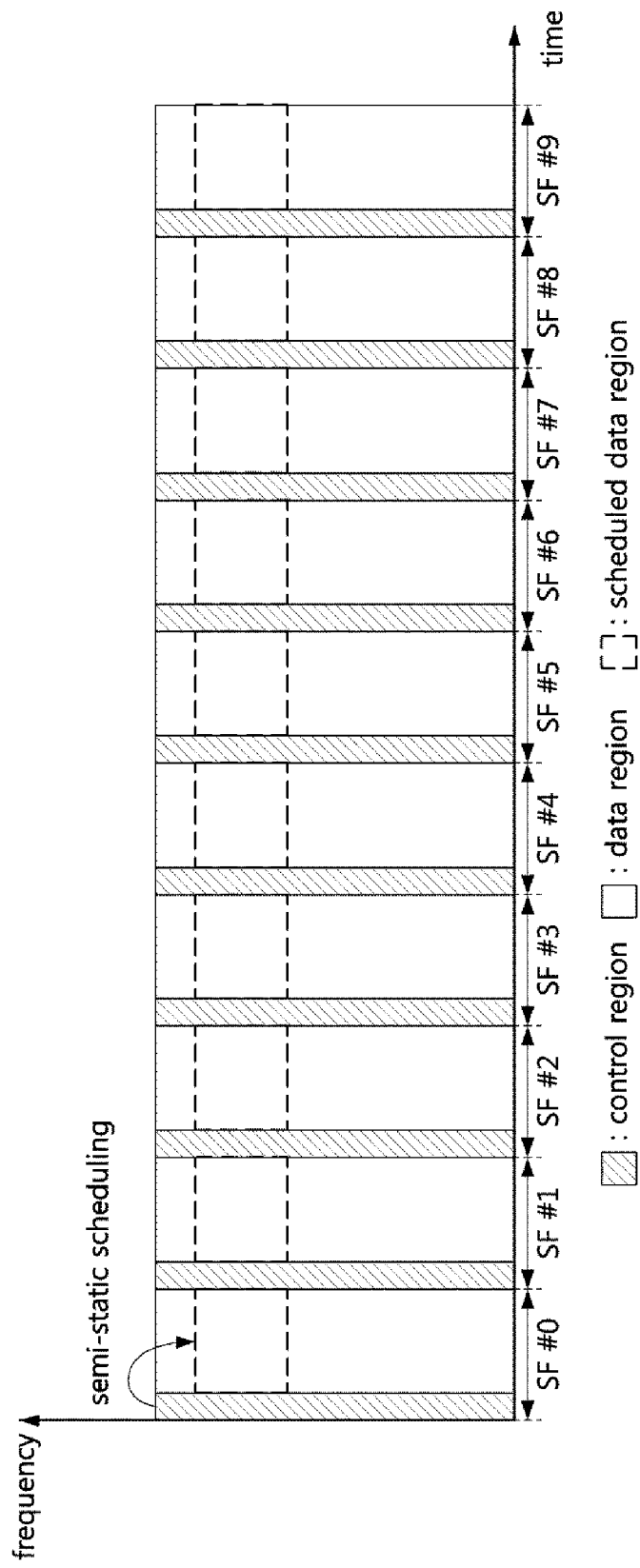
FIG. 15 is a conceptual diagram illustrating a first embodiment of a downlink resource allocation method in a communication system.

FIG. 15 is a conceptual diagram illustrating a first embodiment of a downlink resource allocation method in a communication system.

Referring to FIG. 15, a radio frame may include a plurality of subframes (e.g., 10 subframes SF #0 to #9), and the length of the subframe may be configured variously. For example, the length of the subframe may be 0.5 ms, 1 ms, or the like. One subframe may be one TTI. The subframe may include two or more slots, and a slot may include a plurality of symbols. The subframe may include a control region and a data region. Here, the control region may be a control channel of a cellular communication system (e.g., a 4G or 5G communication system), and the data region may be a data channel in the cellular communication system. The communication system 100 may transmit control information to the vehicle 200 using the control region of the subframe, and may transmit data (e.g., content) to the vehicle 200 using the data region of the subframe.

For example, the communication system 100 may determine the minimum capacity of data to be transmitted to the vehicle 200, and may configure the size of time-frequency resource (e.g., time-frequency resource through which the data is to be transmitted) in consideration of the determined minimum capacity, a modulation order, overhead of each layer (e.g., a header overhead, a tail overhead), an IP header compression rate, segmentation, and the like. Here, the time-frequency resource may be configured based on a semi-static scheduling scheme. When the semi-static scheduling scheme is used, the same time-frequency resource may be configured in the data region for each subframe (e.g., TTI). Also, operations for subframe synchronization and content synchronization (e.g., subframe synchronization and content synchronization in the plurality of TSUs 120 controlled and management by the CCU 110) may be performed for each subframe (e.g., TTI).

The communication system 100 may transmit semi-static scheduling information for the determined time-frequency resource through the control region, and may use the time-frequency resource indicated by the semi-static scheduling information in the data region to transmit data (e.g., data unit). The semi-static scheduling operation described above may be performed by the CCU 110 in the communication system 100, and the CCU 110 may control and manage the plurality of TSUs 120 connected to the CCU 110 so that the content is synchronized for each subframe (e.g., TTI).

Figure 16:
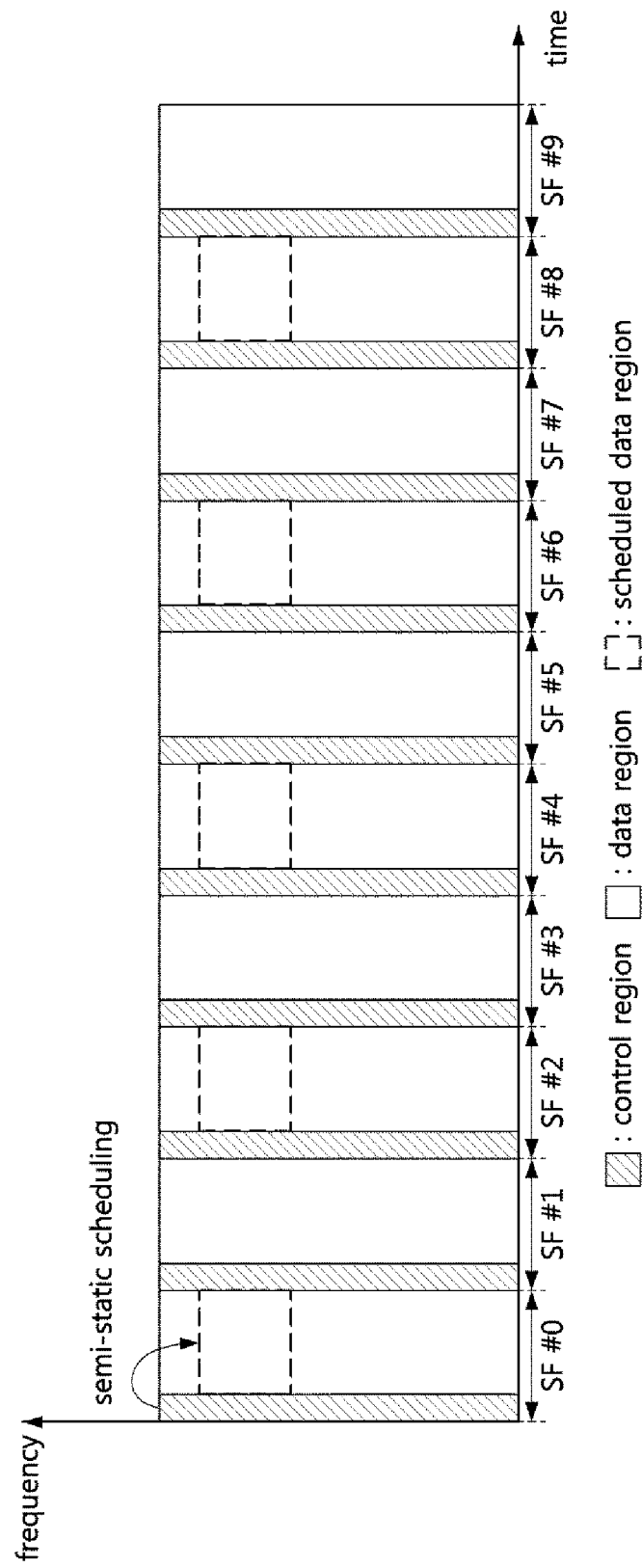
FIG. 16 is a conceptual diagram illustrating a second embodiment of a downlink resource allocation method in a communication system.
Figure 17:
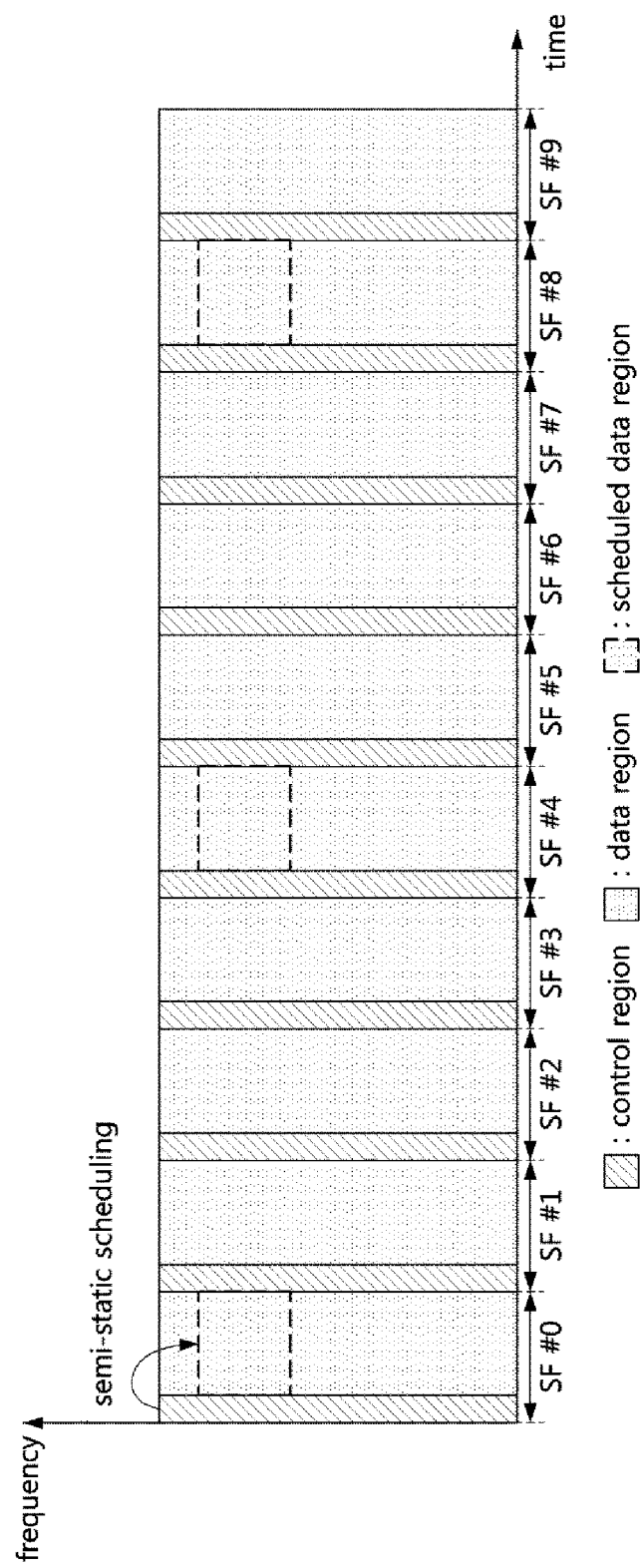
FIG. 17 is a conceptual diagram illustrating a third embodiment of a downlink resource allocation method in a communication system.
Figure 18:
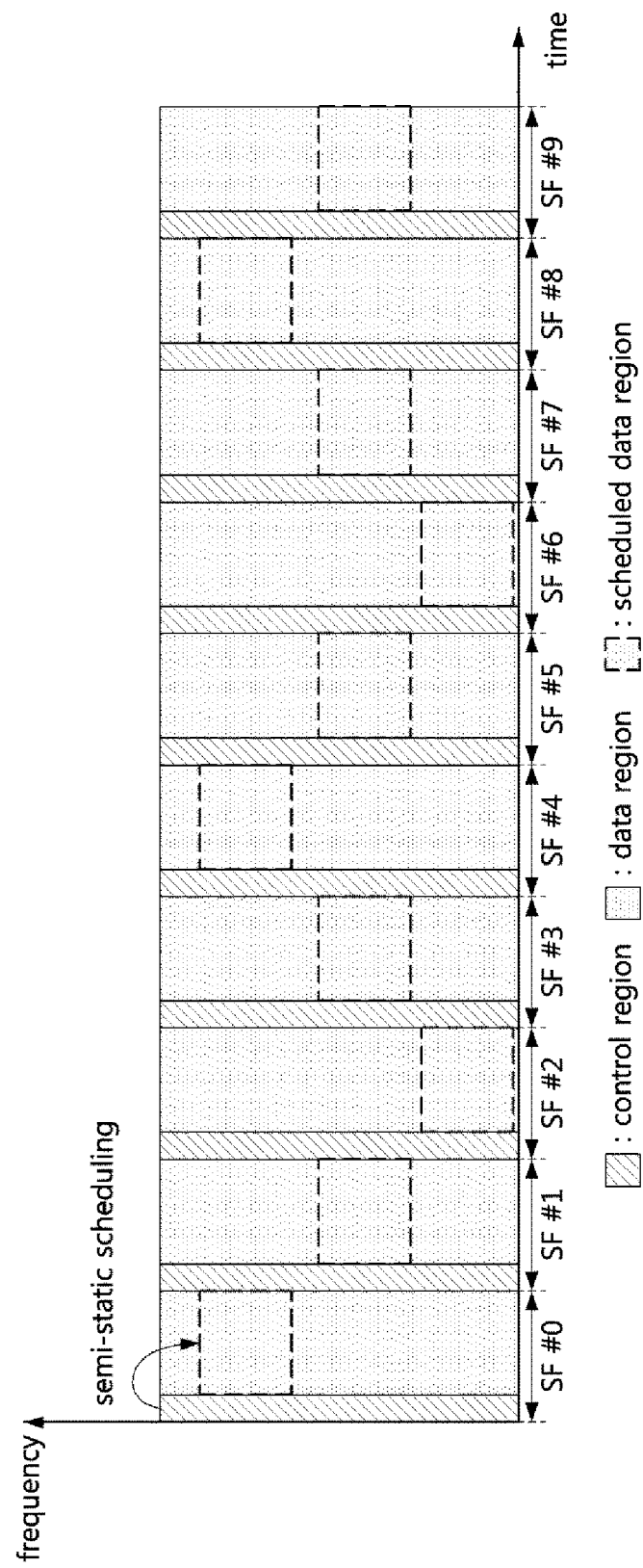
FIG. 18 is a conceptual diagram illustrating a fourth embodiment of a downlink resource allocation method in a communication system.
Figure 19:
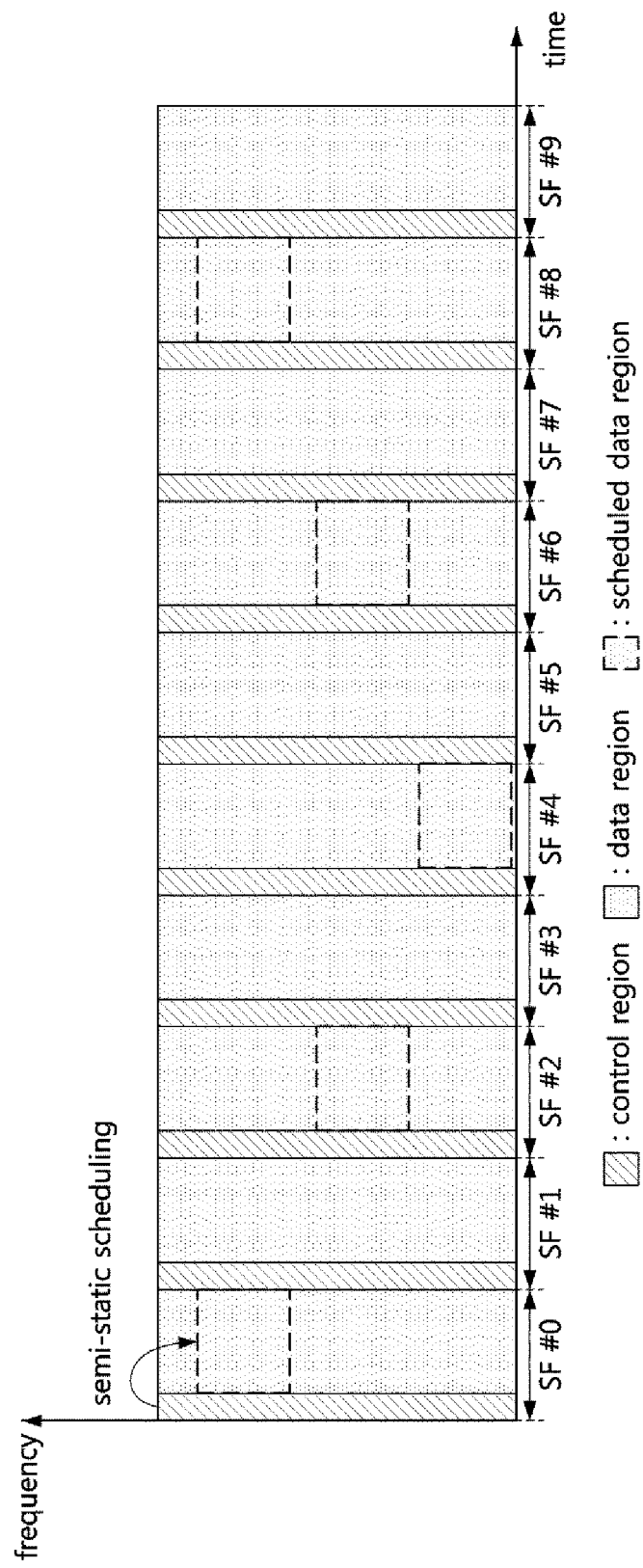
FIG. 19 is a conceptual diagram illustrating a fifth embodiment of a downlink resource allocation method in a communication system.

FIG. 16 is a conceptual diagram illustrating a second embodiment of a downlink resource allocation method in a communication system, FIG. 17 is a conceptual diagram illustrating a third embodiment of a downlink resource allocation method in a communication system, FIG. 18 is a conceptual diagram illustrating a fourth embodiment of a downlink resource allocation method in a communication system, and FIG. 19 is a conceptual diagram illustrating a fifth embodiment of a downlink resource allocation method in a communication system.

Referring to FIGS. 16 to 19, when the semi-static scheduling scheme is used, the communication system 100 (e.g., the CCU 110 of the communication system 100) may perform the operations for subframe synchronization and content synchronization for one, two, or four TTIs. Also, the CCU 110 may allocate a time-frequency resource within the data region based on a frequency hopping scheme. A hopping pattern may be preconfigured between the communication system 100 and the vehicle 200, and the CCU 110 may perform the semi-static scheduling operation based on the hopping pattern and a TTI periodicity (e.g., a periodicity of a TTI in which a time-frequency resource for data transmission is allocated).

The CCU 110 may perform a semi-static scheduling operation for one vehicle 200 in one sliding window. In this case, the CCU 110 may perform one semi-static scheduling operation for all packets processed by the CCU 110 in terms of user data. Alternatively, the packets processed by the CCU 110 may be logically classified according to type, priority, etc., and the CCU 110 may perform a separate semi-static scheduling operation for each logically classified packet. Further, when the semi-static scheduling operation is performed, control information (e.g., semi-static scheduling information) may be distinguished from data, or the control information and the data may be processed together. When the semi-static scheduling operation is performed, the CCU 110 may allocate sufficient time-frequency resources for the control information and the data even when null padding occurs.

Meanwhile, uplink communication may be performed as follows in the communication system 100.

Figure 20:
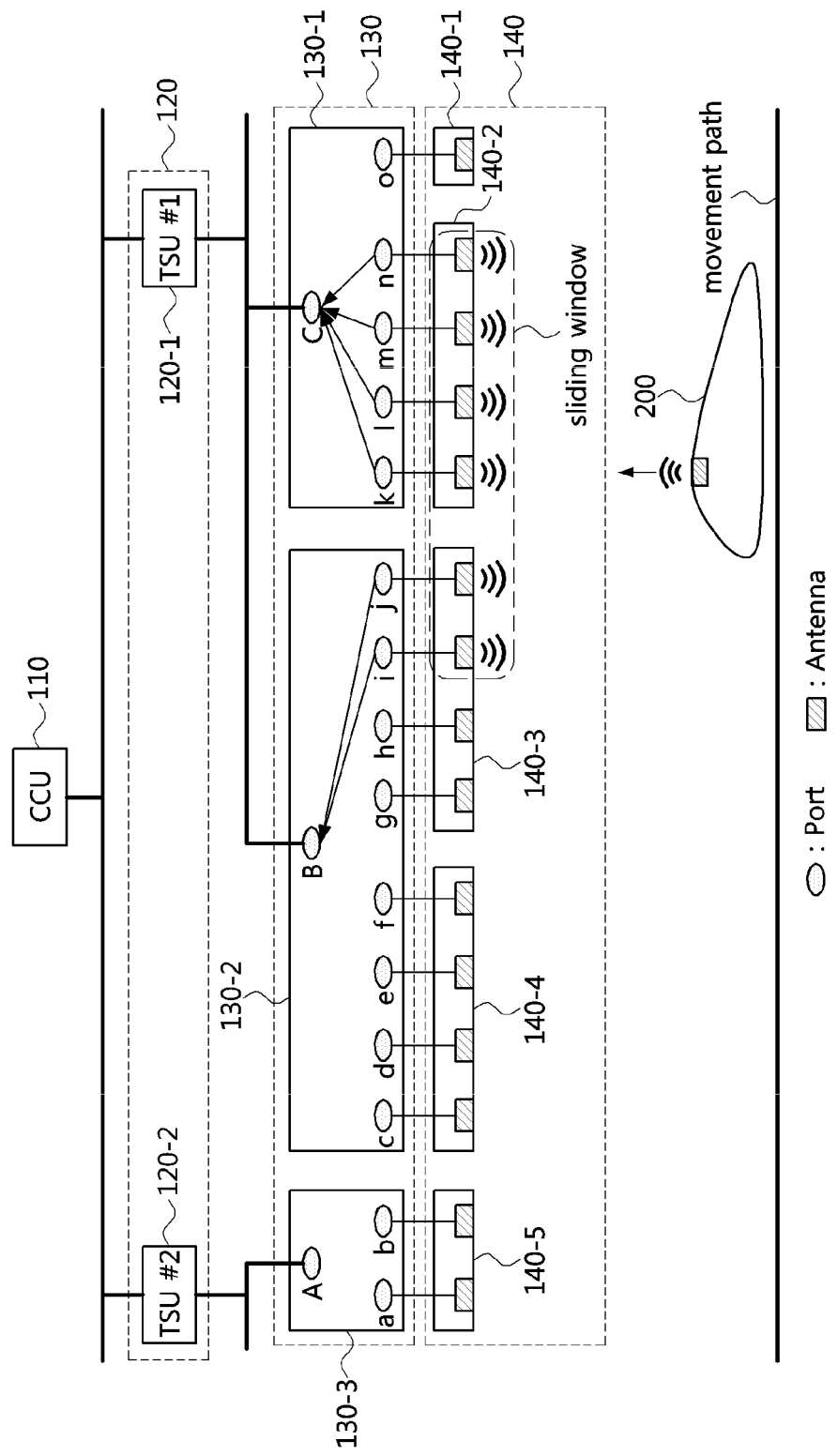
FIG. 20 is a conceptual diagram illustrating a first embodiment of an uplink communication method in a communication system.

FIG. 20 is a conceptual diagram illustrating a first embodiment of an uplink communication method in a communication system.

Referring to FIG. 20, the vehicle 200 may transmit an uplink signal to the communication system 100. When the sliding window includes the antennas corresponding to the ports #i to #n of the VA2C 130, the antennas corresponding to the ports #i to #n of the VA2C 130 may receive the uplink signal of the vehicle 200, and may transmit the received uplink signal and received signal strength information to the corresponding port. In the VA2C 130-1, the uplink signal and the received signal strength information of the vehicle 200 may be transmitted from the ports #k to #n to the port #C, and in the VA2C 130-2, the uplink signal and the received signal strength information of the vehicle 200 may be transmitted from the ports #i to #j to the port #B.

Meanwhile, even when a cyclic redundancy check (CRC) check for the uplink signal is successful, if the received signal strength of the uplink signal is less than a threshold value, the uplink signal may not be transmitted to the upper entity (e.g., TSU 120). When the A1-UP, A4-UP, or A7-UP shown in FIG. 14 is used, the RF layer may perform a soft combining operation on the uplink signals.

For example, when the threshold value for the received signal strength is 20 dBm and the received signal strengths of the uplink signals are respectively 21 dBm, 20 dBm, 15 dBm and 14 dBm in the port #k, the port #l, the port #m, and the port #n, the VA2C 130-1 may discard the uplink signals obtained from the ports #m and #n, may generate one uplink signal by performing a soft combining operation on the uplink signals obtained from the ports #k and #l, and may transmit the generated one uplink signal to the TSU 120-1.

Also, when the threshold value for the received signal strength is 20 dBm and the received signal strengths of the uplink signals are respectively 20 dBm and 21 dBm in the port #i and the port #j, the VA2C 130-2 may generate one uplink signal by performing a soft combining operation on the uplink signals obtained from the ports #i and #j, and may transmit the generated one uplink signal and the received signal strength information to the TSU 120-1. On the other hand, when the received signal strengths of the uplink signals are respectively 18 dBm and 21 dBm in the port #i and the port #j, the VA2C 130-2 may discard the uplink signal obtained from the port #i, and may transmit the uplink signal obtained from the port #j and the received signal strength information to the TSU 120-1.

The TSU 120-1 may receive the uplink signals from the VA2C 130-1 and the VA2C 130-2. Also, the TSU 120-1 may receive the received signal strength information of the uplink signals from the VA2C 130-1 and the VA2C 130-2. The TSU 120-1 may select an uplink signal having the largest received signal strength among the two uplink signals, and may transmit the selected uplink signal to the CCU 110. Alternatively, the TSU 120-1 may select an uplink signal having the smallest error rate among the two uplink signals, and may transmit the selected uplink signal to the CCU 110.

On the other hand, it may not be easy to perform the soft combining operation in the A2-UP, A3-UP, A5-UP, A6-UP, A8-UP and A9-UP. For example, when the uplink signals and the received signal strength information are obtained from the port #k, the port #l, the port #m, and the port #n of the VA2C 130-1, the VA2C 130-1 may discard uplink signals having a received signal strength lower than the threshold value among the uplink signals, and may select at least one uplink signal having a received signal strength higher than the threshold value among the uplink signals. The VA2C 130-1 may finally select an uplink signal having the largest received signal strength among the selected at least one uplink signal, and may transmit the selected uplink signal and the received signal strength information of the selected uplink signal to the TSU 120-1.

Also, when the uplink signals and the received signal strength information are obtained from the port #i and the port #j of the VA2C 130-2, the VA2C 130-2 may discard uplink signals having a received signal strength lower than the threshold value among the uplink signals, and may select at least one uplink signal having a received signal strength higher than the threshold value among the uplink signals. The VA2C 130-2 may finally select an uplink signal having the largest received signal strength among the selected at least one uplink signal, and may transmit the selected uplink signal and the received signal strength information of the selected uplink signal to the TSU 120-1.

The TSU 120-1 may receive the uplink signals from the VA2C 130-1 and the VA2C 130-2. Also, the TSU 120-1 may receive the received signal strength information of the uplink signals from the VA2C 130-1 and the VA2C 130-2. The TSU 120-1 may select an uplink signal having the largest received signal strength from the two uplink signals, and may transmit the selected uplink signal to the CCU 110. Alternatively, the TSU 120-1 may select an uplink signal having the smallest error rate among the two uplink signals, and may transmit the selected uplink signal to the CCU 110.

Figure 21:
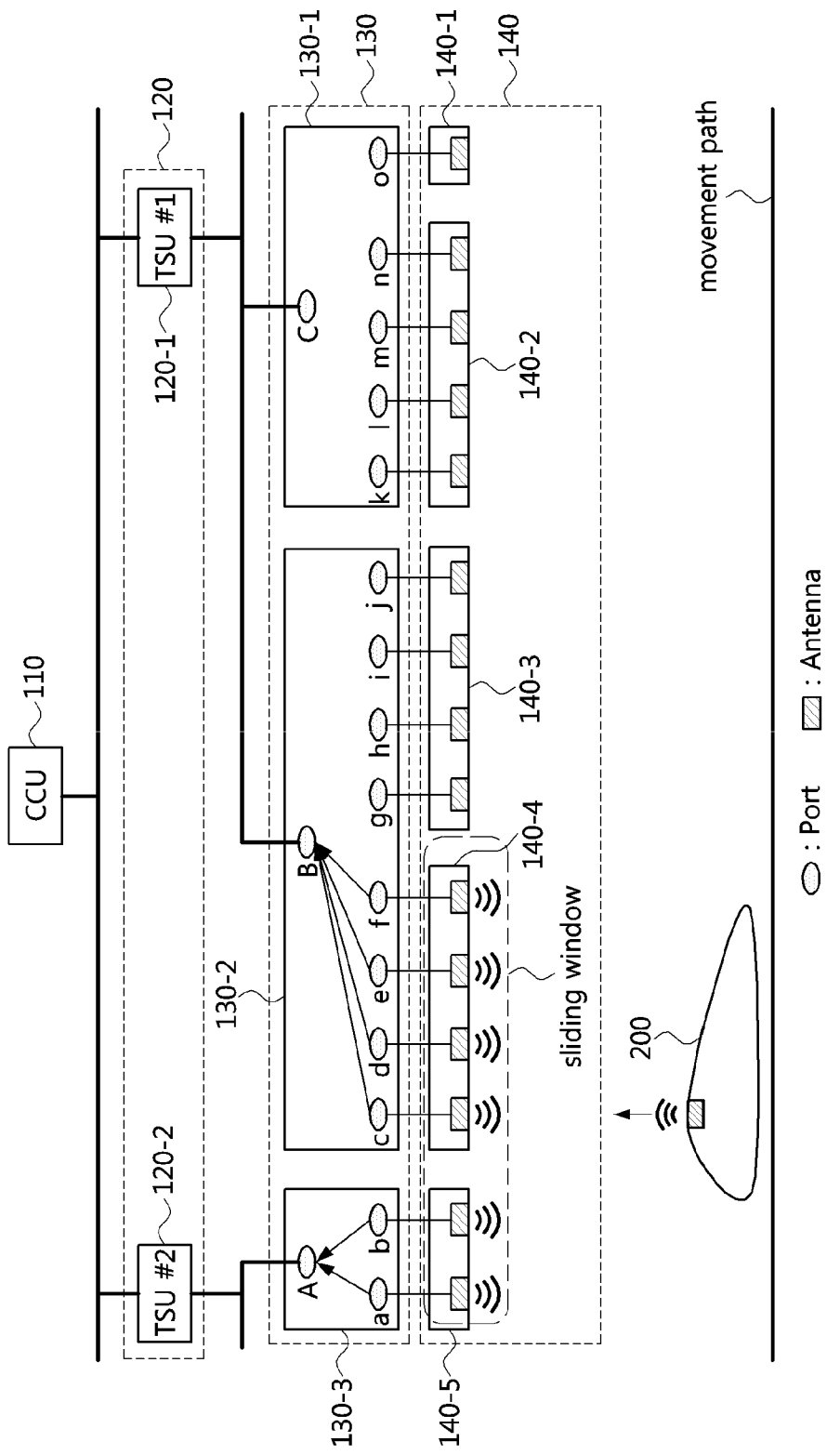
FIG. 21 is a conceptual diagram illustrating a second embodiment of an uplink communication method in a communication system.

FIG. 21 is a conceptual diagram illustrating a second embodiment of an uplink communication method in a communication system.

Referring to FIG. 21, the vehicle 200 may transmit an uplink signal to the communication system 100. When the sliding window includes the antennas corresponding to the ports #a to #f of the VA2C 130, the antennas corresponding to the ports #a to #f of the VA2C 130 may receive the uplink signal of the vehicle 200, and may transmit the received uplink signals and received signal strength information to the corresponding port. In the VA2C 130-2, the uplink signal and the received signal strength information of the vehicle 200 may be transmitted from the ports #c to #f to the port #B, and in the VA2C 130-3, the uplink signal and the received signal strength information of the vehicle 200 may be transmitted from the ports #a to #b to the port #A.

The procedure of processing the uplink signals in the communication system 100 of FIG. 21 may be the same as or similar to the procedure of processing the uplink signal in the communication system 100 of FIG. 20 described above. However, the number of uplink signals received at the CCU 110 of FIG. 21 may be two. For example, the TSU 120-1 may transmit the uplink signal obtained from the VA2C 130-2 to the CCU 110, and the TSU 120-2 may transmit the uplink signal obtained from the VA2C 130-3 to the CCU 110. Also, the TSU 120-1 and the TSU 120-2 may transmit the received signal strength information on the uplink signal to the CCU 110.

Accordingly, the CCU 110 may receive the uplink signals and the received signal strength information from the TSU 120-1 and the TSU 120-2, and may select an uplink signal having the highest received signal strength among the two uplink signals. Alternatively, the CCU 110 may select an uplink signal having the smallest error rate among the two uplink signals.

Meanwhile, the performance of the uplink communication described with reference to FIGS. 20 and 21 may be lower than the performance of the downlink communication based on the JT scheme. However, a joint reception (JR) scheme may be used in the A1-UP of FIG. 14, and the performance of the uplink communication may be improved in this case. For example, some of the uplink signals may be processed based on the JR scheme, and the JR scheme may not be applied to the remaining uplink signals.

Meanwhile, uplink resources used for uplink communication in the communication system 100 may be allocated as follows.

Figure 22:
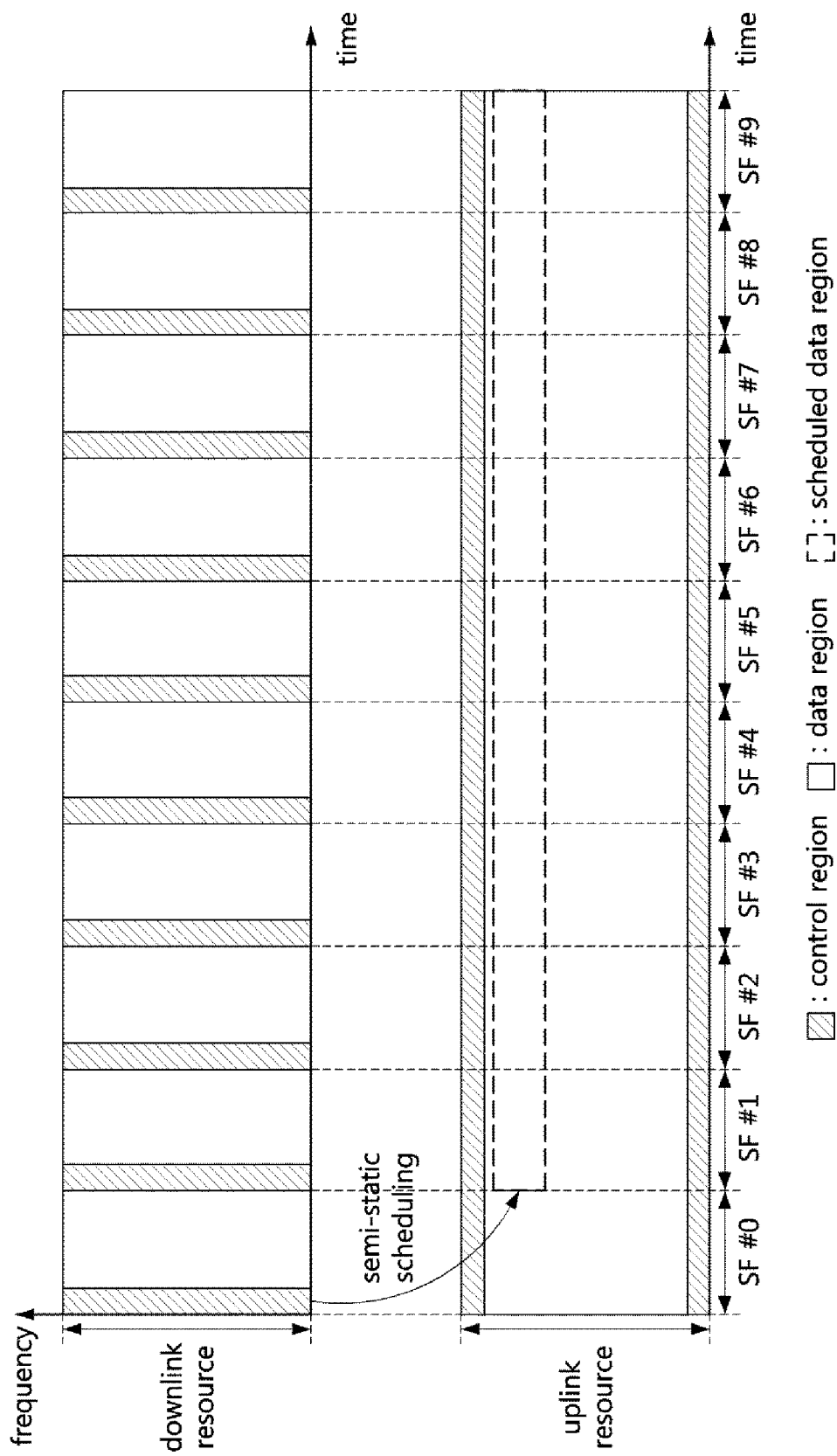
FIG. 22 is a conceptual diagram illustrating a first embodiment of an uplink resource allocation method in a communication system.
Figure 23:
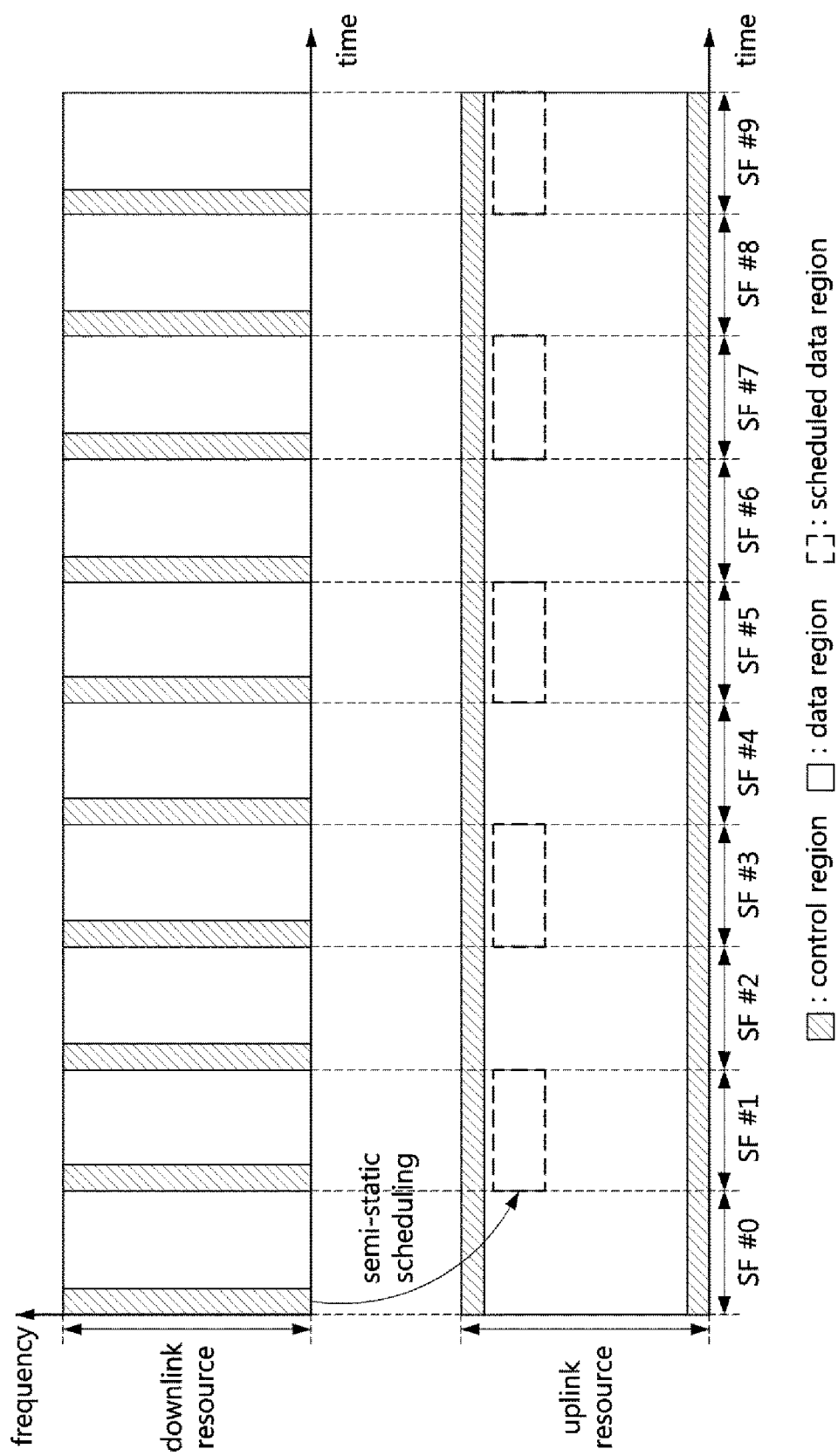
FIG. 23 is a conceptual diagram illustrating a second embodiment of an uplink resource allocation method in a communication system.
Figure 24:
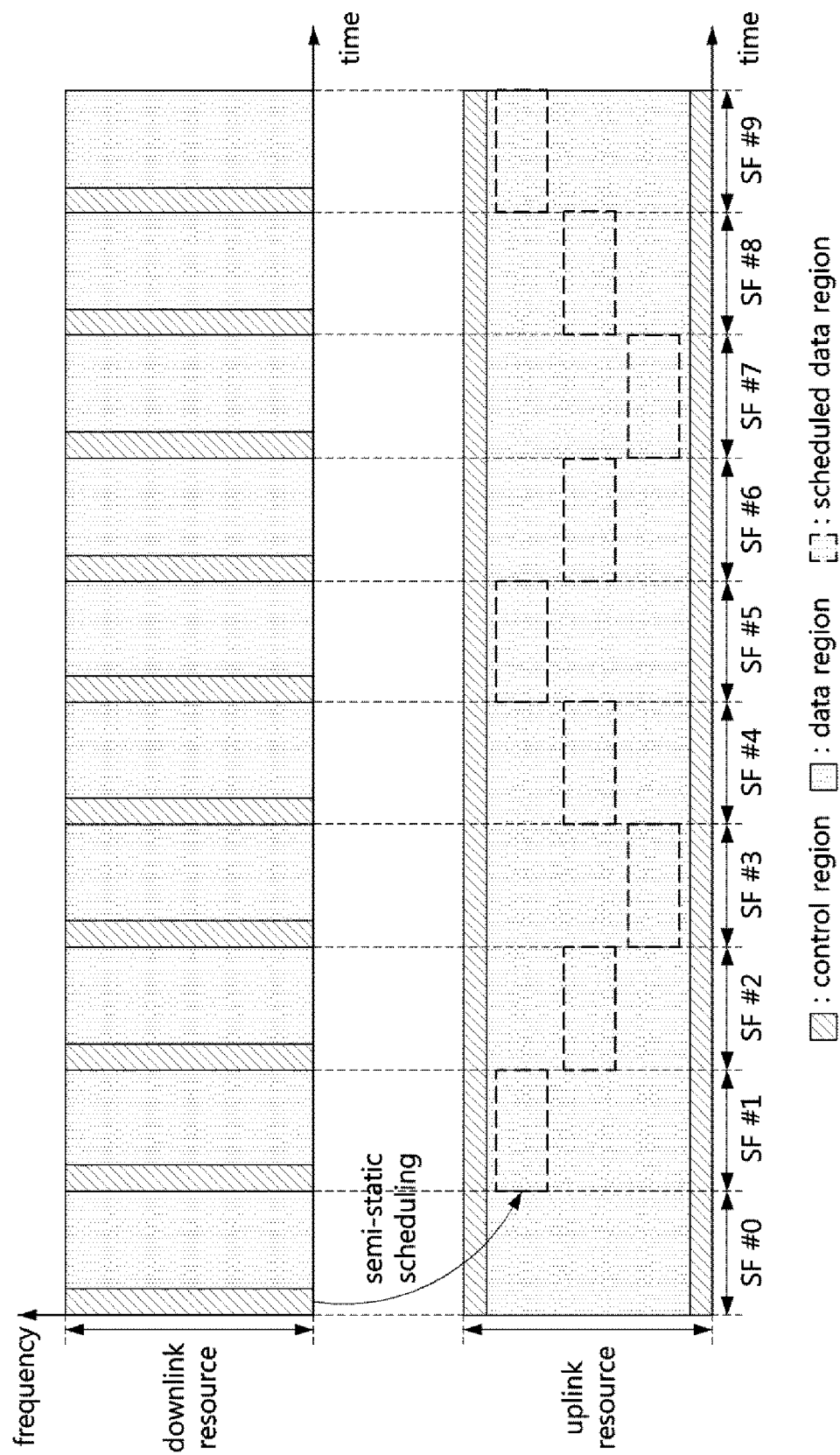
FIG. 24 is a conceptual diagram illustrating a third embodiment of an uplink resource allocation method in a communication system.
Figure 25:
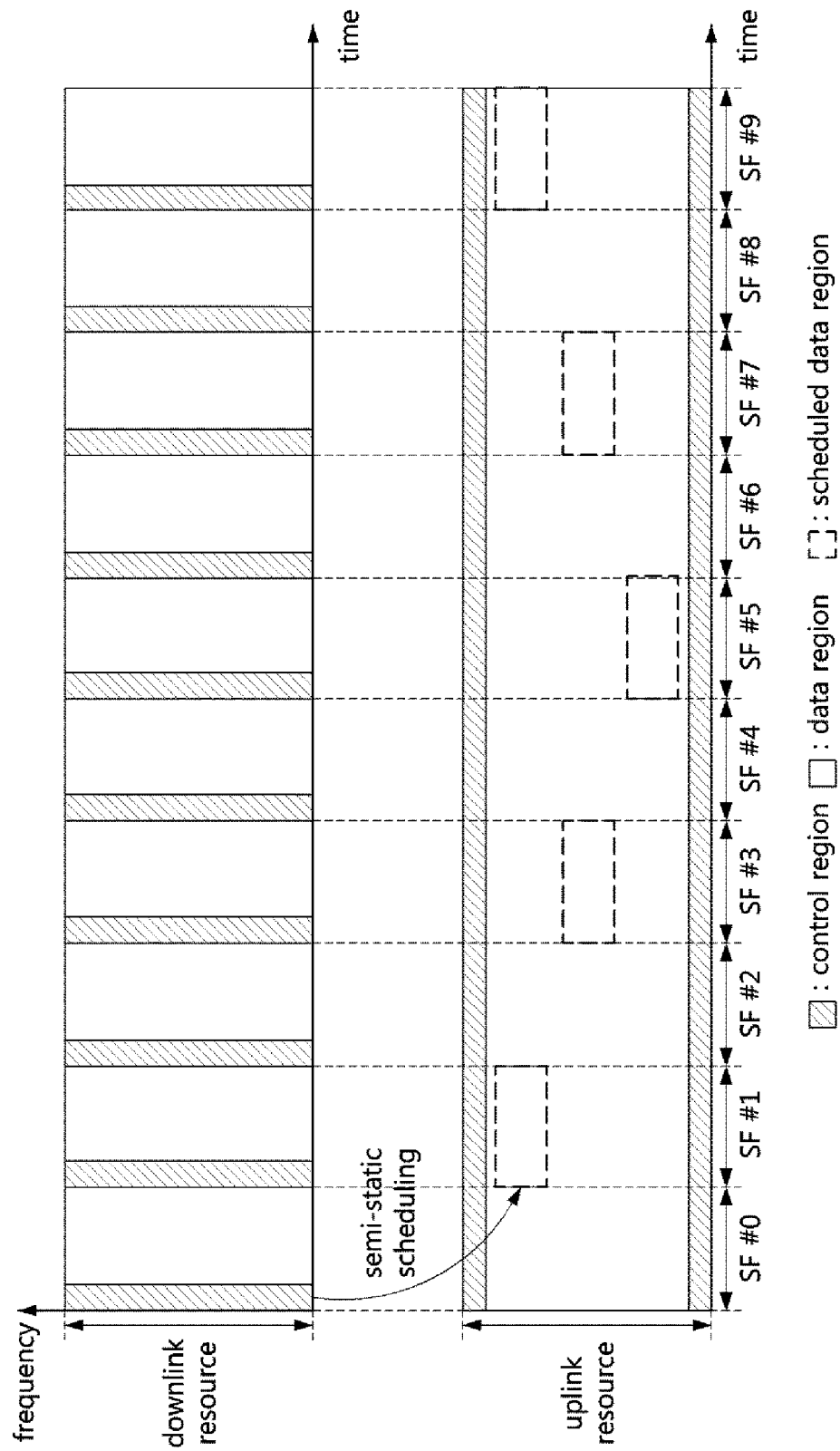
FIG. 25 is a conceptual diagram illustrating a fourth embodiment of an uplink resource allocation method in a communication system.

FIG. 22 is a conceptual diagram illustrating a first embodiment of an uplink resource allocation method in a communication system, FIG. 23 is a conceptual diagram illustrating a second embodiment of an uplink resource allocation method in a communication system, FIG. 24 is a conceptual diagram illustrating a third embodiment of an uplink resource allocation method in a communication system, and FIG. 25 is a conceptual diagram illustrating a fourth embodiment of an uplink resource allocation method in a communication system.

Referring to FIGS. 22 to 25, a CP-CCU (e.g., CCU 110) in the communication system 100 may perform a semi-static scheduling operation for uplink resources. The semi-static scheduling operation may be performed when a request for scheduling uplink resources is received from the vehicle 200. The semi-static scheduling information of the uplink resource may be transmitted through a control region of a downlink subframe, and may be semi-static scheduling information for uplink subframes located after a predetermined number of TTIs in the time axis from a subframe in which the semi-static scheduling information of the uplink resource is transmitted. For example, semi-static scheduling information for uplink subframes #1 to #9 may be received through a downlink subframe #0. The semi-static scheduling information may indicate the same frequency resource for each uplink sub-frame. Alternatively, the semi-static scheduling information may indicate a resource configured based on a frequency hopping scheme in an uplink subframe. The resource allocation procedure within the sliding window may be performed individually according to the type (e.g., control information, data), the priority, etc. of the packet.

Meanwhile, a radio bearer (RB) may be configured for communication between the communication system 100 and the vehicle 200, and communication between the communication system 100 and the vehicle 200 may be performed using the configured RB. The RB may be configured as follows.

Figure 26:
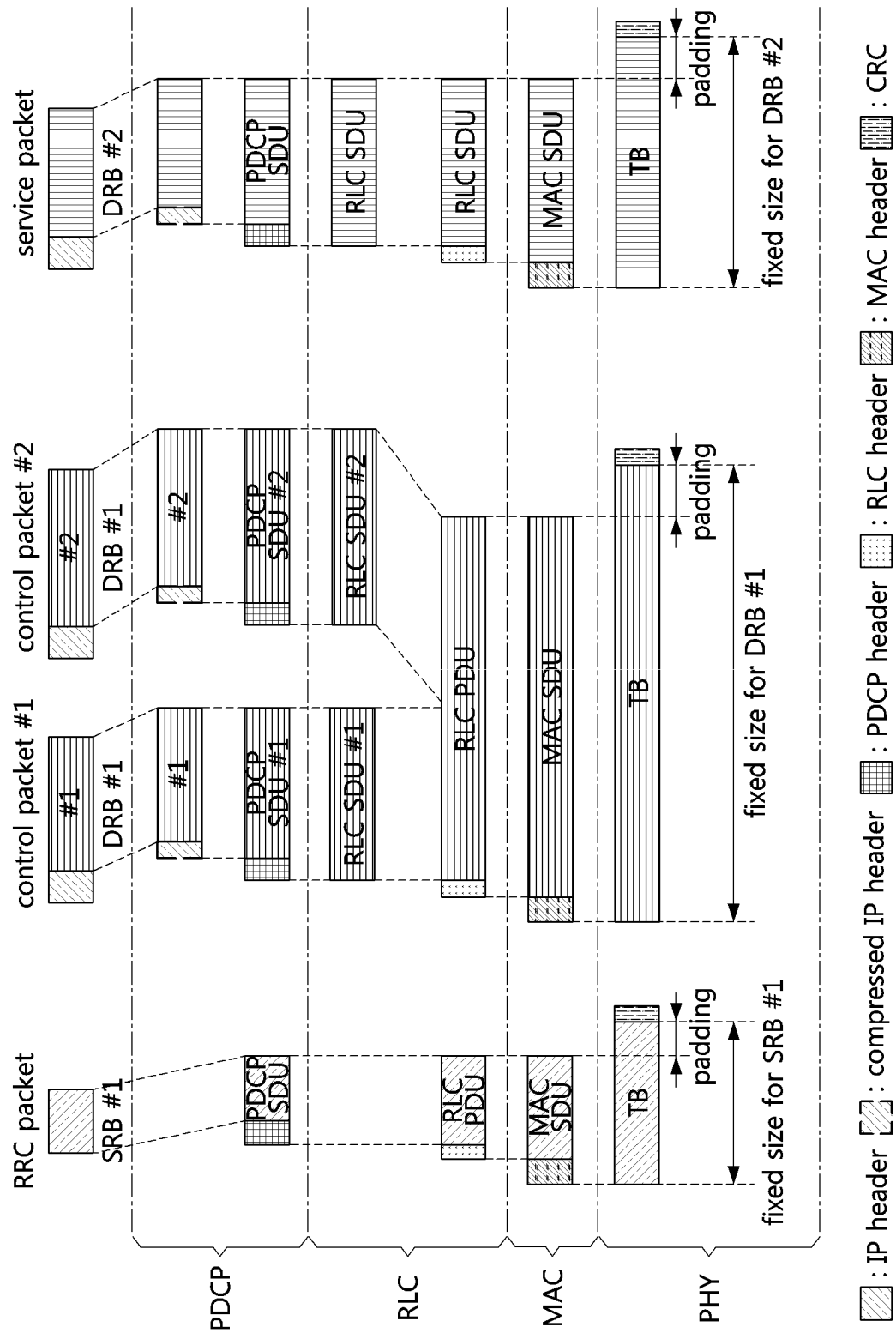
FIG. 26 is a conceptual diagram illustrating a first embodiment of a message generation procedure per RB in a communication system.
Figure 27:
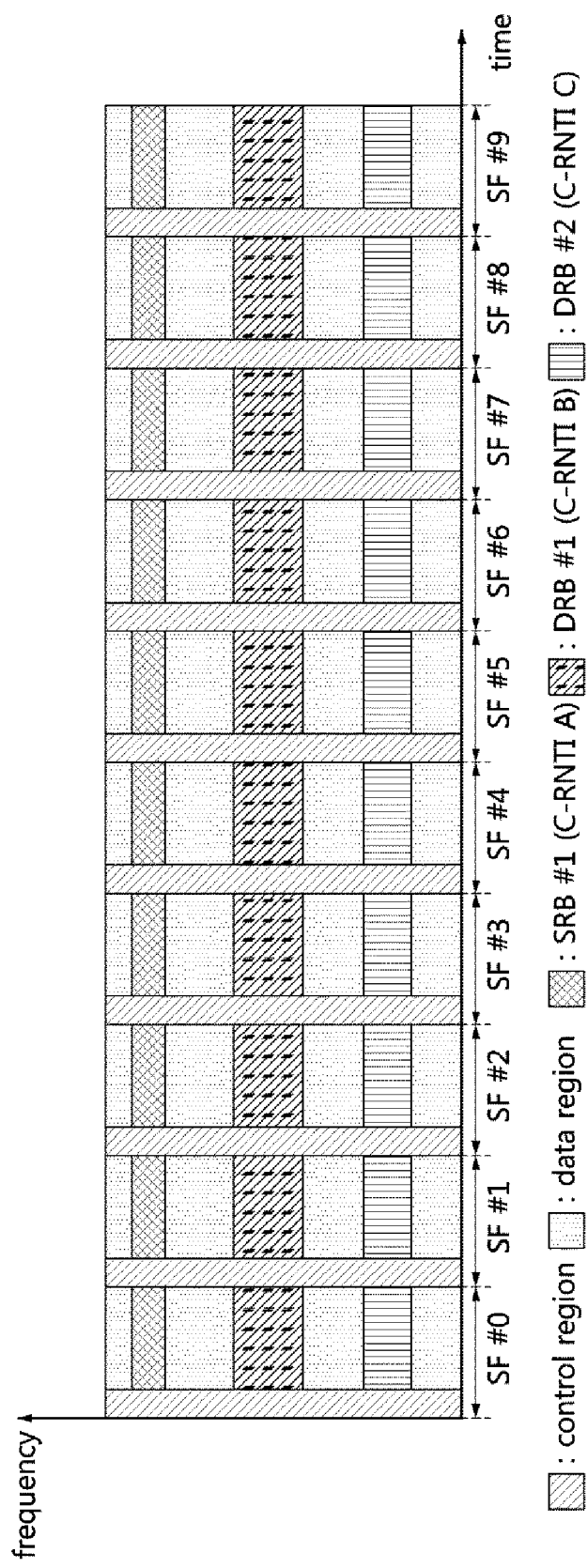
FIG. 27 is a conceptual diagram illustrating a first embodiment of a downlink resource to which an RB are allocated in a communication system.

FIG. 26 is a conceptual diagram illustrating a first embodiment of a message generation procedure per RB in a communication system, and FIG. 27 is a conceptual diagram illustrating a first embodiment of a downlink resource to which an RB are allocated in a communication system.

Referring to FIGS. 26 and 27, a signaling radio bearer (SRB) and a dedicated radio bearer (DRB) may be configured for communications between the communication system 100 and the vehicle 200. Here, a control packet may be control information related to the operation of the vehicle 200, and a service packet may be user data for a passenger (e.g., a terminal carried by the passenger) aboard the vehicle 200. An SRB #1 may be used to inform resource allocation information (e.g., semi-static scheduling information) for communication between the communication system 100 and the vehicle 200. RBs used to inform the resource allocation information may not be classified into the SRB #1 and an SRB #2. For example, one SRB #1 may be used in the communication system 100.

Alternatively, even when the SRB #1 and the SRB #2 are used in the communication system 100, the SRB #1 and the SRB #2 may be integrated into one SRB, and the integrated SRB may be used. A cell-radio network temporary identifier (C-RNTI) A may be configured for the SRB #1, and resources for the SRB #1 may be allocated based on the C-RNTI A. For example, resources for the SRB #1 may be scheduled for each subframe based on the C-RNTI A. Alternatively, resources for the SRB #1 may be allocated based on the C-RNTI A in a semi-static scheduling manner.

IP packets may be used in communication between the communication system 100 and the vehicle 200, and when the IP packet can be processed in one TTI, a plurality of RLC service data units (SDUs) may be concatenated in the DRB #1. The DRB #1 may be used for transmission of the control packet of the vehicle 200. A C-RNTI B may be configured for the DRB #1, and resources for the DRB #1 may be allocated based on the C-RNTI B. For example, resources for the DRB #1 may be scheduled for each subframe based on the C-RNTI B. Alternatively, resources for the DRB #1 may be allocated based on the C-RNTI B in a semi-static scheduling manner.

The DRB #2 may be used for transmission of the service packet for the passenger boarding the vehicle 200. A C-RNTI C may be configured for the DRB #2, and resources for the DRB #2 may be allocated based on the C-RNTI C. For example, resources for the DRB #2 may be scheduled for each subframe based on the C-RNTI C. Alternatively, resources for the DRB #2 may be allocated based on the C-RNTI C in a semi-static scheduling manner.

A plurality of C-RNTIs (e.g., C-RNTI A, C-RNTI B, and C-RNTI C) may be configured for one vehicle 200 in communication between the communication system 100 and the vehicle 200, and resources may be scheduled based on the plurality of C-RNTIs. For example, a plurality of C-RNTIs may be configured for the respective RBs. In addition, the maximum TB (e.g., the maximum RB to be predicted) may be fixedly allocated for each RB. If there is no packet to be transmitted through the fixedly allocated TB, the corresponding TB may be processed based on an all zero padding scheme or a muting scheme. The TB allocation periodicity and the scheduling periodicity may be determined by considering the frequency of occurrence of packet, a latency requirement, and the like for each RB.

Figure 28:
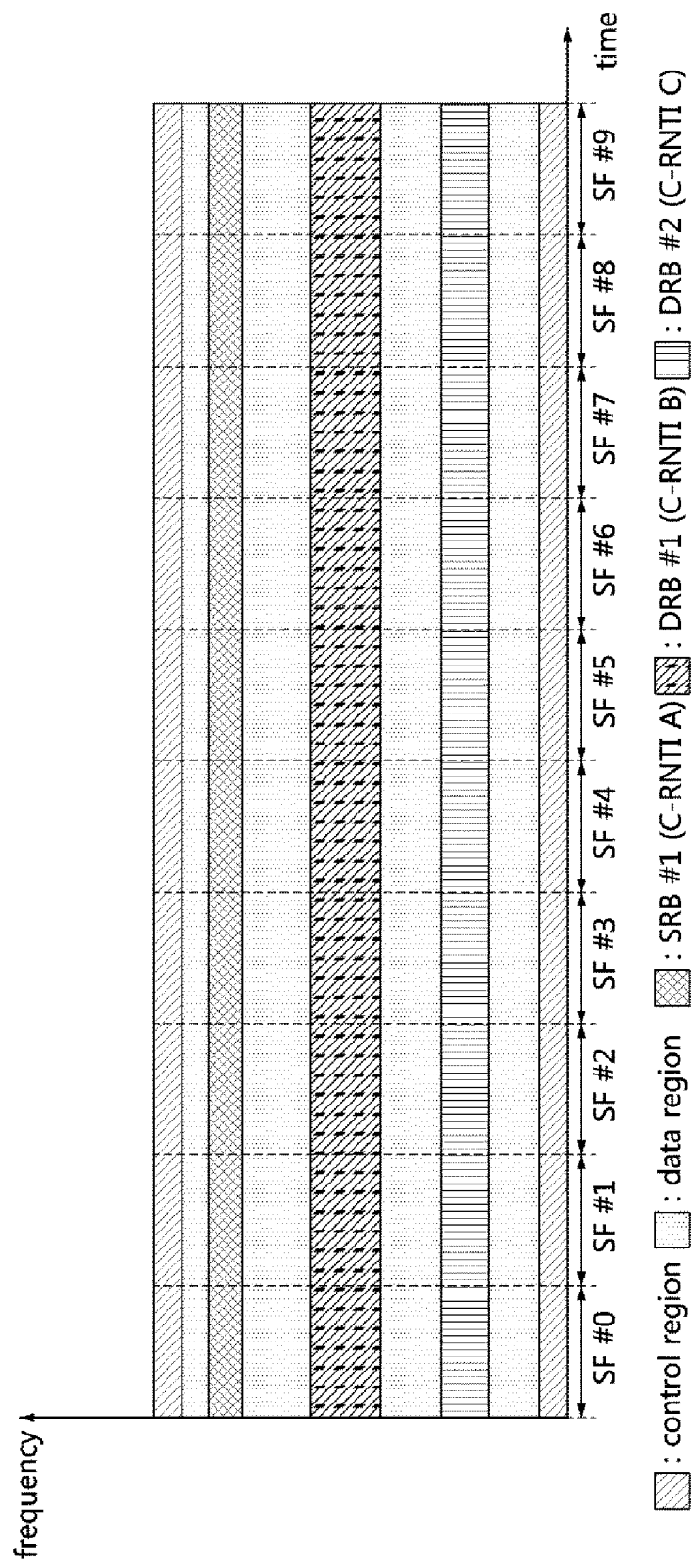
FIG. 28 is a conceptual diagram illustrating a first embodiment of an uplink resource to which an RB is allocated in a communication system.

FIG. 28 is a conceptual diagram illustrating a first embodiment of an uplink resource to which an RB is allocated in a communication system.

Referring to FIG. 28, C-RNTI A may be configured for the SRB #1 (or SRB #2), and uplink resources for the SRB #1 (or SRB #2) may be allocated based on the C-RNTI A. For example, resources for the SRB #1 (or SRB #2) may be scheduled for each subframe based on the C-RNTI A, and scheduling information for the SRB #1 (or SRB #2) may be transmitted through a control region for each downlink subframe. Alternatively, resources for the SRB #1 (or SRB #2) may be allocated based on the C-RNTI A in a semi-static scheduling manner, and scheduling information for the SRB #1 (or SRB #2) may be transmitted through a control region of one downlink subframe.

C-RNTI B may be configured for the DRB #1, and uplink resources for the DRB #1 may be allocated based on the C-RNTI B. For example, resources for the DRB #1 may be scheduled for each subframe based on the C-RNTI B, and scheduling information for the DRB #1 may be transmitted through a control region for each downlink subframe. Alternatively, resources for the DRB #1 may be allocated based on the C-RNTI B in a semi-static scheduling manner, and scheduling information for the DRB #1 may be transmitted through a control region of one downlink subframe.

C-RNTI C may be configured for the DRB #2, and uplink resources for the DRB #2 may be allocated based on the C-RNTI C. For example, resources for the DRB #2 may be scheduled for each subframe based on the C-RNTI C, and scheduling information for the DRB #2 may be transmitted through a control region for each downlink subframe. Alternatively, resources for the DRB #2 may be allocated based on the C-RNTI C in a semi-static scheduling manner, and scheduling information for the DRB #2 may be transmitted through a control region of one downlink subframe.

The uplink packet may be received in the communication system 100 through the SRB #1, the DRB #1 and the DRB #2, and the uplink packet received in the communication system 100 may be processed by the PHY layer, the MAC layer, the RLC layer and the PDCP layer in FIG. 26. For example, the uplink packet may be processed in the order of 'PHY layer→MAC layer→RLC layer→PDCP layer', and a CRC related operation, a header removing operation, a data unit separating operation, or the like may be performed in each of the layers.

Meanwhile, when the RLC AM is used, a downlink retransmission method between the communication system 100 and the vehicle 200 may be performed as follows.

Figure 29:
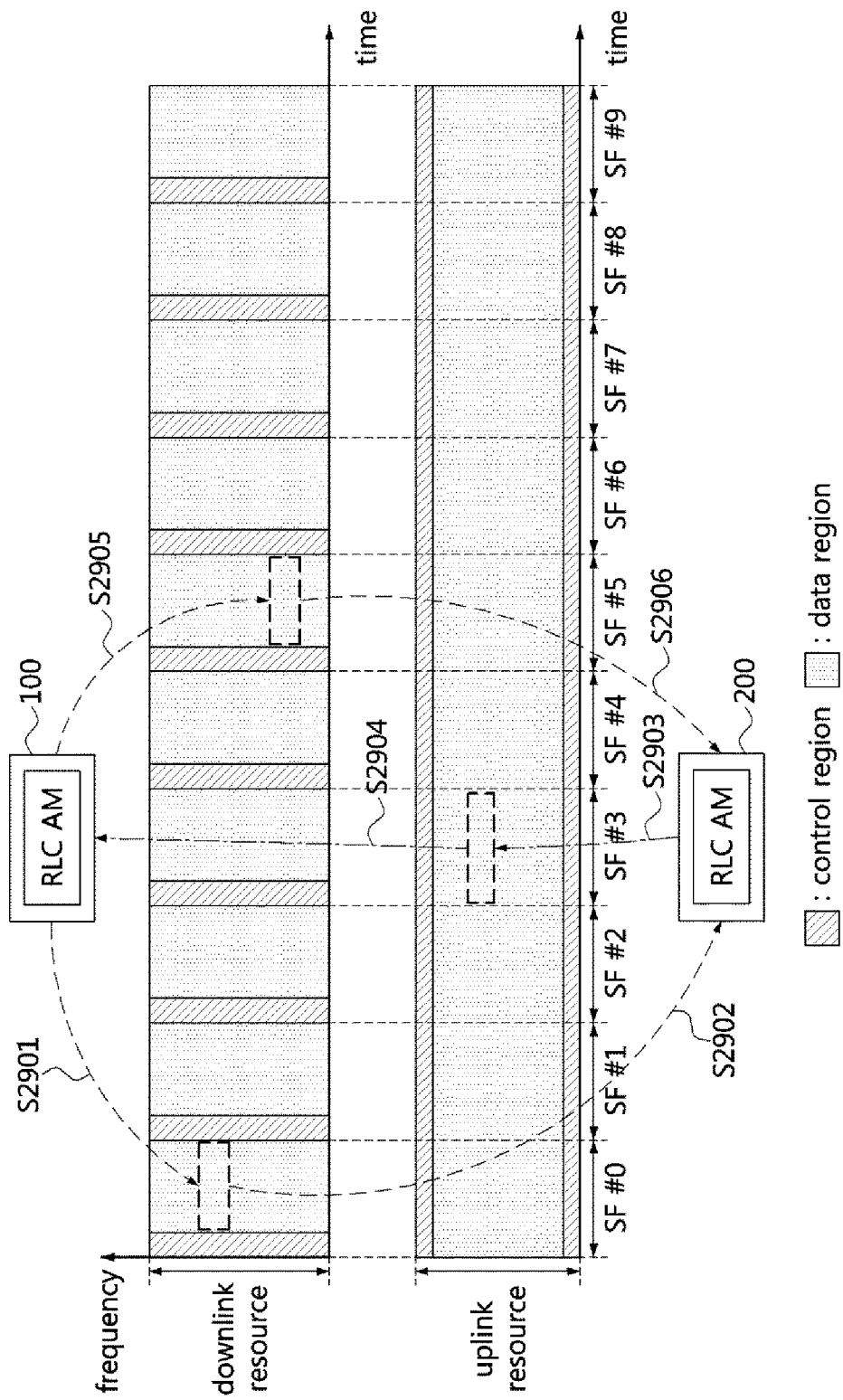
FIG. 29 is a conceptual diagram illustrating a first embodiment of a downlink retransmission method when RLC AM is used.

FIG. 29 is a conceptual diagram illustrating a first embodiment of a downlink retransmission method when RLC AM is used.

Referring to FIG. 29, when the RLC AM is used, a plurality of C-RNTIs may be configured for one DRB. When a downlink signal is transmitted through the DRB, a C-RNTI (e.g., C-RNTI B) for initial transmission of the downlink signal may be configured, a C-RNTI (e.g., C-RNTI D) for a response message (e.g., an RLC status message) for the downlink signal may be configured, and a C-RNTI (e.g., C-RNTI E) for retransmission of the downlink signal may be configured. That is, in the downlink communication procedure, one C-RNTI used for the initial transmission of the downlink signal may be configured, and two C-RNTIs, which are used for the RLC status message and the retransmission procedure of the downlink signal, may be configured. Therefore, three C-RNTIs may be configured for the DRB to which the RLC AM is applied. Alternatively, one C-RNTI may be configured for the downlink communication procedure (e.g., the RB of the RLC AM), a resource for the initial transmission of the downlink signal, a resource for the RLC status message, and a resource for the retransmission of the downlink signal may be configured based on the one C-RNTI.

Here, the maximum TB (e.g., the maximum RB to be predicted) may be allocated in one TTI according to a predetermined periodicity (e.g., 1, 2, or 4 TTI), and an operation of adding zero padding may be performed when the size of data to be transmitted is smaller than the size of the allocated TB. A semi-static scheduling operation for the initial transmission, a semi-static scheduling operation for the RLC status message transmission, and a semi-static scheduling operation for the retransmission may be performed.

In step S2901, the communication system 100 may transmit a TB including a downlink signal using a resource (e.g., SF #0) of the DRB, which is scheduled by the C-RNTI B. In step S2902, the vehicle 200 may receive the TB in the SF #0, and may identify an RLC protocol data unit (PDU) based on the received TB. The vehicle 200 may generate an RLC status message (e.g., ACK message, NACK message) based on a reception status of the RLC PDU. When the RLC PDU has not been successfully received, the vehicle 200 may generate an RLC status message indicating NACK. In step S2903, the vehicle 200 may transmit the RLC status message indicating NACK using a resource (e.g., SF #3) of the DRB, which is scheduled by the C-RNTI D. Here, the C-RNTI D may be signaled from the communication system 100 to the vehicle 200 through a control region of a downlink subframe.

In step S2904, the communication system 100 may receive the RLC status message in the SF #3. When the RLC status message indicates NACK, the communication system 100 may identify an RLC PDU corresponding to the NACK among RLC PDUs located in a retransmission buffer, and perform a retransmission procedure for the identified RLC PDU. For example, in step S2905, the communication system 100 may perform a retransmission procedure using a resource (e.g., SF #5) of the DRB, which is scheduled by the C-RNTI E. In step S2906, the vehicle 200 may receive the retransmitted RLC PDU through the SF #5.

As described above, the C-RNTI B for the initial transmission, the C-RNTI D for the transmission of the RLC status message, and the C-RNTI E for the retransmission are independently configured, whereby the downlink resource for initial transmission, the uplink resource for transmission of the status message, and the downlink resource for retransmission may be allocated in the semi-static scheduling manner. Thus, when the JT scheme or the JR scheme is used, content (e.g., content in TSUs) can be easily synchronized.

Meanwhile, when the RLC AM is used, an uplink retransmission method between the communication system 100 and the vehicle 200 may be performed as follows.

Figure 30:
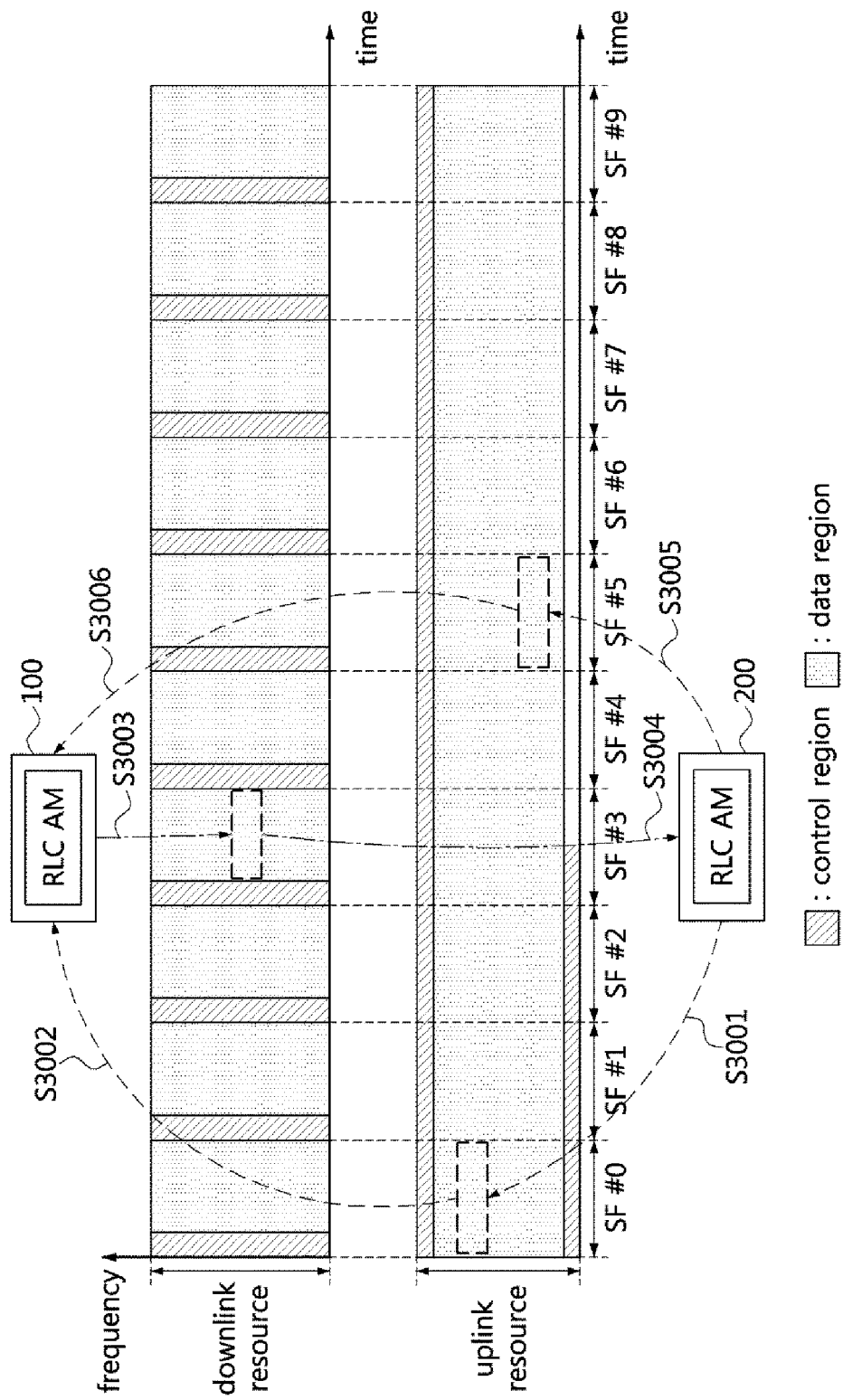
FIG. 30 is a conceptual diagram illustrating a first embodiment of an uplink retransmission method when RLC AM is used.

FIG. 30 is a conceptual diagram illustrating a first embodiment of an uplink retransmission method when RLC AM is used.

Referring to FIG. 30, when an uplink signal is transmitted through the DRB, a C-RNTI (e.g., C-RNTI B) for initial transmission of the uplink signal may be configured, a C-RNTI (e.g., C-RNTI D) for a response message (e.g., an RLC status message) for the uplink signal may be configured, and a C-RNTI (e.g., C-RNTI E) for retransmission of the uplink signal may be configured. That is, in the uplink communication procedure, one C-RNTI used for the initial transmission of the uplink signal may be basically configured, and two C-RNTIs, which are used for the RLC status message and the retransmission procedure of the uplink signal, may additionally be configured. Therefore, three C-RNTIs may be configured for the DRB to which the RLC AM is applied. Alternatively, one C-RNTI may be configured for the uplink communication procedure (e.g., the RB of the RLC AM), a resource for the initial transmission of the uplink signal, a resource for the RLC status message, and a resource for the retransmission of the uplink signal may be configured based on the one C-RNTI.

In step S3001, the vehicle 200 may transmit a TB including an uplink signal using a resource (e.g., SF #0) of the DRB, which is scheduled by the C-RNTI B. In step S3002, the communication system 100 may receive the TB in the SF #0, and may identify an RLC PDU based on the received TB. The communication system 100 may generate an RLC status message (e.g., ACK message, NACK message) based on a reception status of the RLC PDU. When the RLC PDU has not been successfully received, the communication system 100 may generate an RLC status message indicating NACK. In step S3003, the communication system 100 may transmit the RLC status message indicating NACK using a resource (e.g., SF #3) of the DRB, which is scheduled by the C-RNTI D. Here, the C-RNTI D may be signaled from the communication system 100 to the vehicle 200 through a control region of a downlink subframe.

In step S3004, the vehicle 200 may receive the RLC status message in the SF #3. When the RLC status message indicates NACK, the vehicle 200 may identify an RLC PDU corresponding to the NACK among RLC PDUs located in a retransmission buffer, and perform a retransmission procedure for the identified RLC PDU. For example, in step S3005, the vehicle 200 may perform a retransmission procedure using a resource (e.g., SF #5) of the DRB, which is scheduled by the C-RNTI E. In step S3006, the communication system 100 may receive the retransmitted RLC PDU through the SF #5.

Method for Synchronizing Communication Nodes in a Communication System

Meanwhile, a synchronization procedure may be performed for communication between the communication system 100 and the vehicle 200. For example, synchronization among the communication nodes 110, 120, 130, and 140 included in the communication system 100 should be established for communication between the communication system 100 and the vehicle 200, and the synchronization procedure among the communication nodes 110, 120, 130, and 140 may be as follows.

Figure 31:
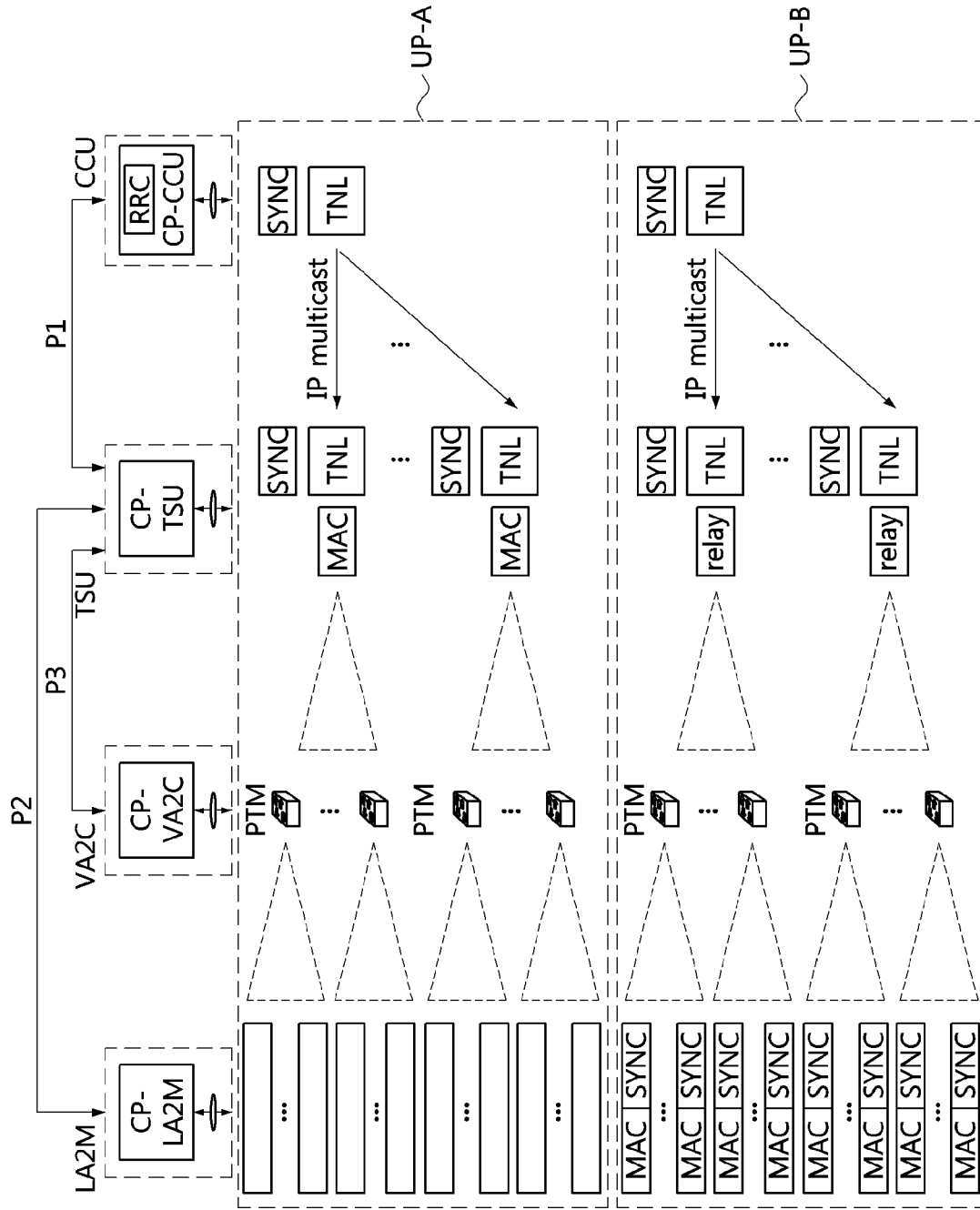
FIG. 31 is a conceptual diagram illustrating a first embodiment of a downlink communication method based on a synchronization protocol.

FIG. 31 is a conceptual diagram illustrating a first embodiment of a downlink communication method based on a synchronization protocol.

Referring to FIG. 31, when downlink communication is performed, a packet transmission order may be 'CCU→TSU→VA2C→LA2M'. In the UP-A (e.g., A1-UP, A2-UP, A4-UP, A5-UP, A7-UP and A8-UP in FIG. 14), the MAC layer may be located in the TSU 120, and the synchronization layer (e.g., synchronization protocol) may be located in the CCU 110 and the TSU 120. In this case, the CCU 110 may transmit a packet (e.g., scheduled data) to the plurality of TSUs 120 based on an IP multicast scheme.

In the UP-B (e.g., A3-UP, A6-UP and A9-UP in FIG. 14), the MAC layer may be located in the LA2M 140, and the synchronization layer (e.g., synchronization protocol) may be located in the CCU 110, TSU 120, and LA2M 140. In this case, the synchronization layer of the CCU 110 may be connected to the synchronization layer of the LA2M 140, and the synchronization layer of the TSU 120 may perform a relay function between the synchronization layer of the CCU 110 and the synchronization layer of the LA2M 140. Also, like the transmission scheme of the UP-A, the CCU 110 may transmit a packet (e.g., scheduled data) to the plurality of TSUs 120 based on an IP multicast scheme.

Figure 32:
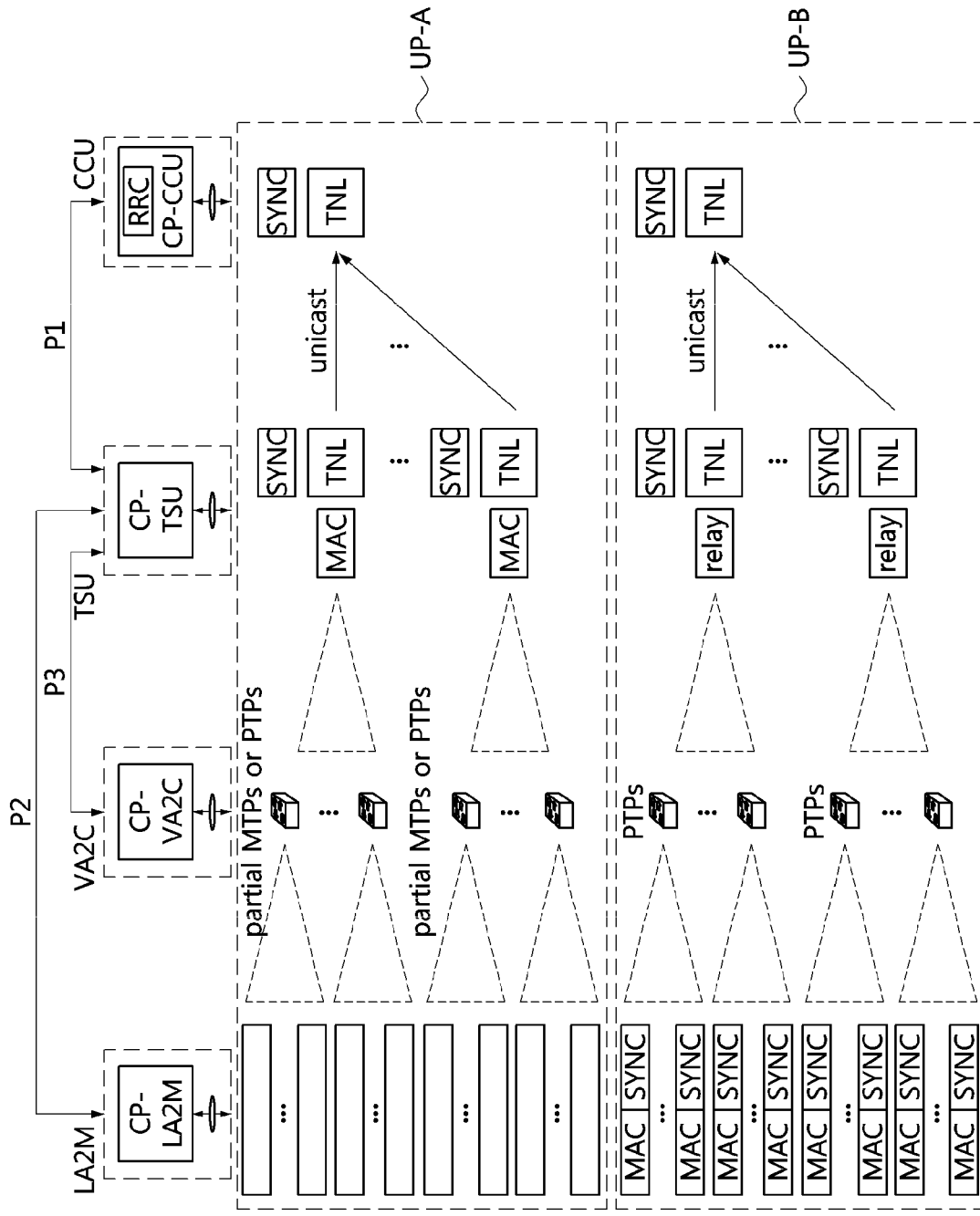
FIG. 32 is a conceptual diagram illustrating a first embodiment of an uplink communication method based on a synchronization protocol.

FIG. 32 is a conceptual diagram illustrating a first embodiment of an uplink communication method based on a synchronization protocol.

Referring to FIG. 32, when uplink communication is performed, a packet transmission order may be 'LA2M→VA2C→TSU→CCU'. In the UP-A (e.g., A1-UP, A2-UP, A4-UP, A5-UP, A7-UP and A8-UP in FIG. 14), the MAC layer may be located in the TSU 120, and the synchronization layer (e.g., synchronization protocol) may be located in the CCU 110 and the TSU 120. The VA2C 130 may receive packets from the LA2M 140 in a JR scheme and the packets may be transmitted to the CCU 110.

In the UP-B (e.g., A3-UP, A6-UP and A9-UP in FIG. 14), the MAC layer may be located in the LA2M 140, and the synchronization layer (e.g., synchronization protocol) may be located in the CCU 110, TSU 120, and LA2M 140. In this case, the synchronization layer of the CCU 110 may be connected to the synchronization layer of the LA2M 140, and the synchronization layer of the TSU 120 may perform a relay function between the synchronization layer of the CCU 110 and the synchronization layer of the LA2M 140. Here, the CCU 110 may select an optimal packet among packets received from the plurality of TSUs 120.

Meanwhile, a delay probe procedure for synchronization between the communication nodes in the UP-A may be performed as follows.

Figure 33:
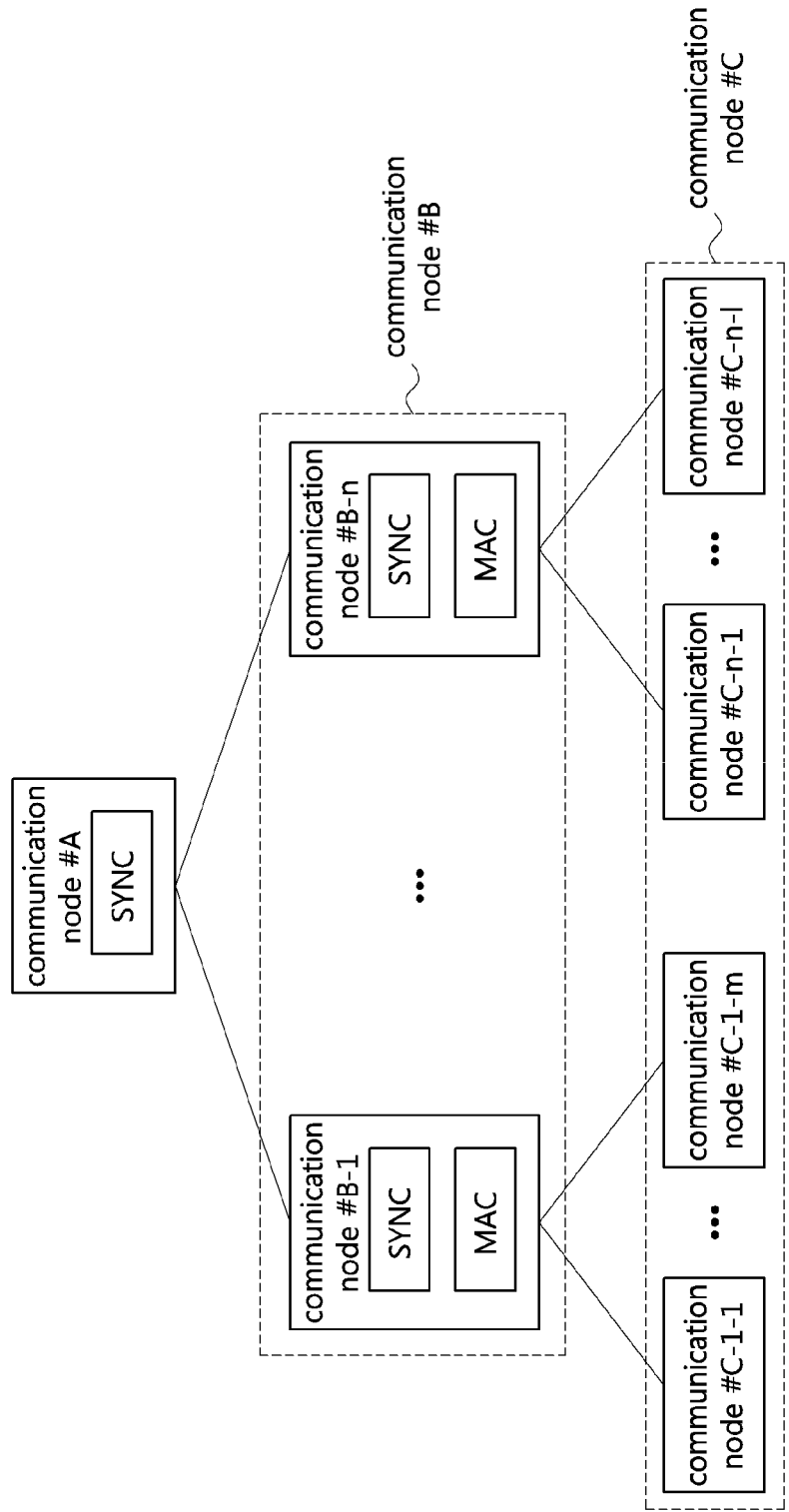
FIG. 33 is a block diagram illustrating a second embodiment of a communication system.

FIG. 33 is a block diagram illustrating a second embodiment of a communication system, FIG. 34 is a block diagram illustrating a first embodiment of probe request/response packets used in a delay probe procedure, and FIG. 35 is a block diagram illustrating a second embodiment of probe request/response packets used in a delay probe procedure.

Referring to FIGS. 33 to 35, a communication node #A may be the CCU 110, a communication node #B may be the TSU 120, and a communication node #C may be the LA2M 140. The MAC layer may be located in the communication node #B. A delay probe procedure may be used by the communication node #A to evaluate a packet delay at the communication node #B. In addition, the delay probe procedure may be used to predict an appropriate scheduling time point by performing content synchronization based on the communication node #B having the largest delay.

The communication node #A may generate a probe request packet (e.g., probe request packet #A, probe request packet #B), and transmit the generated probe request packet to n communication nodes #B. Each of n, m and L may be a positive integer. The communication node #B may receive the probe request packet from the communication node #A, and may generate a probe response packet (e.g., probe response packet #A, probe response packet #B) in response to the probe request packet, and may transmit the generated probe response packet to the communication node #A. For example, the communication node #B may transmit the probe response packet #A to the communication node #A in response to the probe request packet #A, and transmit the probe response packet #B to the communication node #A in response to the probe request packet #B. The communication node #A may receive the probe response packets from the communication node #B, and may identify a delay at the communication node #B based on an absolute time (AT) included in the probe response packets.

Here, the probe request packet #A may include a synchronization packet type field, a unique ID field, a destination count field, a destination address field, an AT count field, and an AT #1 field. The synchronization packet type field may indicate the type of probe request packet (e.g., probe request packet #A, probe request packet #B). The synchronization packet type field in the probe request packet #A may be set to '1'. The unique ID field may be configured as a unique ID based on a vehicle ID and an RB ID (e.g., RB ID for initial transmission, RB ID for transmission of RLC status message, RB ID for retransmission), a sequence ID for each communication node, or the like. The destination count field may indicate a depth of the final destination of the probe request packet (e.g., the number of hops between the communication node that generated the probe request packet and the communication node that is the final destination of the probe request packet). In FIG. 33, since the final destination of the probe request packet #A is the communication node #B, the destination count field may be set to '1'. The destination address field may indicate a destination address (e.g., an IP address) of the probe request packet #A. The AT count field may indicate the number of AT fields included in the probe request packet #A. The AT count field in the probe request packet #A may be set to '1'. The AT #1 field may indicate an AT at the time of transmitting of the probe request packet #A.

The probe request packet #B may be used to improve the accuracy of the delay measurement compared to the probe request packet #A. The probe request packet #B may include a synchronization packet type field, a unique ID field, a destination count field, a destination address field, an AT count field, an AT #1 field, a PDU count field, a PDU #1 size field, a PDU #2 size field, a PDU #1 (e.g., dummy packet #1) and a PDU #2 (e.g., dummy packet #2). Each of the synchronization packet type field, the unique ID field, the destination count field, the destination address field, the AT count field and the AT #1 field of the probe request packet #B may be configured to be the same as or similar to each of the synchronization packet type field, the unique ID field, the destination count field, the destination address field, the AT count field, and the AT #1 field of the probe request packet #A. Here, the synchronization packet type field of the probe request packet #B may be set to '31'. The PDU count field may indicate the number of PDUs (e.g., dummy packets) included in the probe request packet #B. When two PDUs are included in the probe request packet #B, the PDU count field may be set to '2'. The number of PDUs included in the probe request packet #B may vary. The PDU #1 size field may indicate the size of PDU #1, and the PDU #2 size field may indicate the size of PDU #2.

The probe response packet #A may be used in response to the probe request packet #A. The probe response packet #A may include a synchronization packet type field, a unique ID field, an AT count field, an AT #2 field, and an AT #3 field. The synchronization packet type field may indicate the type of probe response packet (e.g., probe response packet #A, probe response packet #B). The synchronization packet type field in the probe response packet #A may be set to '51'. The unique ID field may be set to a unique ID indicated by the unique ID field of the probe request packet #A. The AT count field may indicate the number of AT fields included in the probe response packet #A. The AT count field in the probe response packet #A may be set to '2'. The AT #2 field may indicate an AT at which the probe request packet #A was received at the communication node #B, and the AT #3 field may indicate an AT at which the communication node #B transmits the probe response packet #A.

The probe response packet #B may be used in response to the probe request packet #B. The probe response packet #B may include a synchronization packet type field, a unique ID field, an AT count field, an AT #2 field, and an AT #3 field. Each of the synchronization packet type field, the unique ID field, the AT count field, the AT #2 field and the AT #3 field of the probe response packet #B may be configured to be the same as or similar to each of the synchronization packet type field, the unique ID field, the AT count field, the AT #2 field, and the AT #3 field of the probe response packet #A. Here, the synchronization packet type field of the probe response packet #B may be set to '531'.

On the other hand, the communication node #A may receive the probe response packet from each of the communication nodes #B (e.g., the communication nodes #B-1 to #B-n), and based on the ATs included in the probe response packets, the communication node #A may identify a delay in each of the communication nodes #B. The communication node #A may perform scheduling based on the communication node #B having the largest delay for content synchronization among the communication nodes #B. That is, the communication node #A may perform scheduling so that the communication nodes #B can perform downlink transmission (or uplink transmission) in the same TTI.

Meanwhile, a delay probe procedure for synchronization between communication nodes in the UP-B may be performed as follows.

Figure 36:
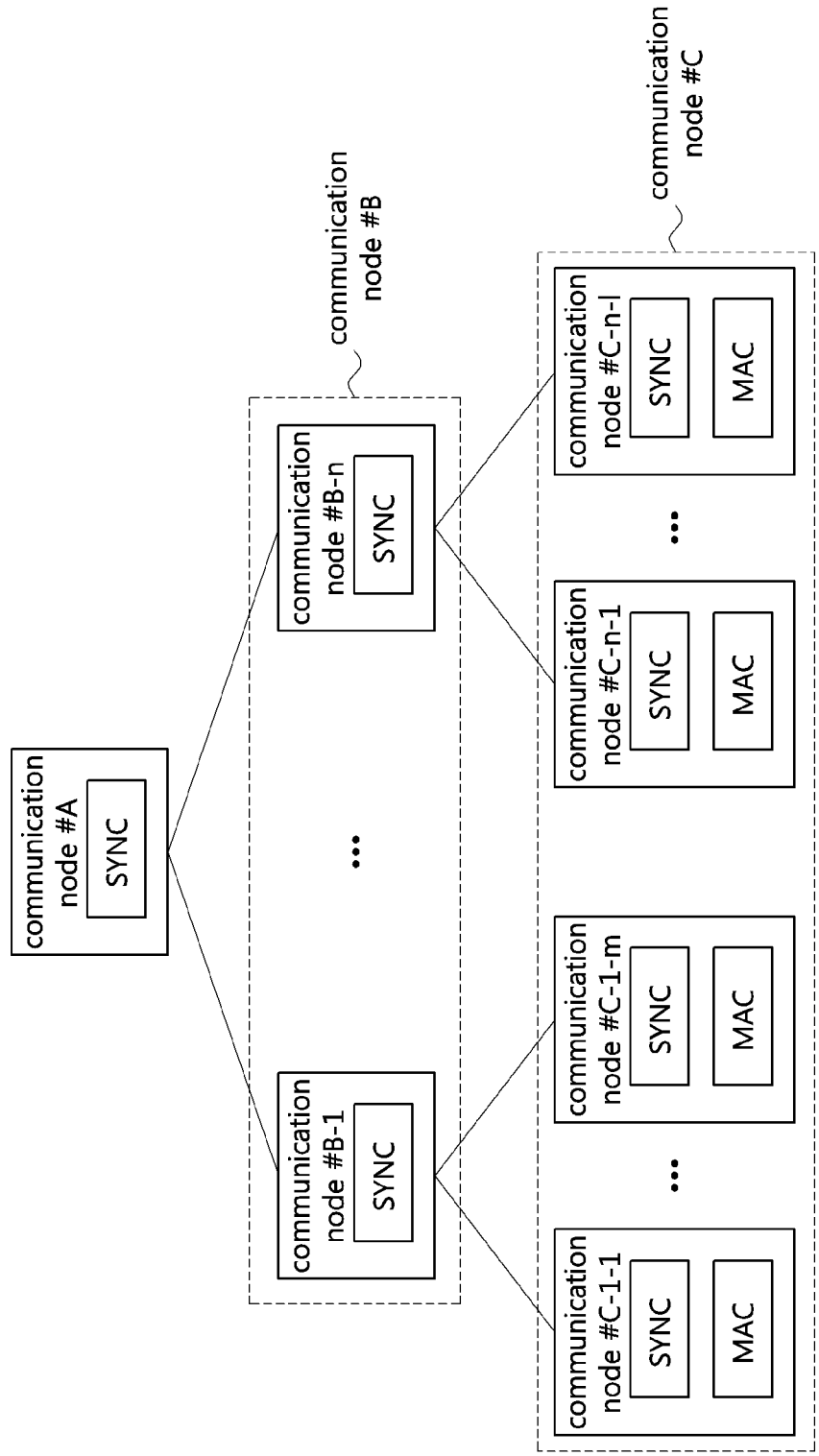
FIG. 36 is a block diagram illustrating a third embodiment of a communication system.

FIG. 36 is a block diagram illustrating a third embodiment of a communication system, and FIG. 37 is a block diagram illustrating a third embodiment of probe request/response packets used in a delay probe procedure.

Referring to FIGS. 36 and 37, a communication node #A may be the CCU 110, a communication node #B may be the TSU 120, and a communication node #C may be the LA2M 140. The MAC layer may be located in the communication node #C. A delay probe procedure may be used by the communication node #A to evaluate a packet delay at the communication node #C. In addition, the delay probe procedure may be used to predict an appropriate scheduling time point by performing content synchronization based on the communication node #C having the largest delay.

The communication node #A may generate a probe request packet #C, and transmit the generated probe request packet #C to n communication nodes #B. Each of n, m and l may be a positive integer. Each of the communication nodes #B may receive the probe request packet #C from the communication node #A, and may generate a probe request packet #D based on the probe request packet #C, and may transmit the generated probe request packet #D to the communication nodes #C. Each of the communication nodes #C may receive the probe request packet #D from the communication node #B, generate a probe response packet #D in response to the probe request packet #D, and transmit the generated probe response packet #D to the communication nodes #B. Each of the communication nodes #B may receive the probe response packet #D from the communication node #C, generate a probe response packet #C based on the probe response packet #D, and transmit the probe response packet #C to the communication node #A. The communication node #A may receive the probe response packets #C from the communication nodes #B, and may identify delays in the communication nodes #C based on the ATs included in the probe response packets #C.

Here, the probe request packet #C may include a synchronization packet type field, a unique ID field, a destination count field, a destination address #1 field, a destination address #2 field, an AT count field, and an AT #1 field. The synchronization packet type field may indicate the type of probe request packet, and may be set to '2'. The unique ID field may be configured as a unique ID based on a vehicle ID and an RB ID (e.g., RB ID for initial transmission, RB ID for transmission of RLC status message, RB ID for retransmission), a sequence ID for each communication node, or the like. The destination count field may indicate a depth of the final destination of the probe request packet #C. Since the final destination of the probe request packet #C is the communication node #C, the destination count field may be set to '2'. The destination address #1 field may indicate an address of the communication node #B, which is the first destination of the probe request packet #C. The destination address #2 field may indicate an address of the communication node #C, which is the second destination of the probe request packet #C. The AT count field may indicate the number of AT fields included in the probe request packet #C, and may be set to '1'. The AT #1 field may indicate an AT at the time of transmitting of the probe request packet #C. Also, the probe request packet #C may include at least one PDU similarly to the probe request packet #B of FIG. 35 to improve the accuracy of the delay measurement.

The probe request packet #D may include a synchronization packet type field, a unique ID field, a destination count field, a destination address #2 field, an AT count field, and an AT #2 field. The synchronization packet type field may indicate the type of probe request packet and may be set to '1'. The unique ID field of the probe request packet #D may be set to a unique ID indicated by the unique ID field of the probe request packet #C. The destination count field may indicate a depth of the final destination of the probe request packet #D and may be set to '1'. The destination address #2 field may indicate the address of the communication node #C. The AT count field may indicate the number of AT fields included in the probe request packet #D, and may be set to '1'. The AT #2 field may indicate an AT at the time of transmitting of the probe request packet #D. Also, the probe request packet #D may include at least one PDU similarly to the probe request packet #B of FIG. 35 to improve the accuracy of the delay measurement.

The probe response packet #D may include a synchronization packet type field, a unique ID field, an AT count field, an AT #3 field, and an AT #4 field. The synchronization packet type field may indicate the type of probe response packet, and may be set to '51'. The unique ID field of the probe response packet #D may be set to a unique ID indicated by the unique ID field of the probe request packet #D. The AT count field may indicate the number of AT fields included in the probe response packet #D, and may be set to '2'. The AT #3 field may indicate an AT at the time of receiving of the probe request packet #D, and the AT #4 field may indicate an AT at the time of transmitting of the probe response packet #D.

The probe response packet #C may include a synchronization packet type field, a unique ID field, an AT count field, an AT #2 field, an AT #3 field, an AT #4 field, and an AT #5 field. The synchronization packet type field may indicate the type of probe response packet, and may be set to '52'. The unique ID field of the probe response packet #C may be set to a unique ID indicated by the unique ID field of the probe response packet #D. The AT count field may indicate the number of AT fields included in the probe response packet #C, and may be set to '4'. The AT #2 field may indicate an AT at the time of transmitting of the probe request packet #D, the AT #3 field may be set to the AT indicated by the AT #2 field of the probe response packet #D, the AT #4 field may be set to the AT indicated by the AT #3 field of the probe response packet #D, and the AT #5 field may indicate an AT at the time of transmitting of the probe response packet #C.

On the other hand, the communication node #A may receive the probe response packet from each of the communication nodes #B (e.g., the communication nodes #B-1 to #B-n), and based on the ATs included in the probe response packets, the communication node #A may identify a delay in each of the communication nodes #B. The communication node #A may perform scheduling based on the communication node #C having the largest delay for content synchronization among the communication nodes #C. That is, the communication node #A may perform scheduling so that the communication nodes #C can perform downlink transmission (or uplink transmission) in the same TTI.

Meanwhile, the delay probe procedure described with reference to FIGS. 33 to 35 may be applied when a depth (e.g., the number of hops) between the communication node #A and the communication node where the MAC layer is located is 1, and the delay probe procedure described with reference to FIGS. 36 and 37 may be applied when the depth (e.g., the number of hops) between the communication node #A and the communication node where the MAC layer is located is 2. A delay probe procedure applied when the depth (e.g., the number of hops) between the communication node #A and the communication node where the MAC layer is located is 3 may be performed as follows.

Figure 38:
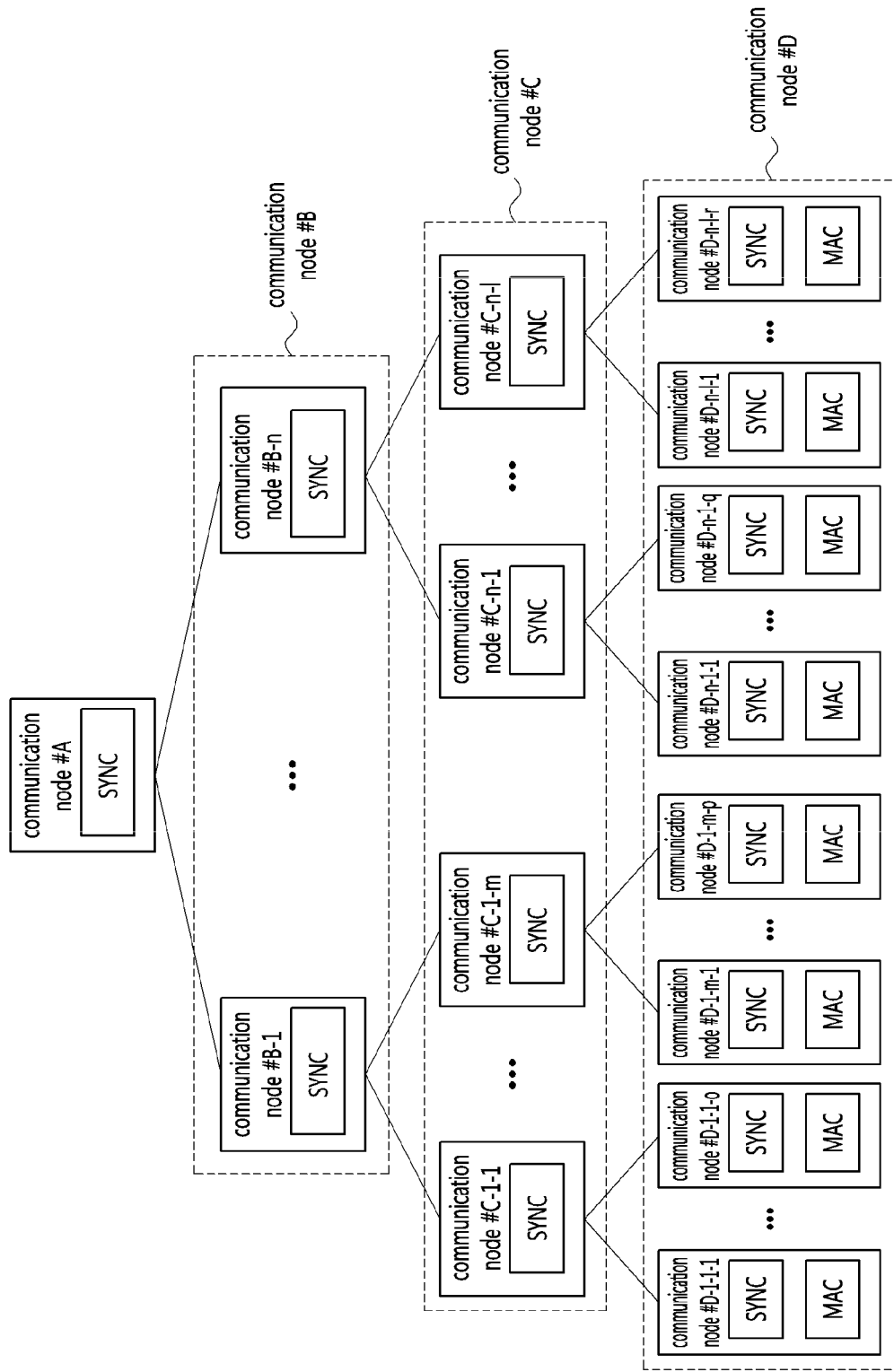
FIG. 38 is a block diagram illustrating a fourth embodiment of a communication system.

FIG. 38 is a block diagram illustrating a fourth embodiment of a communication system, FIG. 39 is a block diagram illustrating a fourth embodiment of a probe request packet used in a delay probe procedure, and FIG. 40 is a block diagram illustrating a fourth embodiment of a probe response packet used in a delay probe procedure.

Referring to FIGS. 38 to 40, a communication node #A may be the CCU 110, and the MAC layer may be located in the communication node #D. A delay probe procedure may be used by the communication node #A to evaluate a packet delay at the communication node #D. In addition, the delay probe procedure may be used to predict an appropriate scheduling time point by performing content synchronization based on the communication node #D having the largest delay.

The communication node #A may generate a probe request packet #E, and transmit the generated probe request packet #E to n communication nodes #B. Each of n, m, l, o, p, q, and r may be a positive integer. Each of the communication nodes #B may receive the probe request packet #E from the communication node #A, and may generate a probe response packet #F based on the probe request packet #E, and may transmit the generated probe response packet #F to the communication nodes #C. Each of the communication nodes #C may receive the probe request packet #F from the communication node #B, generate a probe response packet #G based on the probe request packet #F, and transmit the generated probe request packet #G to the communication node #D. Each of the communication nodes #D may receive the probe request packet #G from the communication node #C, generate a probe response packet #G in response to the probe request packet #G, and transmit the probe response packet #G to the communication node #C. Each of the communication nodes #C may receive the probe response packet #G from the communication node #D, generate a probe response packet #F based on the probe response packet #G, and transmit the generated probe response packet #F to the communication node #B. Each of the communication nodes #B may receive the probe response packet #F from the communication node #C, generate a probe response packet #E based on the probe response packet #F, and transmit the generated probe response packet #E to the communication node #A. The communication node #A may receive the probe response packets #E from the communication nodes #B, and may identify delays in the communication nodes #D based on the ATs included in the probe response packets #E.

Here, the probe request packet #E may include a synchronization packet type field, a unique ID field, a destination count field, a destination address #1 field, a destination address #2 field, a destination address #3 field, an AT count field, and an AT #1 field. The synchronization packet type field may indicate the type of probe request packet, and may be set to '3'. The unique ID field may be configured as a unique ID based on a vehicle ID and an RB ID (e.g., RB ID for initial transmission, RB ID for transmission of RLC status message, RB ID for retransmission), a sequence ID for each communication node, or the like. The destination count field may indicate a depth of the final destination of the probe request packet #E. Since the final destination of the probe request packet #E is the communication node #D, the destination count field may be set to '3'. The destination address #1 field may indicate an address of the communication node #B, which is the first destination of the probe request packet #E. The destination address #2 field may indicate an address of the communication node #C, which is the second destination of the probe request packet #E. The destination address #3 field may indicate an address of the communication node #D, which is the third destination of the probe request packet #E. The AT count field may indicate the number of AT fields included in the probe request packet #E, and may be set to '1'. The AT #1 field may indicate an AT at the time of transmitting of the probe request packet #E. Also, the probe request packet #E may include at least one PDU similarly to the probe request packet #B of FIG. 35 to improve the accuracy of the delay measurement.

The probe request packet #F may include a synchronization packet type field, a unique ID field, a destination count field, a destination address #2 field, a destination address #3 field, an AT count field, and an AT #2 field. The synchronization packet type field may indicate the type of probe request packet and may be set to '2'. The unique ID field of the probe request packet #F may be set to a unique ID indicated by the unique ID field of the probe request packet #E. The destination count field may indicate a depth of the final destination of the probe request packet #F and may be set to '2'. The destination address #2 field may indicate the address of the communication node #C, and the destination address #3 field may indicate the address of the communication node #D. The AT count field may indicate the number of AT fields included in the probe request packet #F, and may be set to '1'. The AT #2 field may indicate an AT at the time of transmitting of the probe request packet #F. Also, the probe request packet #F may include at least one PDU similarly to the probe request packet #B of FIG. 35 to improve the accuracy of the delay measurement.

The probe request packet #G may include a synchronization packet type field, a unique ID field, a destination count field, a destination address #3 field, an AT count field, and an AT #3 field. The synchronization packet type field may indicate the type of probe request packet and may be set to '1'. The unique ID field of the probe request packet #G may be set to a unique ID indicated by the unique ID field of the probe request packet #F. The destination count field may indicate a depth of the final destination of the probe request packet #G and may be set to '1'. The destination address #3 field may indicate the address of the communication node #D. The AT count field may indicate the number of AT fields included in the probe request packet #G, and may be set to '1'. The AT #3 field may indicate an AT at the time of transmitting of the probe request packet #G. Also, the probe request packet #G may include at least one PDU similarly to the probe request packet #B of FIG. 35 to improve the accuracy of the delay measurement.

The probe response packet #G may include a synchronization packet type field, a unique ID field, an AT count field, an AT #4 field, and an AT #5 field. The synchronization packet type field may indicate the type of probe response packet and may be set to '51'. The unique ID field of the probe response packet #G may be set to a unique ID indicated by the unique ID field of the probe request packet #G. The AT count field may indicate the number of AT fields included in the probe response packet #G, and may be set to '2'. The AT #4 field may indicate an AT at the time of receiving the probe request frame #G, and the AT #5 field may indicate an AT at the time of transmitting the probe response packet #G.

The probe response packet #F may include a synchronization packet type field, a unique ID field, an AT count field, an AT #3 field, an AT #4 field, an AT #5 field, and an AT #6 field. The synchronization packet type field may indicate the type of probe response packet and may be set to '52'. The unique ID field of the probe response packet #F may be set to a unique ID indicated by the unique ID field of the probe response packet #G. The AT count field may indicate the number of AT fields included in the probe response packet #F, and may be set to '4'. The AT #3 field may be set to the AT indicated by the AT #3 field of the probe request packet #G, the AT #4 field may be set to the AT indicated by the AT #4 field of the probe response packet #G, the AT #5 field may be set to the AT indicated by the AT #5 field of the probe response packet #G, and the AT #6 field may indicate an AT at the time of transmitting the probe response packet #F.

The probe response packet #E may include a synchronization packet type field, a unique ID field, an AT count field, an AT #2 field, an AT #3 field, an AT #4 field, an AT #5 field, an AT #6 field, and an AT #7 field. The synchronization packet type field may indicate the type of probe response packet and may be set to '53'. The unique ID field of the probe response packet #E may be set to a unique ID indicated by the unique ID field of the probe response packet #F. The AT count field may indicate the number of AT fields included in the probe response packet #F, and may be set to '6'. The AT #2 field may be set to the AT indicated by the AT #2 field of the probe request packet #F, the AT #3 field may be set to the AT indicated by the AT #3 field of the probe response packet #F, the AT #4 field may be set to the AT indicated by the AT #4 field of the probe response packet #F, the AT #5 field may be set to the AT indicated by the AT #5 field of the probe response packet #F, the AT #6 field may be set to the AT indicated by the AT #6 field of the probe response packet #F, and the AT #7 field may indicate an AT at the time of transmitting the probe response packet #E.

On the other hand, the communication node #A may receive the probe response packet #E from each of the communication nodes #B (e.g., the communication nodes #B-1 to #B-n), and based on the ATs included in the probe response packets #E, the communication node #A may identify a delay in each of the communication nodes #D. The communication node #A may perform scheduling based on the communication node #D having the largest delay for content synchronization among the communication nodes #D. That is, the communication node #A may perform scheduling so that the communication nodes #D can perform downlink transmission (or uplink transmission) in the same TTI.

Meanwhile, a downlink communication procedure between the communication system 100 and the vehicle 200 may be performed as follows.

Figure 41:
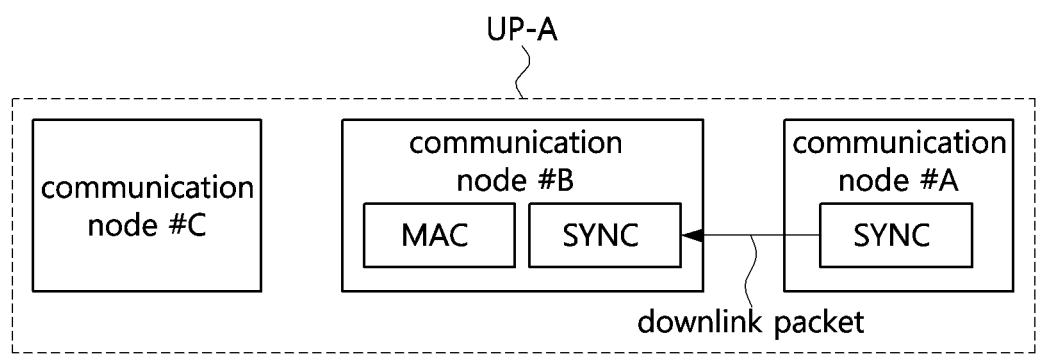
FIG. 41 is a block diagram illustrating a fifth embodiment of a communication system.
Figure 42:
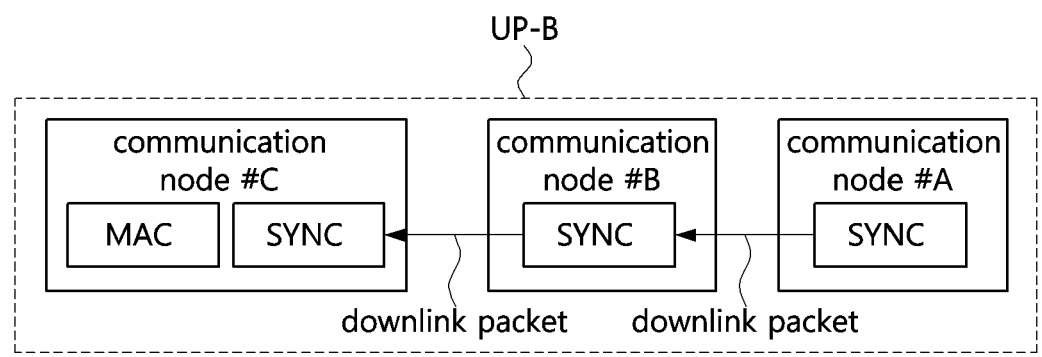
FIG. 42 is a block diagram illustrating a sixth embodiment of a communication system.

FIG. 41 is a block diagram illustrating a fifth embodiment of a communication system, FIG. 42 is a block diagram illustrating a sixth embodiment of a communication system, and FIG. 43 is a block diagram illustrating a first embodiment of a downlink packet.

Referring to FIGS. 41 to 43, the communication node #A may be the CCU 110 of the communication system 100, the communication node #B may be the TSU 120 of the communication system 100, and the communication node #C may be the LA2M 140 of the communication system 100. In the UP-A, the MAC layer may be located at the communication node #B, and the synchronization layer may be located at the communication nodes #A and #B. In the UP-B, the MAC layer may be located at the communication node #C, and the synchronization layer may be located at the communication nodes #A to #C. The synchronization layer of the communication node #A may support a master MAC function. The communication node #A that supports the master MAC function may configure one sliding window for one vehicle 200, control and manage the sliding window according to the movement of the vehicle 200, and may determine the number of SDUs included in a transport block (TB) based on semi-static resource allocation information for each vehicle 200 determined by an RRC signaling procedure. In order to determine the number of SDUs, a protocol processing procedure of the lower communication node (e.g., communication node #B, communication node #C) may be considered. For example, the synchronization layer located in the communication node #A may perform a scheduling operation so that the packets are located in the TB allocated to one TTI, considering the protocol processing procedure between the communication node where the MAC layer is located and the communication node #A.

In the UP-A, a downlink packet may be transmitted from the communication node #A to the communication node #B. In the UP-B, a downlink packet may be transmitted from the communication node #A to the communication node #C. In this case, the communication node #B may forward the downlink packet received from the communication node #A to the communication node #C. The downlink packet includes a synchronization packet type field, an AT field, a unique ID field, a predicted system frame number (SFN)/subframe (SF) field, an SDU count field, an SDU #1 size field, an SDU #2 size field, an SDU #3 size filed, an SDU #1, an SDU #2, and SDU #3.

The synchronization packet type field may indicate the type of the packet, and may be set to '100'. The AT field may indicate an AT at the time of transmitting the downlink packet. The unique ID field may indicate a unique ID based on a vehicle ID and an RB ID (e.g., RB ID for initial transmission, RB ID for transmission of RLC status message, RB ID for retransmission). The predicted SFN/SF field may indicate scheduling information (e.g., SFN, SF index) of the SDUs included in the downlink packet. An SFN and SF index indicated by the predicted SFN/SF field may be calculated based on the semi-static scheduling information and the delay measured by the delay probe procedure.

The SDU count field may indicate the number of SDUs (e.g., the number of SDUs included in the downlink packet) scheduled in a TB in one TTI. The number of SDU size fields included in the downlink packet may be the same as the value indicated by the SDU count field. The SDU #1 size field may indicate the length of the SDU #1 included in the downlink packet, the SDU #2 size field may indicate the length of the SDU #2 included in the downlink packet, and the SDU #3 size field may indicate the length of the SDU #3 included in the downlink packet.

Meanwhile, an uplink communication procedure between the communication system 100 and the vehicle 200 may be performed as follows.

Figure 44:
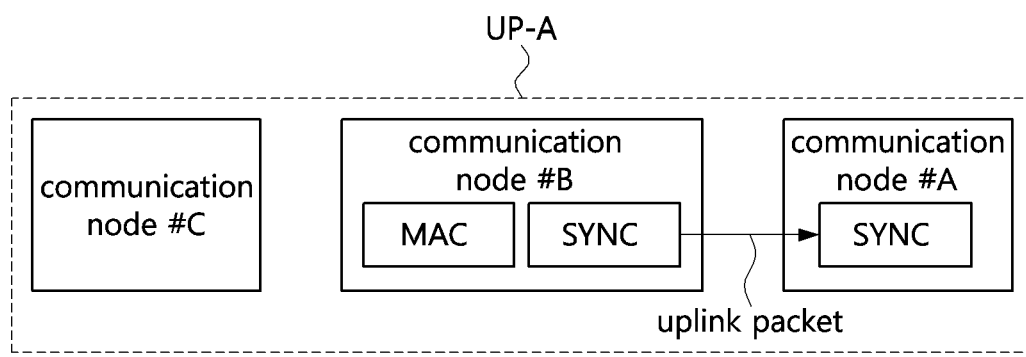
FIG. 44 is a block diagram illustrating a seventh embodiment of a communication system.
Figure 45:
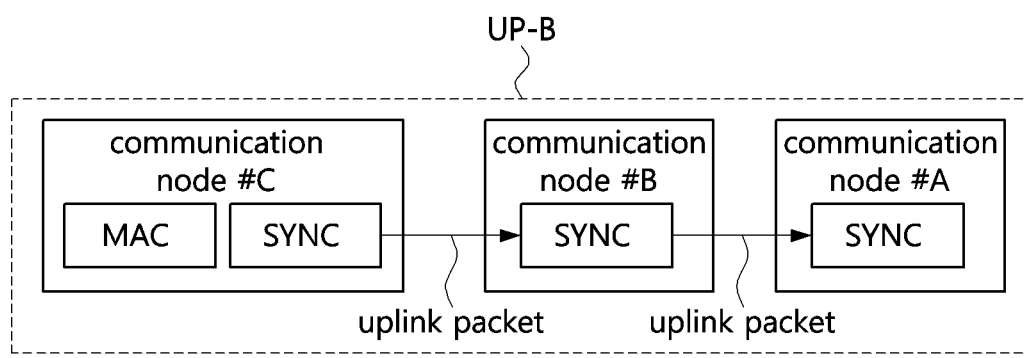
FIG. 45 is a block diagram illustrating an eighth embodiment of a communication system.

FIG. 44 is a block diagram illustrating a seventh embodiment of a communication system, FIG. 45 is a block diagram illustrating an eighth embodiment of a communication system, and FIG. 46 is a block diagram illustrating a first embodiment of an uplink packet.

Referring to FIGS. 44 to 46, the communication node #A may be the CCU 110 of the communication system 100, the communication node #B may be the TSU 120 of the communication system 100, and the communication node #C may be the LA2M 140 of the communication system 100. In the UP-A, the MAC layer may be located at the communication node #B, and the synchronization layer may be located at the communication nodes #A and #B. In the UP-B, the MAC layer may be located at the communication node #C, and the synchronization layer may be located at the communication nodes #A to #C. The communication node #B or the communication node #C including the MAC layer may transmit an uplink packet including SDUs for which a protocol processing for a TB received in one TTI has been completed to the upper communication node.

From the uplink point of view, the communication node #A may receive a plurality of uplink packets having the same unique ID and the same received SFN/SF. In this case, the communication node #A may select one uplink packet among the plurality of uplink packets based on a received signal strength indicated by each of the plurality of uplink packets. Also, the communication node #A may process an uplink packet received in an uplink delay window configured in a SFN/SF indicated by the received SFN/SF field in consideration of the uplink delay measured by the delay probe procedure, and may not process an uplink packet received outside the uplink delay window.

In the UP-A, the uplink packet may be transmitted from the communication node #B to the communication node #A. In the UP-B, the uplink packet may be transmitted from the communication node #C to the communication node #A. In this case, the communication node #B may forward the uplink packet received from the communication node #C to the communication node #A. The uplink packet may include a synchronization packet type field, an AT field, a unique ID field, a signal strength field, a received SFN/SF field, an SDU count field, an SDU #1 size field, an SDU #2 size field, an SDU #3 size filed, an SDU #1, an SDU #2, and an SDU #3.

The synchronization packet type field may indicate the type of the packet, and may be set to '200'. The AT field may indicate an AT at the time of transmitting the uplink packet. For example, in the UP-A field, the AT field may indicate an AT at the time when the communication node #B transmits the uplink packet, and in the UP-B, the AT field may indicate an AT at the time when the communication node #C transmits the uplink packet. The unique ID field may indicate a unique ID based on a vehicle ID and an RB ID (e.g., RB ID for initial transmission, RB ID for transmission of RLC status message, RB ID for retransmission). The signal strength field may indicate a received signal strength for a TB received in the corresponding TTI, a maximum received signal strength among received signal strengths of a plurality of signals when the JR scheme is used, or an average received signal strength of a plurality of signals when the JR scheme is used.

The received SFN/SF field may indicate an SFN and SF index in which the corresponding TB is received in the MAC layer side. The SDU count field may indicate the number of SDUs scheduled for a TB in one TTI (e.g., the number of SDUs included in the uplink packet). The number of SDU size fields included in the uplink packet may be the same as the value indicated by the SDU count field. The SDU #1 size field may indicate the length of the SDU #1 included in the uplink packet, the SDU #2 size field may indicate the length of the SDU #2 included in the uplink packet, and the SDU #3 size field may indicate the length of the SDU #3 included in the uplink packet.

Meanwhile, received signal strength according to a distance in downlink communication between the communication system 100 and the vehicle 200 may be as follows.

Figure 47:
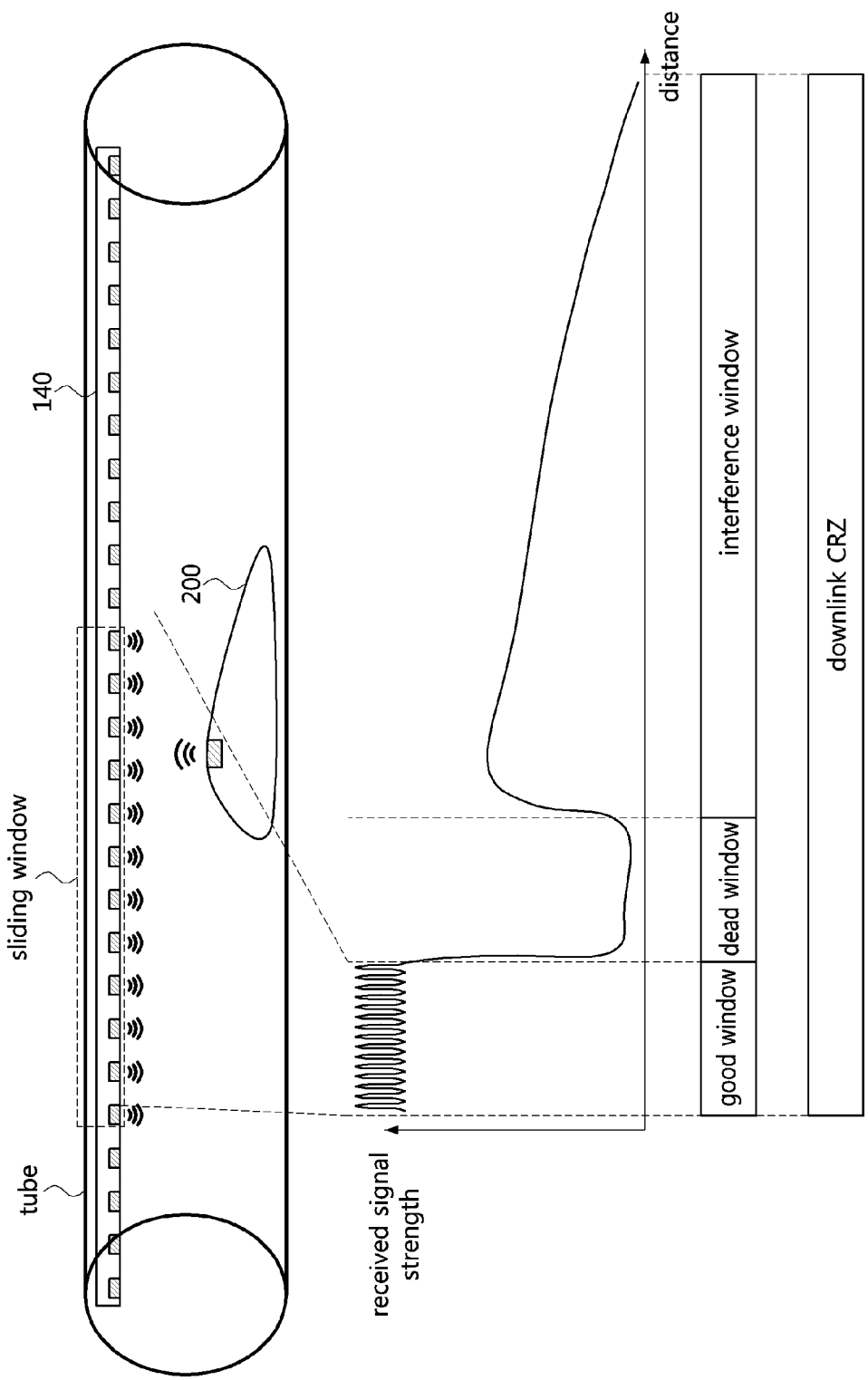
FIG. 47 is a conceptual diagram illustrating a first embodiment of received signal strength in downlink communication.

FIG. 47 is a conceptual diagram illustrating a first embodiment of received signal strength in downlink communication.

Referring to FIG. 47, the LA2M 140 of the communication system 100 may be installed on the ceiling of a tube, and a sliding window including a plurality of antennas may be configured. The downlink communication between the communication system 100 and the vehicle 200 may be performed based on the plurality of antennas belonging to the sliding window, and the plurality of antennas belonging to the sliding window may transmit the same signal through the same time-frequency resources. That is, the downlink communication may be performed based on the JT scheme.

The vehicle 200 may receive the downlink signal from the plurality of antennas belonging to the sliding window, and a reception period (e.g., reception window) of the downlink signal may be classified into a good window, a dead window, and an interference window according to a received signal strength. A zone including the good window, the dead window, and the interference window may be referred to as a downlink capsule radio zone (CRZ). For example, a reception period in which the received signal strength of the downlink signal is equal to or greater than a threshold value may be referred to as the good window. A reception period in which communication is impossible due to a multi-path fading, a delay spreading, etc. may be referred to as the dead window. A reception period that acts as an interference to a subsequent vehicle after the vehicle 200 may be referred to as the interference window. In the interference window, the received signal strength may be reduced after increasing. When a subsequent vehicle is located in the interference window, the signal in the interference window may act as an interference to the communication of the subsequent vehicle. Therefore, a distance between the vehicle 200 and the subsequent vehicle may be configured based on the interference window.

Meanwhile, received signal strength according to a distance in uplink communication between the communication system 100 and the vehicle 200 may be as follows.

Figure 48:
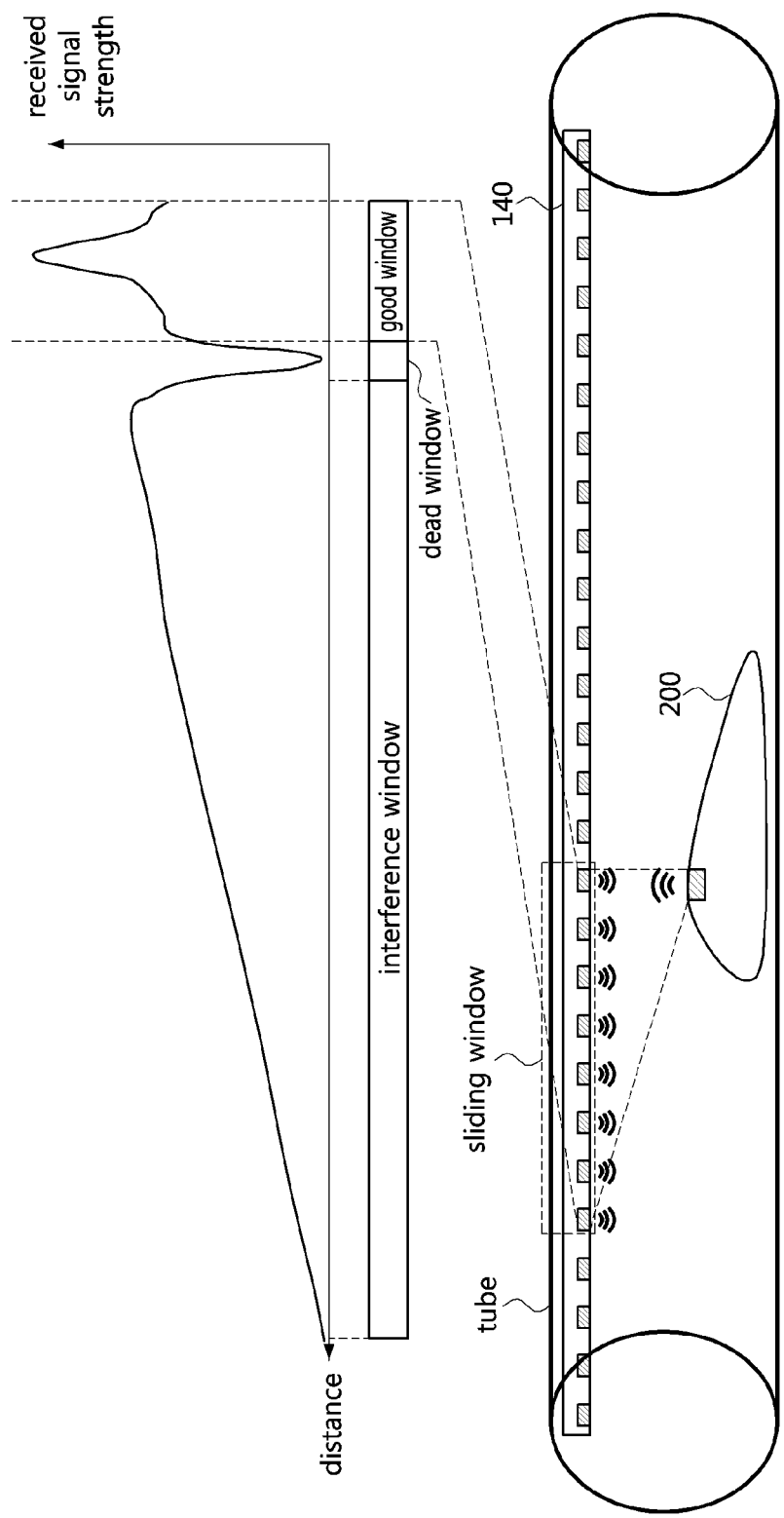
FIG. 48 is a conceptual diagram illustrating a first embodiment of received signal strength in uplink communication.
Figure 49:
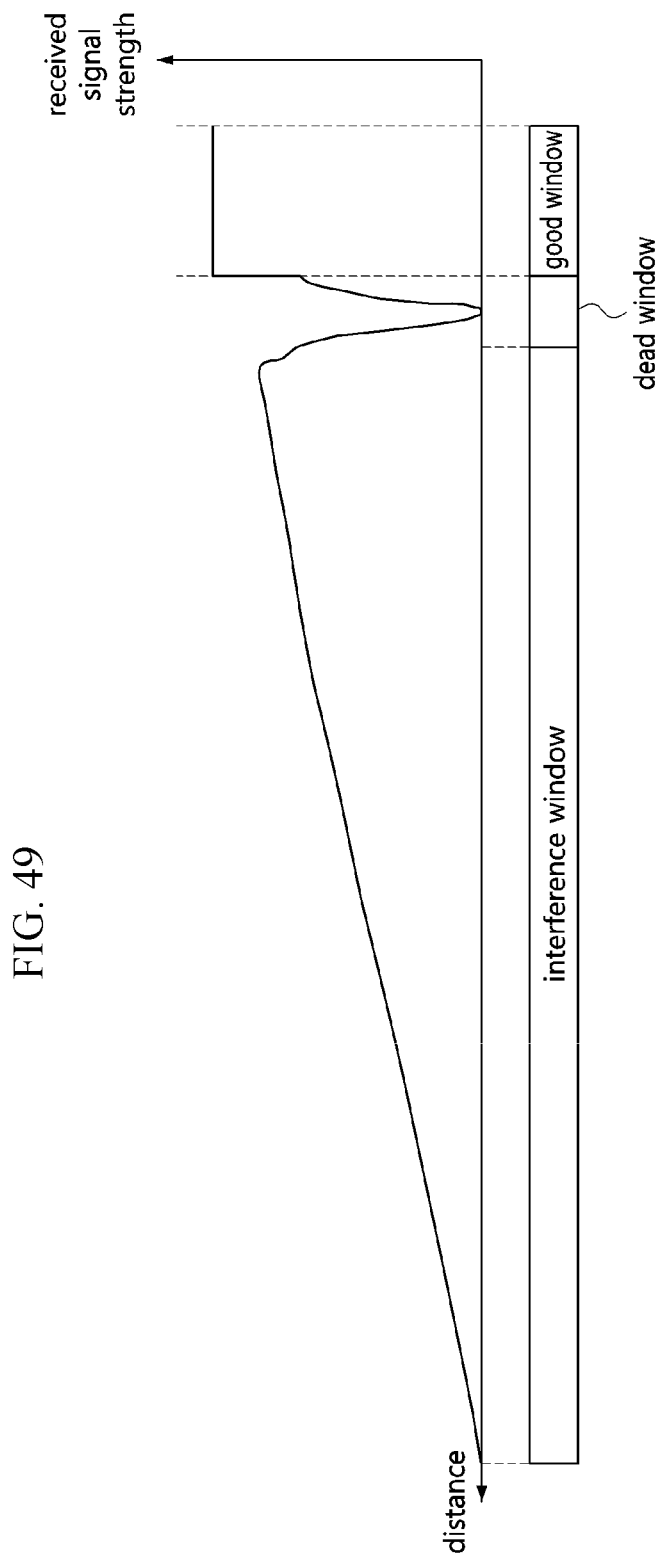
FIG. 49 is a conceptual diagram illustrating a second embodiment of received signal strength in uplink communication.

FIG. 48 is a conceptual diagram illustrating a first embodiment of received signal strength in uplink communication, and FIG. 49 is a conceptual diagram illustrating a second embodiment of received signal strength in uplink communication.

Referring to FIGS. 48 and 49, the LA2M 140 of the communication system 100 may be installed on the ceiling of a tube, and a sliding window including a plurality of antennas may be configured. The uplink communication between the communication system 100 and the vehicle 200 may be performed based on the plurality of antennas belonging to the sliding window. The uplink signal transmitted by the vehicle 200 may be received at the plurality of antennas belonging to the sliding window.

In the good window, a CRC check for the uplink signal received from the plurality of antennas belonging to the sliding window may be successfully completed, and the received signal strength of the uplink signal may be equal to or greater than a threshold value. A reception period in which communication is impossible due to a multi-path fading, a delay spreading, etc. may be referred to as the dead window. A reception period that acts as an interference to a subsequent vehicle after the vehicle 200 may be referred to as the interference window. In the interference window, the received signal strength may be reduced after increasing. A zone including the good window, the dead window, and the interference window may be referred to as an uplink CRZ. When the uplink communication is performed based on the JR scheme, the received signal strength may be improved in the good window of FIG. 49.

Meanwhile, a system structure for communication between the communication system 100 and the vehicle 200 may be as follows.

Figure 50:
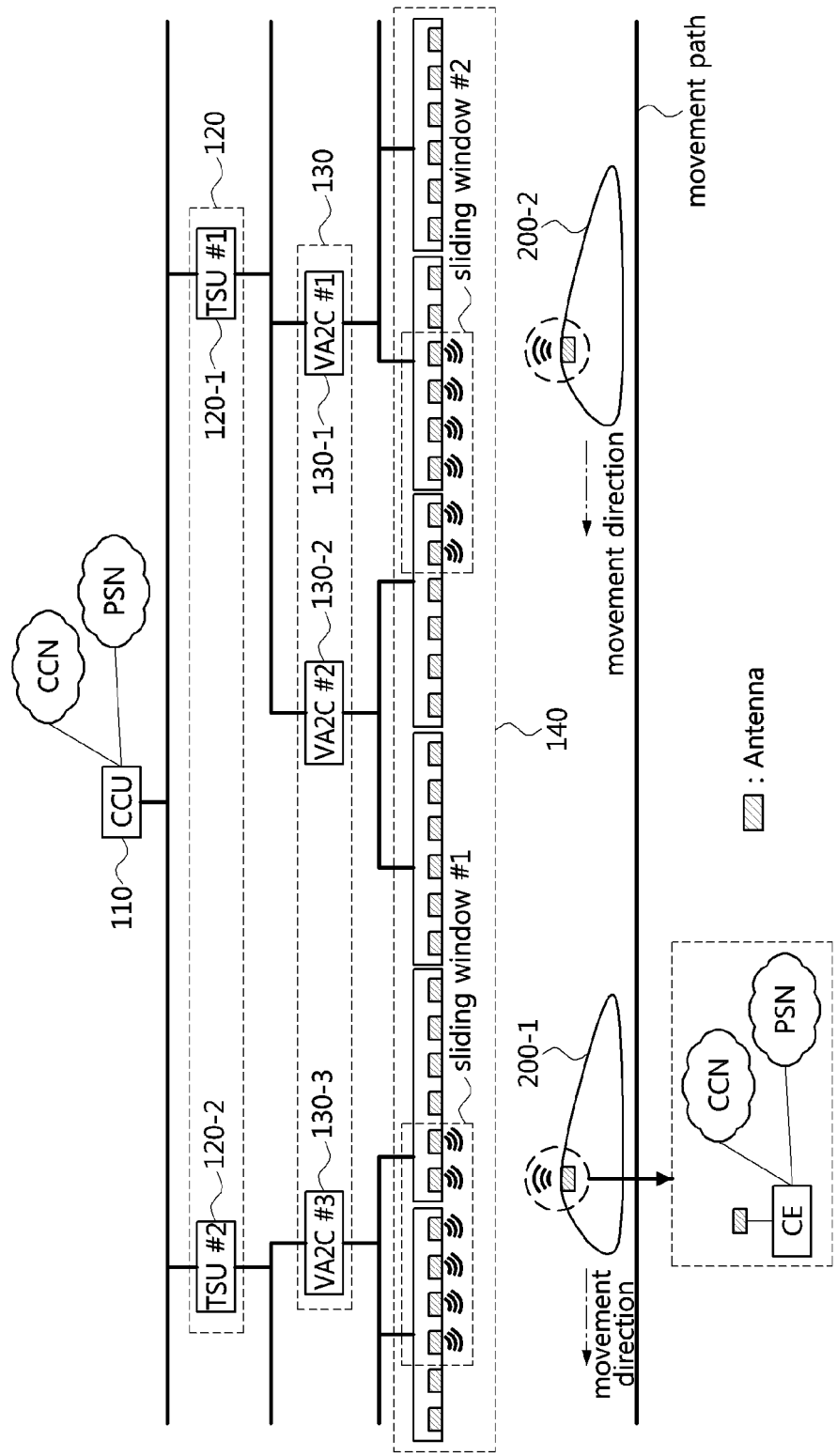
FIG. 50 is a conceptual diagram illustrating a first embodiment of a system structure for communication between a communication system and a vehicle.

FIG. 50 is a conceptual diagram illustrating a first embodiment of a system structure for communication between a communication system and a vehicle.

Referring to FIG. 50, the communication system 100 may include the CCU 110, the TSU 120, the VA2C 130 and the LA2M 140. The CCU 110 may be connected to a capsule control network (CCN) and a passenger service network (PSN) (e.g., evolved packet core (EPC)), and may be connected to the TSU 120. The TSU 120 may be connected to the VA2C 130, and the VA2C 130 may be connected to the LA2M 140. The LA2M 140 may comprise a plurality of antennas. The LA2M 140 may be installed in line on the ceiling of the tube and may be connected to the VA2C 130 located outside the tube. In this case, the CCU 110, the TSU 120, and the VA2C 130 may be located outside the tube.

Alternatively, the VA2C 130 and the LA2M 140 may be located in the tube, and the CCU 110 and the TSU 120 may be located outside the tube.

Each of the vehicles 200-1 and 200-2 may include an antenna, a capsule equipment (CE), etc., and the CE may be connected to the CCN and the PSN (e.g., EPC). The vehicles 200-1 and 200-2 may move in the tube and perform downlink/uplink communications with the plurality of antennas belonging to the sliding window. The moving speed of the sliding window #1 may be equal to the moving speed of the vehicle 120-1, and the moving speed of the sliding window #2 may be equal to the moving speed of the vehicle 120-2. The communication of the vehicles 200-1 and 200-2 may be performed in the good window. The interference window of the vehicle 120-1 may be configured so as not to overlap with the good window of the vehicle 120-2.

The CCN connected to the CCU 110 may be connected to the CCN inside the vehicles 200-1 and 200-2, and the control of the vehicles 200-1 and 200-2 may be performed through the CCN. The PSN connected to the CCU 110 may be connected to the PSN inside the vehicles 200-1 and 200-2, and the communication for the passengers of the vehicles 200-1 and 200-2 may be supported through the PSN (e.g., a small base station or an access point installed in the vehicles 200-1 and 200-2). Here, the small base station may support a 4G communication protocol, a 5G communication protocol, or the like, and the access point may support a wireless local area network (WLAN) communication protocol.

Meanwhile, when the vehicles 200-1 and 200-2 move from a station A to a station B, an operation profile may be as follows.

Figure 51:
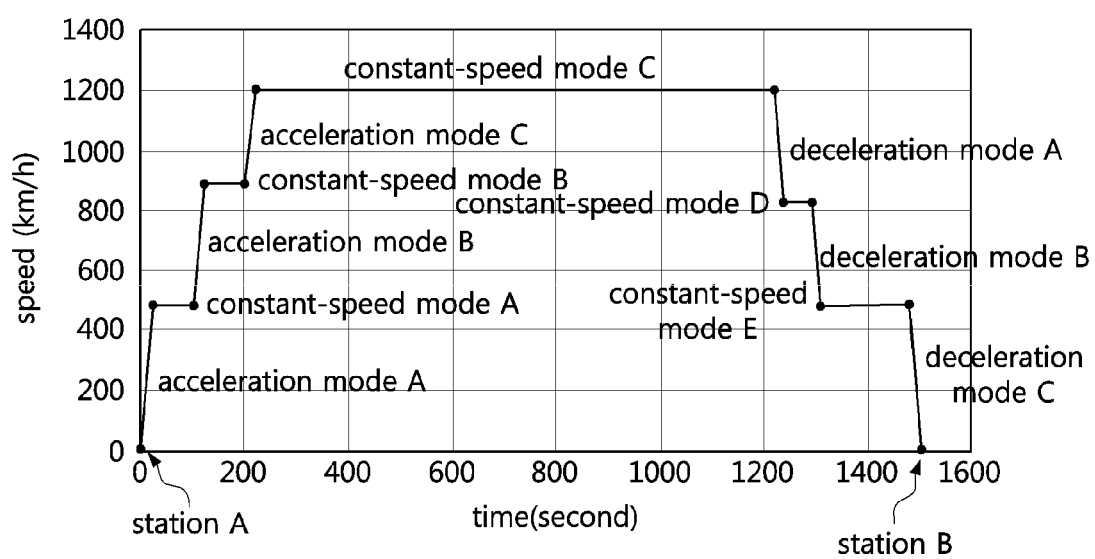
FIG. 51 is a graph illustrating a first embodiment of a vehicle operation profile.

FIG. 51 is a graph illustrating a first embodiment of a vehicle operation profile.

Referring to FIG. 51, a distance between the station A and the station B may be 413 km, and the vehicles 200-1 and 200-2 may accelerate, maintain a constant-speed and decelerate to move from the station A to the station B within 25 minutes. For example, the vehicles 200-1 and 200-2 may be operated at a maximum speed of 1200 km/h by repeating the accelerated operation and the constant-speed operation, and the speed may be reduced by repeating the decelerating operation and the constant-speed operation.

Meanwhile, when a plurality of vehicles are operated between the stations A and B, a CRZ of each of the vehicles may be as follows.

Figure 52:
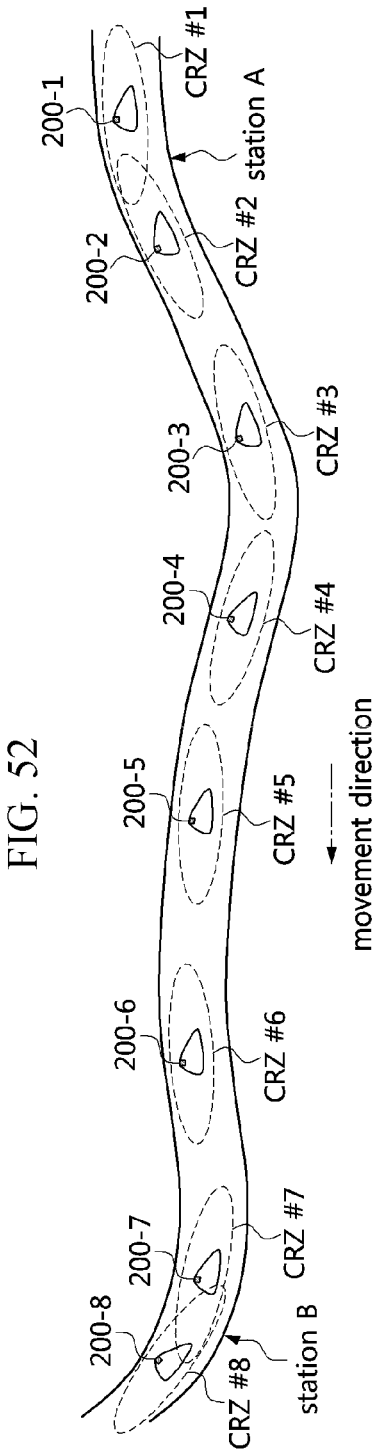
FIG. 52 is a conceptual diagram illustrating a first embodiment of a CRZ of a vehicle.

FIG. 52 is a conceptual diagram illustrating a first embodiment of a CRZ of a vehicle.

Referring to FIG. 52, a plurality of vehicles 200-1 to 200-8 may move in the tube, and may move from the station A to the station B. A CRZ for each of the plurality of vehicles 200-1 to 200-8 may be configured. The CRZ may include a good window, a dead window, and an interference window. The CRZ #3, CRZ #4, CRZ #5, and CRZ #6 may not overlap each other. Therefore, communication services may be provided to the vehicles 200-3, 200-4, 200-5, and 200-6 using the entire frequency band in the CRZ #3, the CRZ #4, the CRZ #5, and the CRZ #6. That is, the communication services may be provided using the same time-frequency resources within the non-overlapping CRZ.

However, the CRZs may be overlapped according to an operation schedule at the starting point (e.g., station A) and the arrival point (e.g., station B). For example, the CRZ #1 of the vehicle 200-1 may be overlapped with the CRZ #2 of the vehicle 200-2 in the station A, and the CRZ #7 of the vehicle 200-7 may be overlapped with the CRZ #8 of the vehicle 200-8 in the station B. Interference may occur when communication services are provided to the vehicles 200-1, 200-2, 200-7, and 200-8 using the entire frequency band within the overlapping CRZs. Therefore, within the overlapping CRZs, the time-frequency resources may be configured as follows.

Figure 53:
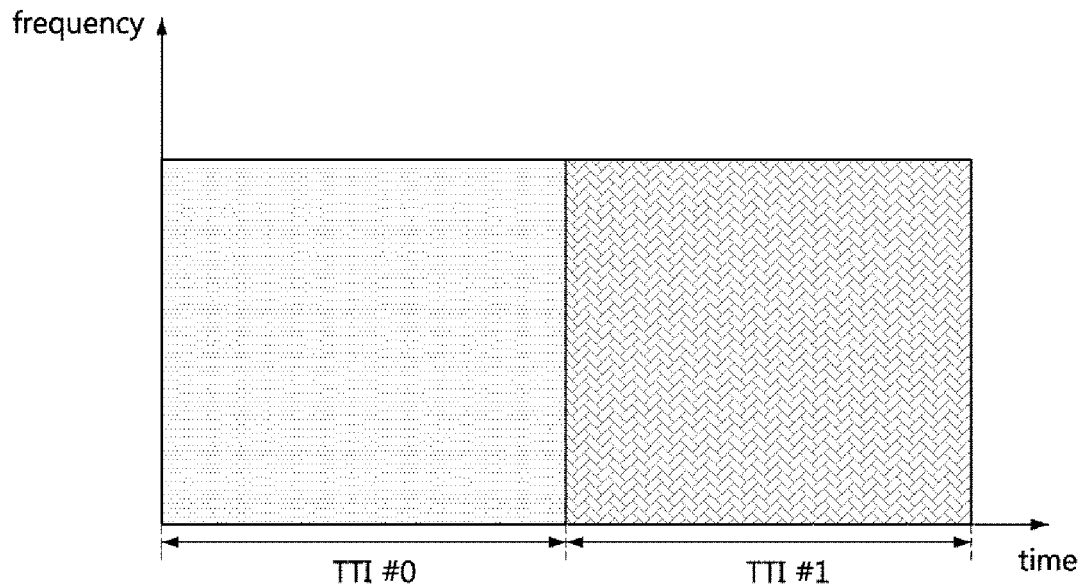
FIG. 53 is a conceptual diagram illustrating a first embodiment of a method for allocating time-frequency resources in overlapping CRZs.

FIG. 53 is a conceptual diagram illustrating a first embodiment of a method for allocating time-frequency resources in overlapping CRZs.

Referring to FIG. 53, when the CRZ #1 of the vehicle 200-1 is overlapped with the CRZ #2 of the vehicle 200-2, time-frequency resources may be configured based on a time division duplex (TDD) scheme. For example, the entire frequency resources may be configured for the CRZs #1 and #2, and time resources may be configured for the CRZs #1 and #2 to be orthogonal. The time-frequency resources may be configured such that interference does not occur between the overlapping CRZs. In this case, the vehicle 120-1 belonging to the CRZ #1 may perform communication using a TTI #1, and the vehicle 120-1 belonging to the CRZ #2 may perform communication using a TTI #2.

Figure 54:
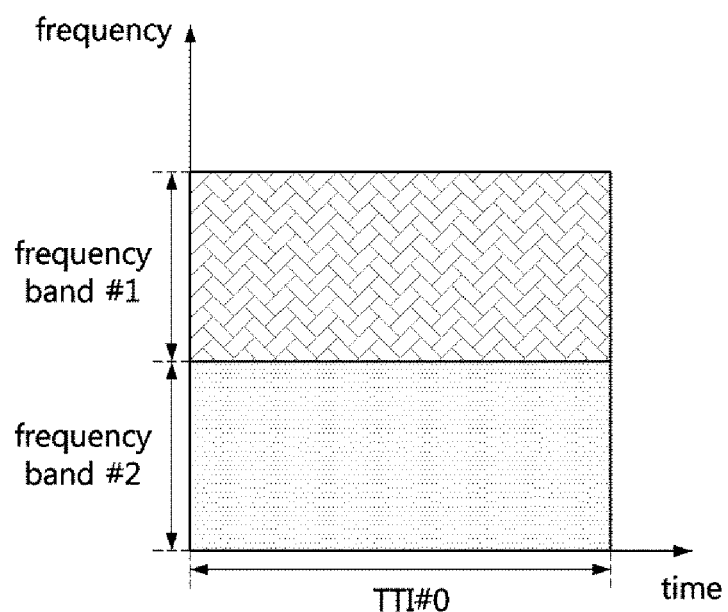
FIG. 54 is a conceptual diagram illustrating a second embodiment of a method for allocating time-frequency resources in overlapping CRZs.

FIG. 54 is a conceptual diagram illustrating a second embodiment of a method for allocating time-frequency resources in overlapping CRZs.

Referring to FIG. 54, when the CRZ #1 of the vehicle 200-1 is overlapped with the CRZ #2 of the vehicle 200-2, time-frequency resources may be configured based on a frequency division duplex (FDD) scheme. For example, the entire time resources may be configured for the CRZs #1 and #2, and frequency resources may be configured for the CRZs #1 and #2 to be orthogonal. The time-frequency resources may be configured such that interference does not occur between the overlapping CRZs. In this case, the vehicle 120-1 belonging to the CRZ #1 may perform communication using a frequency band #1, and the vehicle 120-1 belonging to the CRZ #2 may perform communication using a frequency band #2.

Meanwhile, RBs may be configured for communication between the communication system 100 and the vehicle 200, and the RBs between the communication system 100 and the vehicle 200 in the system of FIG. 50 may be configured as follows.

Figure 55:
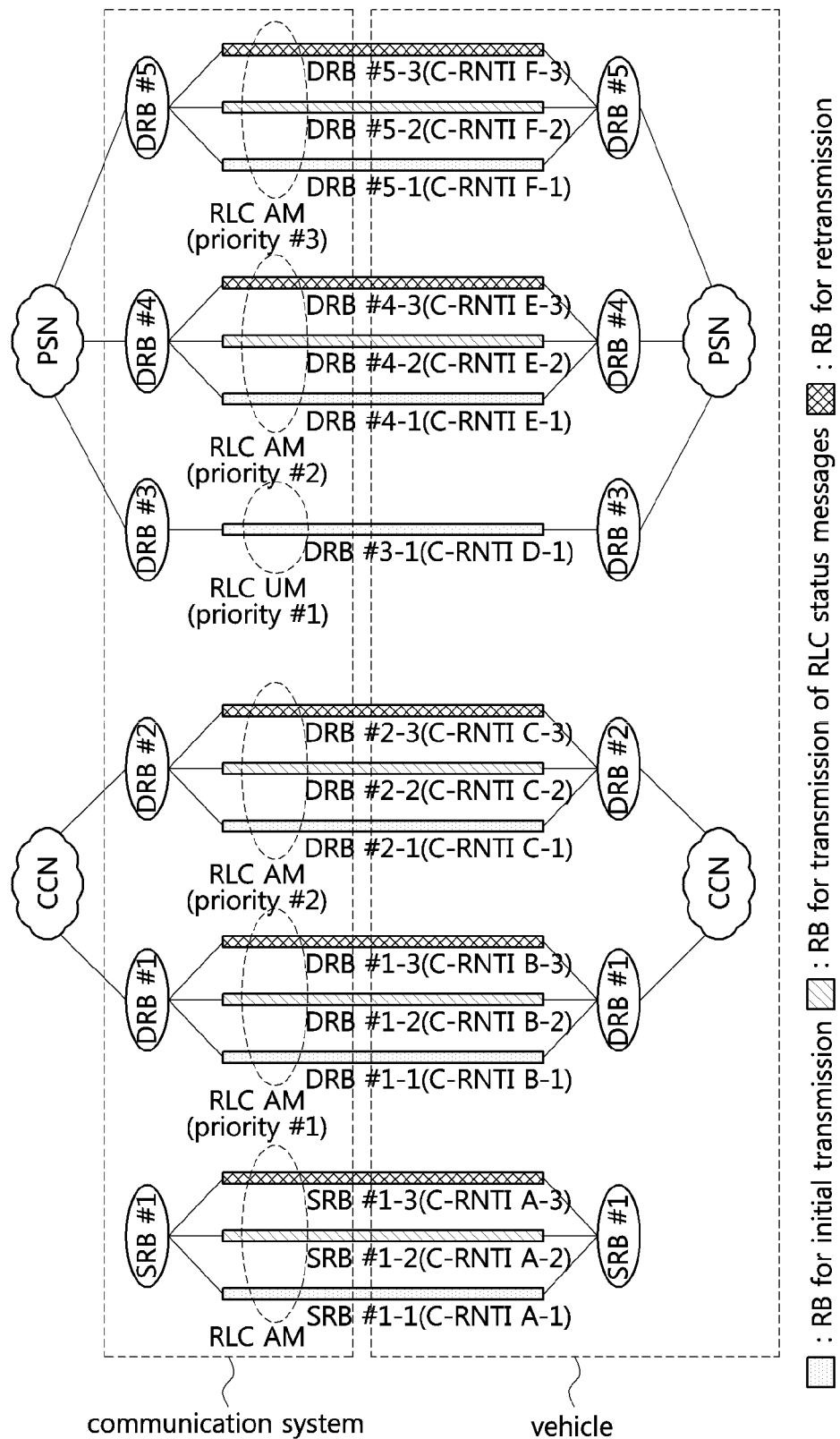
FIG. 55 is a conceptual diagram illustrating a first embodiment of RBs configured between a communication system and a vehicle.

FIG. 55 is a conceptual diagram illustrating a first embodiment of RBs configured between a communication system and a vehicle.

Referring to FIG. 55, a plurality of RBs (e.g., SRB #1, DRB #1, DRB #2, DRB #3, DRB #4 and DRB #5) may be configured between the communication system 100 and the vehicle 200. The SRB #1 may be used for transmission of control information including semi-static scheduling information and the like. The transmission of the SRB #1 may be performed based on the RLC AM since the control information should be transmitted and received without loss of packets. The DRBs #1 and #2 connected to the CCN may be used for transmission of operation information of the vehicle 200, and the DRBs #3 to #5 connected to the PSN may be used for transmission of user data (e.g., data for the passengers of the vehicle 200). The priorities of packet processing for the RBs may be 'SRB #1 (priority A)>DRBs #1 and #2 connected to the CCN (priority B)>DRBs #3 to #5 connected to the PSN (priority B)'. The priorities (i.e., priorities #1, #2, and #3) within the DRB may be determined according to the type (e.g., control information, data) and importance of the packet. When loss of packet is not allowed, the communication may be performed based on the RLC AM. When loss of packet is allowed, the communication may be performed based on RLC transport mode (TM) or RLC unacknowledged mode (UM).

A C-RNTI may be configured for each RB. The C-RNTI of the RB (e.g., SRB #1-1, DRB #1-1, DRB #2-1, DRB #4-1, and DRB #5-1) for initial transmission, the C-RNTI of the RB (e.g., SRB #1-2, DRB #1-2, DRB #2-2, DRB #4-2, and DRB #5-2) for transmission of RLC status messages, and the C-RNTI of the RB (e.g., SRB #1-3, DRB #1-3, DRB #2-3, DRB #4-3, and DRB #5-3) for retransmission may be independently configured. The RB may be scheduled based on the independently configured C-RNTI. For example, the initial transmission may be performed through the DRB #1-1 scheduled by a C-RNTI B-1, the transmission of the RLC status messages may be performed through the DRB #1-2 scheduled by a C-RNTI B-2, and the retransmission may be performed through the DRB #1-3 scheduled by a C-RNTI B-3.

That is, the RBs to which the RLC AM is applied may be classified into three RBs, and the C-RNTI for each of the three RBs may be independently configured. The C-RNTI for the RB for initial transmission may be basically configured, and the C-RNTI for transmission of RLC status messages and the C-RNTI for retransmission may be additionally configured. Since the C-RNTI is independently configured for each RB, it may be easy to synchronize the contents when the communication based on the JT scheme or the JR scheme is performed. Alternatively, one C-RNTI may be configured for the RBs to which the RLC AM is applied, and three resources (e.g., resource for initial transmission, resource for transmission of RLC status messages, and resource for retransmission) may be allocated based on the one C-RNTI.

Method for Measuring a Position of Vehicle

Meanwhile, the communication system 100 may configure a sliding window corresponding to the position of the vehicle 200, and should have information on the position of the vehicle 200 in order to configure the sliding window. Methods for measuring the position of the vehicle 200 may be performed as follows.

Figure 56:
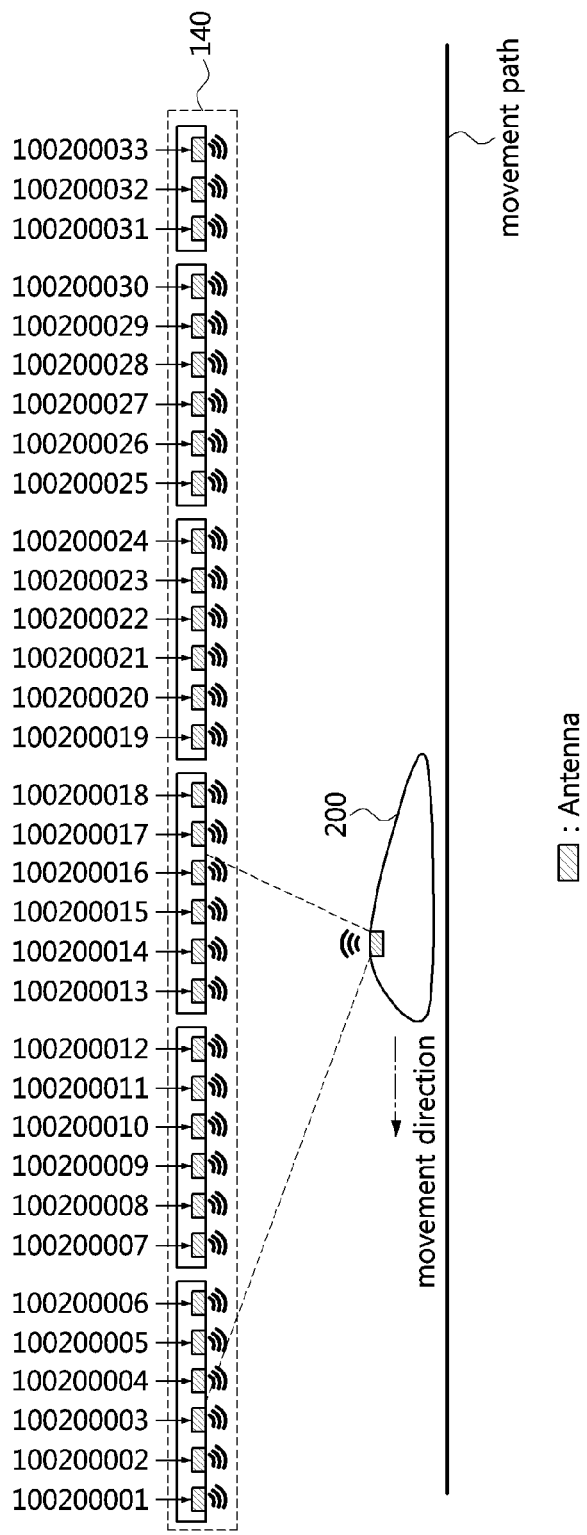
FIG. 56 is a conceptual diagram illustrating a unique identification number assigned to an antenna included in an LA2M of a communication system.
Figure 57:
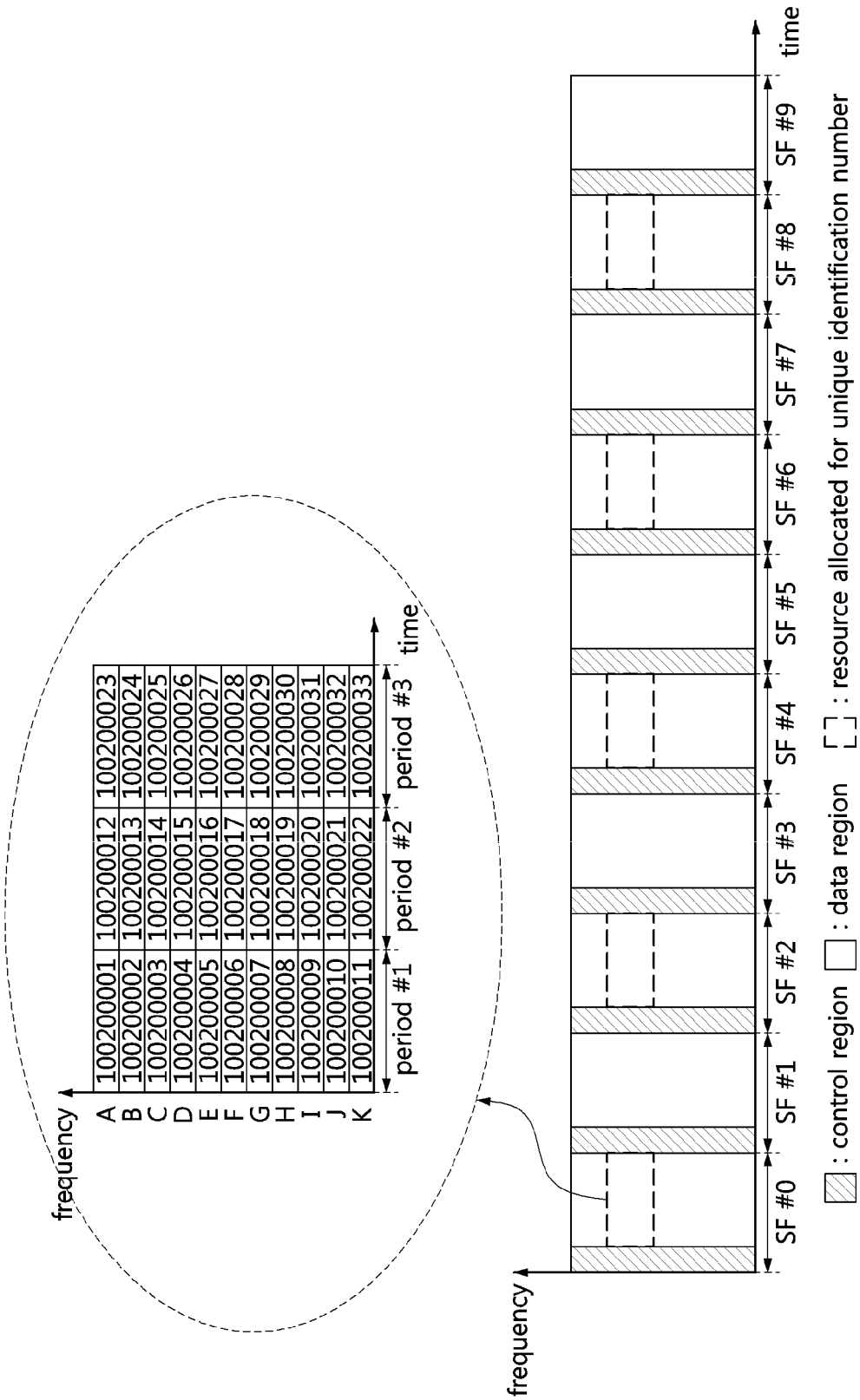
FIG. 57 is a conceptual diagram illustrating a first embodiment of a method for transmitting a unique identification number.

FIG. 56 is a conceptual diagram illustrating a unique identification number assigned to an antenna included in an LA2M of a communication system, and FIG. 57 is a conceptual diagram illustrating a first embodiment of a method for transmitting a unique identification number.

Referring to FIGS. 56 and 57, a plurality of antennas belonging to the LA2M 140 of the communication system 100 may be respectively given unique identification numbers. For example, unique identification numbers 100200001 to 100200033 may be sequentially assigned to the plurality of antennas. The unique identification number may be mapped to the position of the antenna to which the unique identification number is assigned, and the position of the vehicle 200 may be measured based on the unique identification number. The antenna may transmit a signal including its unique identification number. The unique identification number may be transmitted through a pre-allocated time-frequency resource. For example, the time-frequency resource for transmission of the unique identification number may be configured every two TTIs, and the time-frequency resources for the unique identification numbers may be configured sequentially within one TTI. The number of unique identification numbers transmitted within one TTI may be more than the number of antennas belonging to the good window. In a period #1, frequency resources for the unique identification numbers 100200001 to 100200011 may be allocated to be orthogonal. In a period #2, frequency resources for the unique identification numbers 100200012 to 100200022 may be allocated to be orthogonal. In a period

3, frequency resources for the unique identification numbers 100200023 to 100200033 may be allocated to be orthogonal.

Meanwhile, the vehicle 200 may receive signals from the plurality of antennas of the communication system 100, and may identify the unique identification number of each of the plurality of antennas based on the received signal. The unique identification number of the antenna identified in the vehicle 200 may be as follows.

Figure 58:
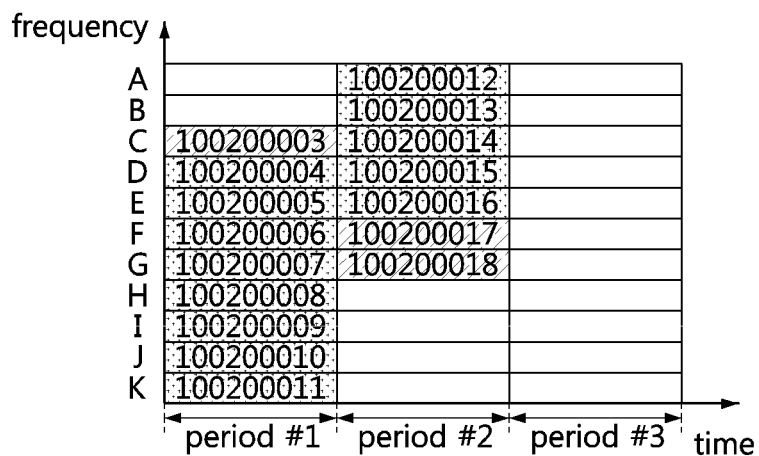
FIG. 58 is a conceptual diagram illustrating a unique identification number identified by a vehicle.
Figure 59:
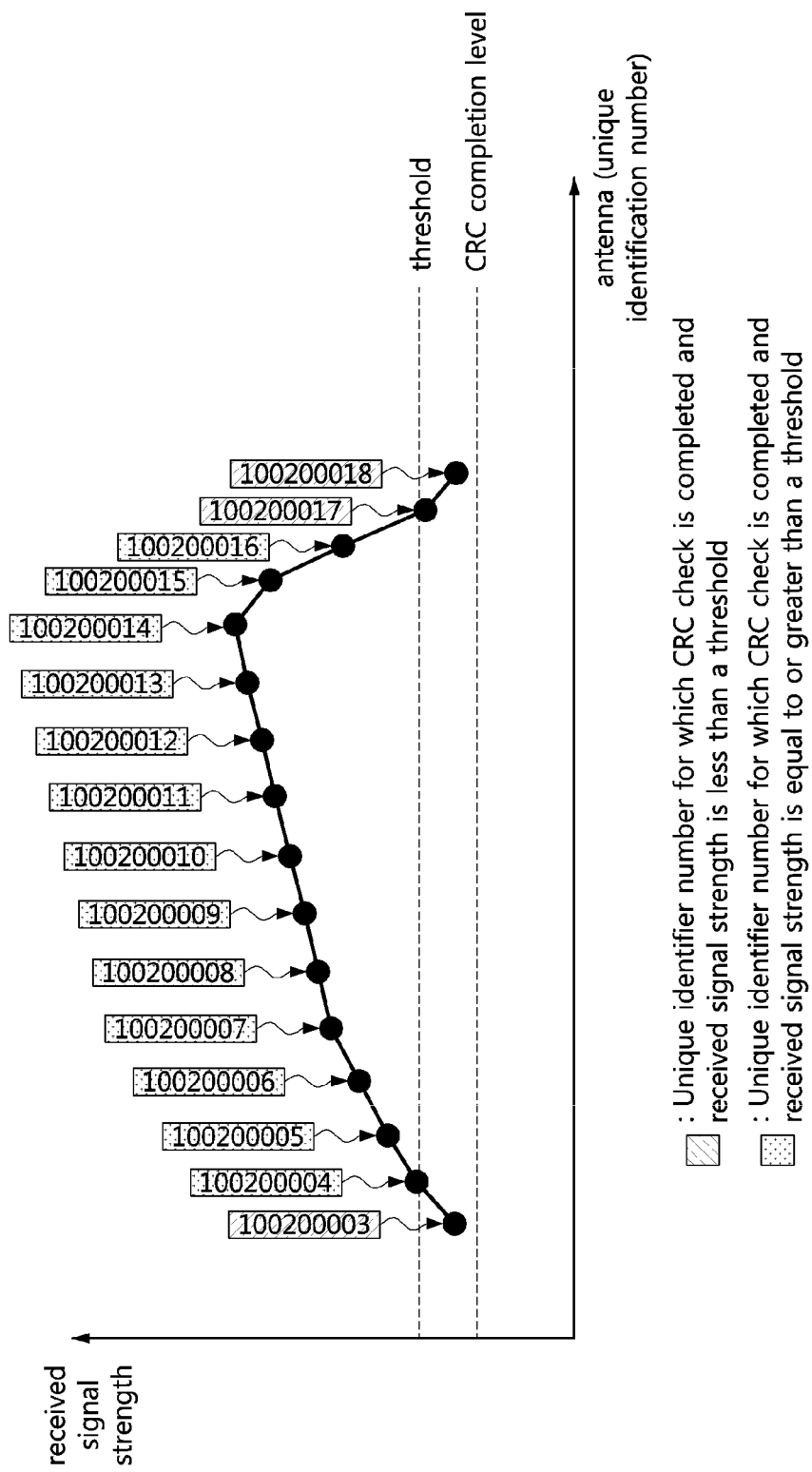
FIG. 59 is a graph illustrating a received signal strength of a signal including a unique identification number.

FIG. 58 is a conceptual diagram illustrating a unique identification number identified by a vehicle, and FIG. 59 is a graph illustrating a received signal strength of a signal including a unique identification number.

Referring to FIGS. 58 and 59, the vehicle 200 may receive signals from the plurality of antennas belonging to the LA2M 140, identify the unique identification numbers by decoding the signals, and may select at least one unique identification number to be used for position measurement. For example, the vehicle 200 may perform CRC checks on signals including the unique identification numbers 100200001 to 100200033, and identify unique identification numbers (e.g., 100200003 to 100200018) for which the CRC check has been successfully completed. The vehicle 200 may select unique identification numbers (e.g., 100200004 to 100200016) whose received signal strength is equal to or greater than a threshold among the identified unique identification numbers 100200003 to 100200018. Since the received signal strength of the signal including the unique identification number 100200014 is the greatest among the selected unique identification numbers 100200004 to 100200016, the position of the antenna transmitting the signal including the unique identification number 100200014 may be estimated as the position of the vehicle 200.

However, since the position of the vehicle 200 is estimated based on the antenna of the vehicle 200, it is necessary to correct the estimated position when the position measurement reference is other than the antenna. A method of correcting the position of the vehicle 200 may be performed as follows.

Figure 60:
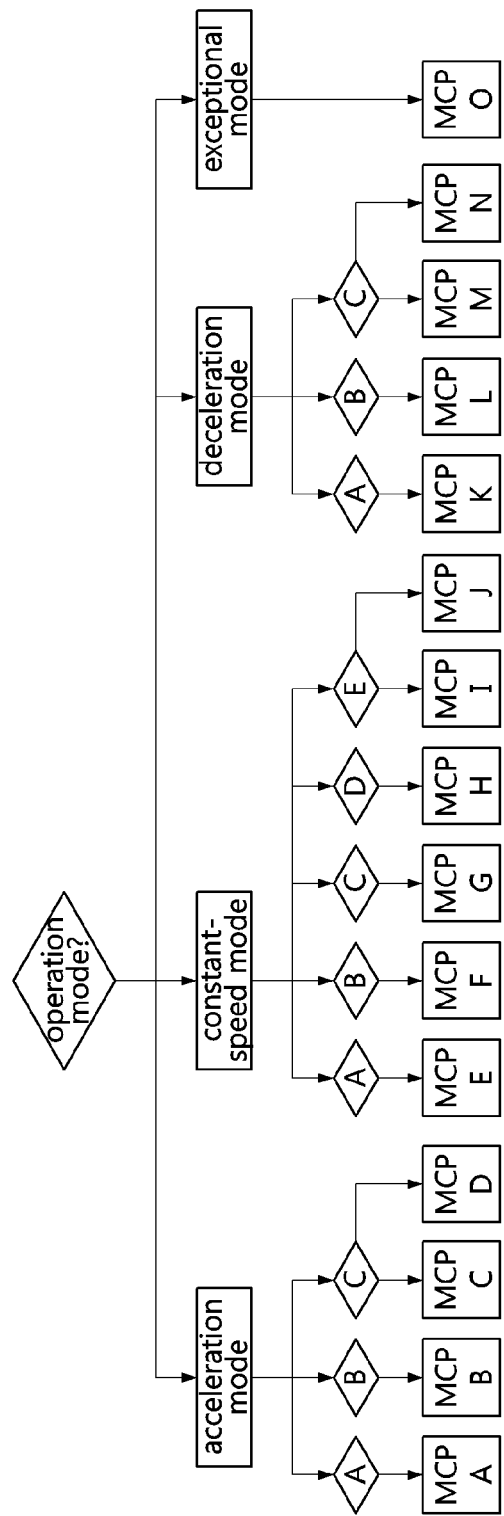
FIG. 60 is a flowchart illustrating a first embodiment of a method for correcting a vehicle position.

FIG. 60 is a flowchart illustrating a first embodiment of a method for correcting a vehicle position.

Referring to FIG. 60, the position of the vehicle 200 may be corrected based on the operation mode (e.g., acceleration mode, constant-speed mode, deceleration mode) of the vehicle 200. In FIG. 51, the acceleration mode of the vehicle 200 may be classified into acceleration modes A, B and C, the constant-speed mode of the vehicle 200 may be classified into constant-speed modes A, B, C, D and E, and the deceleration mode of the vehicle 200 may be classified into the deceleration modes A and B. An absolute position (AP) of the vehicle 200 may be calculated based on Equation 1 below.

$$AP = DAP + CP \qquad \text{[Equation 1]}$$

That is, the AP of the vehicle 200 may be a sum of a detective absolute position (DAP) and a calibration position (CP). The DAP may be a position corresponding to the antenna transmitting the signal including the unique identification number 100200014 in FIGS. 58 and 59. The CP may be calculated based on Equation 2 below.

$$CP = PCP + SCP + MCP \qquad \text{[Equation 2]}$$

A physical calibration position (PCP) may be a physical correction value for the position measurement reference of the vehicle 200. A scheduling calibration position (SCP) may be a value for correcting a propagation delay characteristic for the signal including the unique identification number. A mode calibration position (MCP) may be a correction value for each operation mode based on an operation history of the vehicle 200. For example, when the operation mode of the vehicle 200 is the acceleration mode C, an MCP C or an MCP D may be applied. The MCP C or the MCP D may be a fixed value, and the position of the vehicle 200 may be corrected based on a variable that increases in proportion to the speed in the acceleration mode C. Meanwhile, the vehicle 200 may be operated in an exceptional mode (e.g., an operation mode of the vehicle 200 in an emergency situation), and an MCP O that is applied to the exceptional mode may be defined. The MCP O may not be a constant value but may be a variable that is affected by certain factors.

Meanwhile, a method of measuring the position of the vehicle 200 based on the signal transmitted from the vehicle 200 may be as follows.

Figure 61:
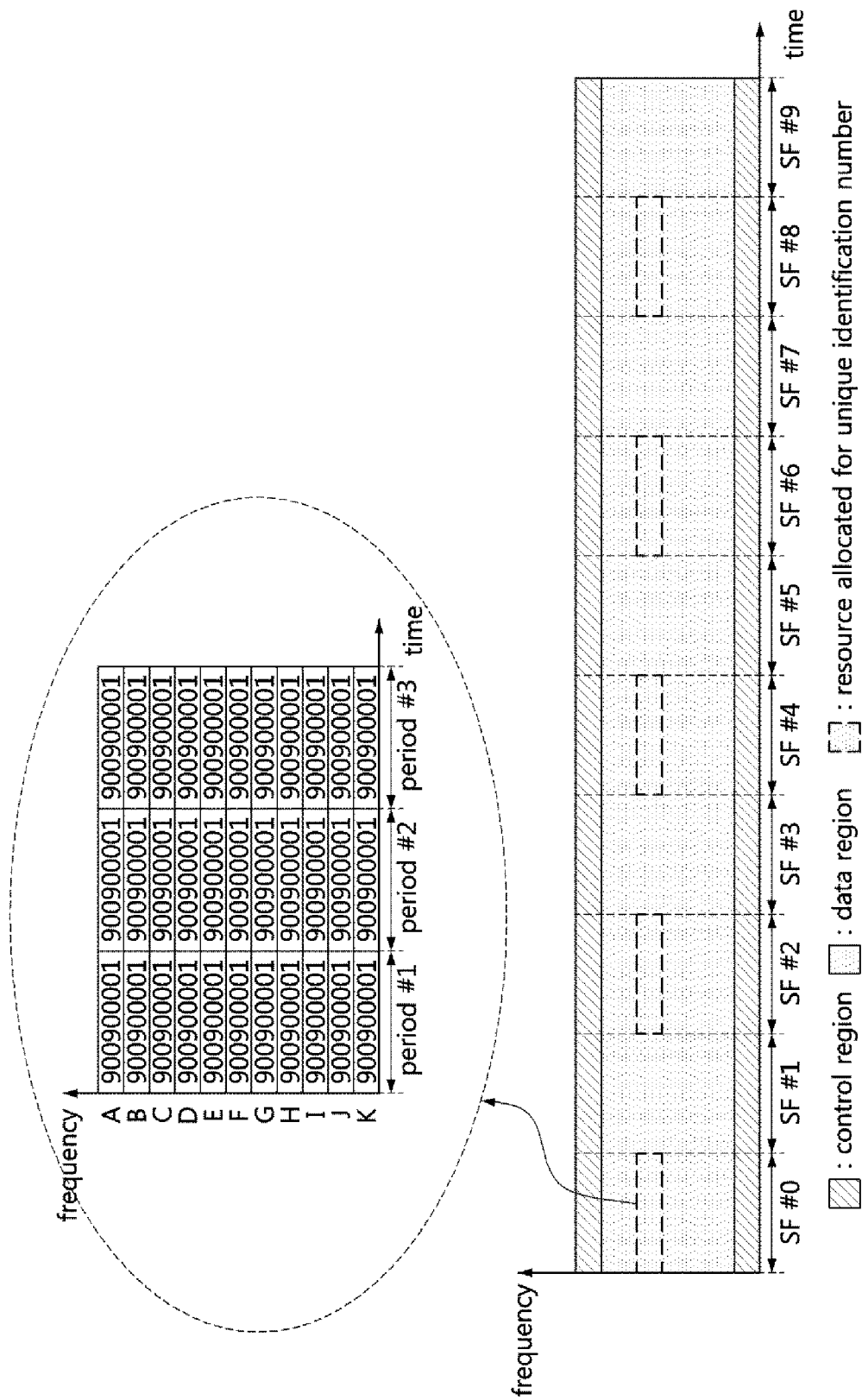
FIG. 61 is a conceptual diagram illustrating a second embodiment of a method for transmitting a unique identification number.

FIG. 61 is a conceptual diagram illustrating a second embodiment of a method for transmitting a unique identification number.

Referring to FIG. 61, the vehicle 200 may be given a unique identification number, and the vehicle 200 may transmit a signal including its unique identification number. The unique identification number of the vehicle 200 may be set to 9009000001. The unique identification number may be transmitted through pre-allocated time-frequency resources. For example, the time-frequency resources for transmission of the unique identification number may be configured every two TTIs, and the time-frequency resources for unique identification numbers may be configured sequentially within one TTI. The unique identification number of the vehicle 200 may be repeatedly transmitted through the time-frequency resources.

The plurality of antennas included in the LA2M 140 of the communication system 100 may receive the signal including the unique identification number from the vehicle 200. When the signal including the unique identification number is transmitted from the vehicle 200 in FIG. 56, the antennas corresponding to the unique identification numbers 100200003 to 100200018 among the plurality of antennas included in the LA2M 140 may receive the signal including the unique identification number of the vehicle 200. The received signal strengths of the signal including the unique identification number of the vehicle 200 received at the antennas corresponding to the unique identification numbers 100200003 to 100200018 may be identical to those shown in the graph of FIG. 59.

For example, the signal containing the unique identification number of the vehicle 200 may be received at the antennas corresponding to the unique identification numbers 100200003 and 100200018, but the CRC for the received signals may fail. The signal including the unique identification number of the vehicle 200 may be received from the antenna corresponding to the unique identification number 100200017, and a CRC check for the received signal may be successfully completed, but the received signal strength of the signal may be less than a threshold. In this case, the position of the vehicle 200 may be determined based on the antennas corresponding to the unique identification numbers 100200004 and 100200016. Since the received signal strength of the signal including the unique identification number of the vehicle 200 received at the antenna corresponding to the unique identification number 100200014 is the greatest, the position of the antenna corresponding to the unique identification number 100200014 may be estimated as the position of the vehicle 200.

Alternatively, the time-frequency resource through which the signal including the unique identification number of the vehicle 200 is transmitted may be mapped to the antenna included in the LA2M 140 as shown in Tables 1 to 3 below.

resource index of Tables 1 to 3) in order to receive the signal including the unique identification number of the vehicle 200. For example, the CRC check for the signal including the unique identification number of the vehicle 200 may be

TABLE 1

| Resource index | Time resource | Frequency resource | Unique identification number of antenna | Decoding result | Received signal strength |
|---|---|---|---|---|---|
| #1 | Period #1 | A | 100200001 | CRC failure | Less than threshold |
| #2 | Period #1 | B | 100200002 | CRC failure | Less than threshold |
| #3 | Period #1 | C | 100200003 | 900200001 | Less than threshold |
| #4 | Period #1 | D | 100200004 | 900200001 | Equal to or greater than threshold |
| #5 | Period #1 | E | 100200005 | 900200001 | Equal to or greater than threshold |
| #6 | Period #1 | F | 100200006 | 900200001 | Equal to or greater than threshold |
| #7 | Period #1 | G | 100200007 | 900200001 | Equal to or greater than threshold |
| #8 | Period #1 | H | 100200008 | 900200001 | Equal to or greater than threshold |
| #9 | Period #1 | I | 100200009 | 900200001 | Equal to or greater than threshold |
| #10 | Period #1 | J | 100200010 | 900200001 | Equal to or greater than threshold |
| #11 | Period #1 | K | 100200011 | 900200001 | Equal to or greater than threshold |

TABLE 2

| Resource index | Time resource | Frequency resource | Unique identification number of antenna | Decoding result | Received signal strength |
|---|---|---|---|---|---|
| #12 | Period #2 | A | 100200012 | 900200001 | Equal to or greater than threshold |
| #13 | Period #2 | B | 100200013 | 900200001 | Equal to or greater than threshold |
| #14 | Period #2 | C | 100200014 | 900200001 | Equal to or greater than threshold |
| #15 | Period #2 | D | 100200015 | 900200001 | Equal to or greater than threshold |
| #16 | Period #2 | E | 100200016 | 900200001 | Equal to or greater than threshold |
| #17 | Period #2 | F | 100200017 | CRC failure | Less than threshold |
| #18 | Period #2 | G | 100200018 | CRC failure | Less than threshold |
| #19 | Period #2 | H | 100200019 | CRC failure | Less than threshold |
| #20 | Period #2 | I | 100200020 | CRC failure | Less than threshold |
| #21 | Period #2 | J | 100200021 | CRC failure | Less than threshold |
| #22 | Period #2 | K | 100200022 | CRC failure | Less than threshold |

TABLE 3

| Resource index | Time resource | Frequency resource | Unique identification number of antenna | Decoding result | Received signal strength |
|---|---|---|---|---|---|
| #23 | Period #3 | A | 100200023 | CRC failure | Less than threshold |
| #24 | Period #3 | B | 100200024 | CRC failure | Less than threshold |
| #25 | Period #3 | C | 100200025 | CRC failure | Less than threshold |
| #26 | Period #3 | D | 100200026 | CRC failure | Less than threshold |
| #27 | Period #3 | E | 100200027 | CRC failure | Less than threshold |
| #28 | Period #3 | F | 100200028 | CRC failure | Less than threshold |
| #29 | Period #3 | G | 100200029 | CRC failure | Less than threshold |
| #30 | Period #3 | H | 100200030 | CRC failure | Less than threshold |
| #31 | Period #3 | I | 100200031 | CRC failure | Less than threshold |
| #32 | Period #3 | J | 100200032 | CRC failure | Less than threshold |
| #33 | Period #3 | K | 100200033 | CRC failure | Less than threshold |

Each of the antennas included in the LA2M 140 may perform a monitoring operation on the preconfigured resources (e.g., time-frequency resources indicated by the performed successfully at the antennas corresponding to the unique identification numbers 100200003 and 100200016, and the received signal strengths of the signal including the unique identification number of the vehicle 200 received at the antennas corresponding to the unique identification numbers 100200004 and 100200016 may be greater than or equal to a threshold. In addition, the received signal strength of the signal including the unique identification number of the vehicle 200 received in the time-frequency resource indicated by the resource index #14 may be the greatest, and in this case, the position of the antenna mapped to the resource index #14 may be estimated as the position of the vehicle 200. When the position of the vehicle 200 is estimated, the estimated position may be corrected based on the position correction method described with reference to FIG. 60. For example, the estimated position may be a DAP, and may be corrected based on a PCP, an SCP or an MCP.

Meanwhile, an AP may be obtained by applying a C algorithm (e.g., the position correction method shown in FIG. 60) to the DAP obtained from the vehicle 200. The vehicle 200 may transmit the AP to the communication system 100 through the DRB connected to the CCN. The AP may be obtained by applying a G algorithm (e.g., the position correction method shown in FIG. 60) to the DAP obtained in the communication system 100. Also, the communication system 100 may obtain the correct AP by applying an F algorithm to the AP obtained from the communication system 100 and the AP obtained from the vehicle 200. Here, the F algorithm may consider the propagation delay. The communication system 100 may transmit the AP obtained through the F algorithm to the vehicle 200 through the DRB connected to the CCN. The vehicle 200 may obtain the AP from communication system 100, and the obtained AP may be used as an input to the C algorithm.

Meanwhile, when the antennas included in the LA2M 140 transmit the signal including the unique identification number through the same time-frequency resources, a dead window may occur. Considering a dead window, the time-frequency resources for the signal including the unique identification number of the antenna may be configured as follows.

Figure 62:
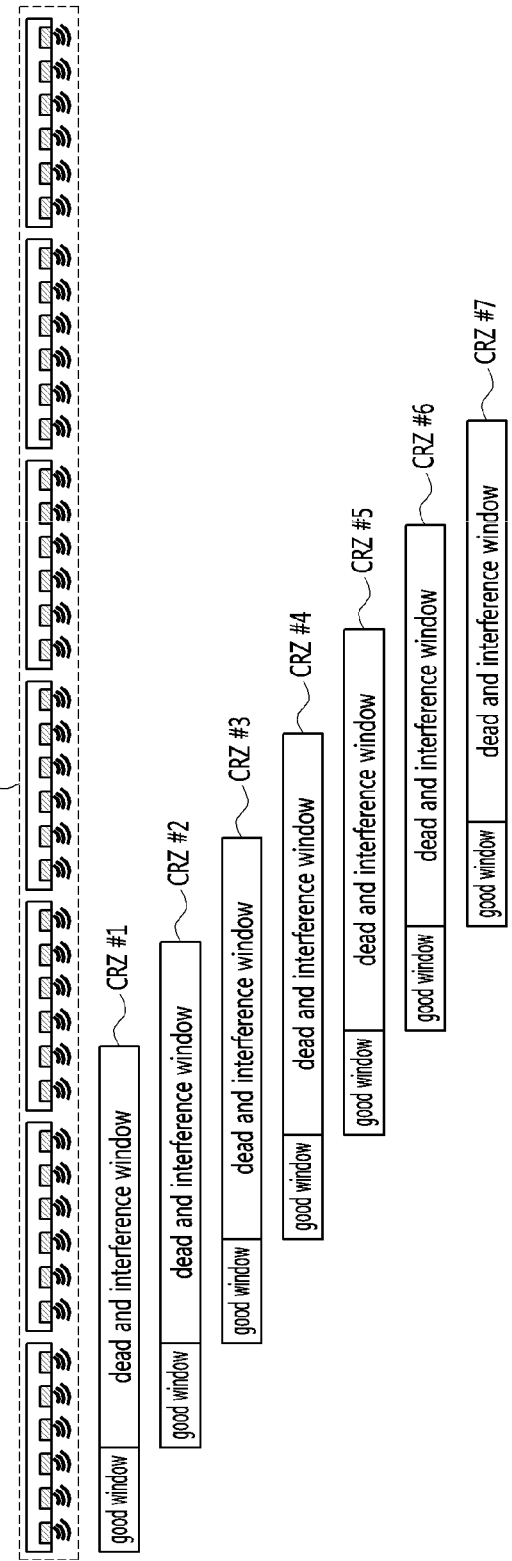
FIG. 62 is a conceptual diagram illustrating downlink CRZs arranged in units of a good window.
Figure 63:
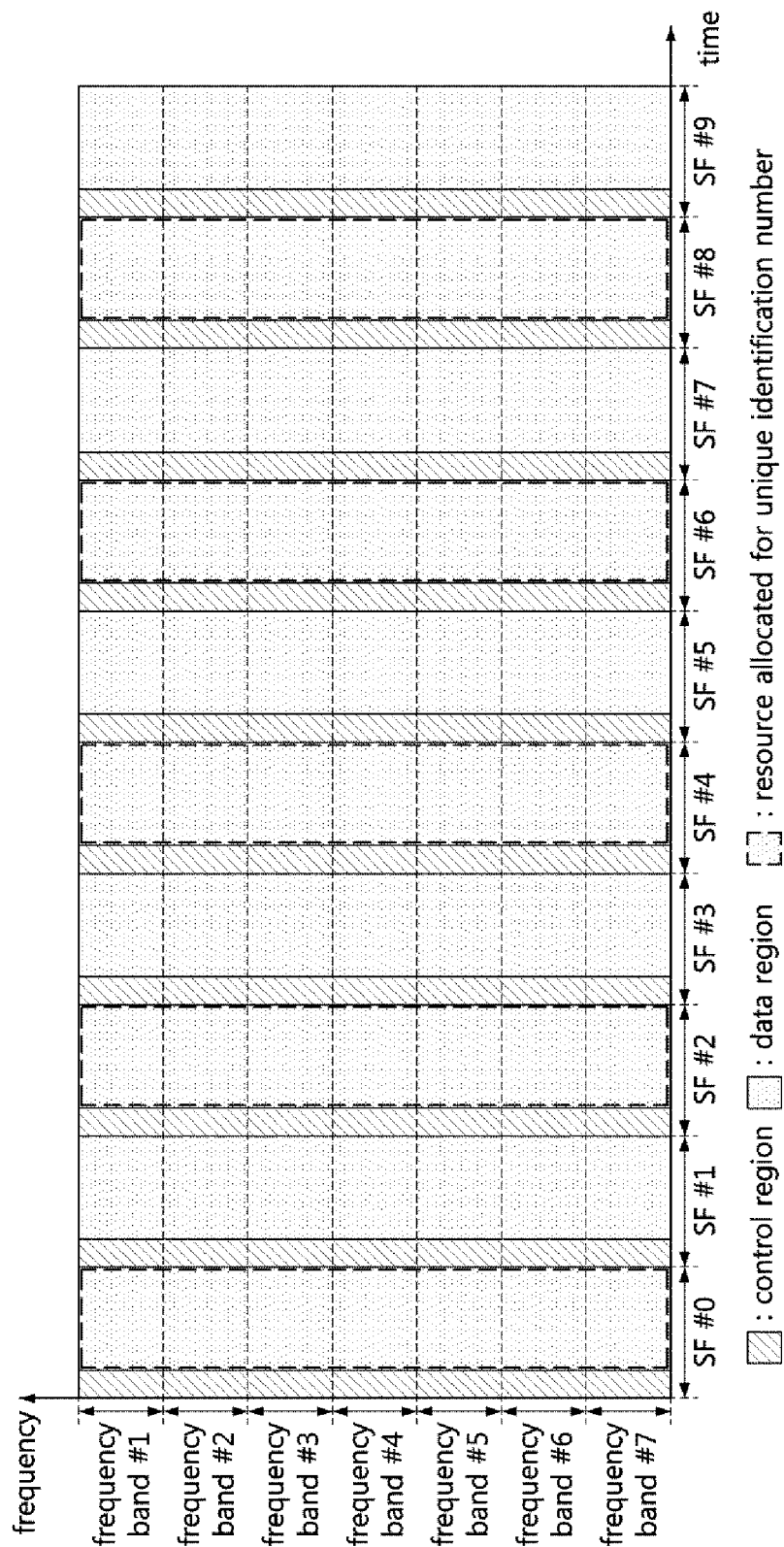
FIG. 63 is a conceptual diagram illustrating a third embodiment of a method for transmitting a unique identification number.

FIG. 62 is a conceptual diagram illustrating downlink CRZs arranged in units of a good window, and FIG. 63 is a conceptual diagram illustrating a third embodiment of a method for transmitting a unique identification number.

Referring to FIGS. 62 and 63, antennas belonging to the good window of CRZ #1 may transmit the signal including the unique identification number using a frequency band #1, antennas belonging to the good window of CRZ #2 may transmit the signal including the unique identification number using a frequency band #2, antennas belonging to the good window of CRZ #3 may transmit the signal including the unique identification number using a frequency band #3, and antennas belonging to the good window of CRZ #4 may transmit the signal including the unique identification number using a frequency band #4. Also, antennas belonging to the good window of CRZ #5 may transmit the signal including the unique identification number using a frequency band #5, antennas belonging to the good window of CRZ #6 may transmit the signal including the unique identification number using a frequency band #6, and antennas belonging to the good window of CRZ #7 may transmit the signal including the unique identification number using a frequency band #7.

The frequency resources for the antennas included in the LA2M 140 may be sequentially configured based on the above-described method. In this case, the reception performance of the signal including the unique identification number of the antenna may be prevented from deteriorating due to the dead window and the interference window. Here, when only the frequency bands #1 to #5 are configured, the reception performance degradation due to the dead window and the interference window may be prevented. However, the frequency bands #1 to #7 may be configured in order to sufficiently cover the dead window and the interference window.

Meanwhile, when the signal including the unique identification number of the vehicle 200 is transmitted through the same time-frequency resource, a dead window may occur. Considering the dead window, the time-frequency resource for the signal including the unique identification number of the vehicle 200 may be configured as follows.

Figure 64:
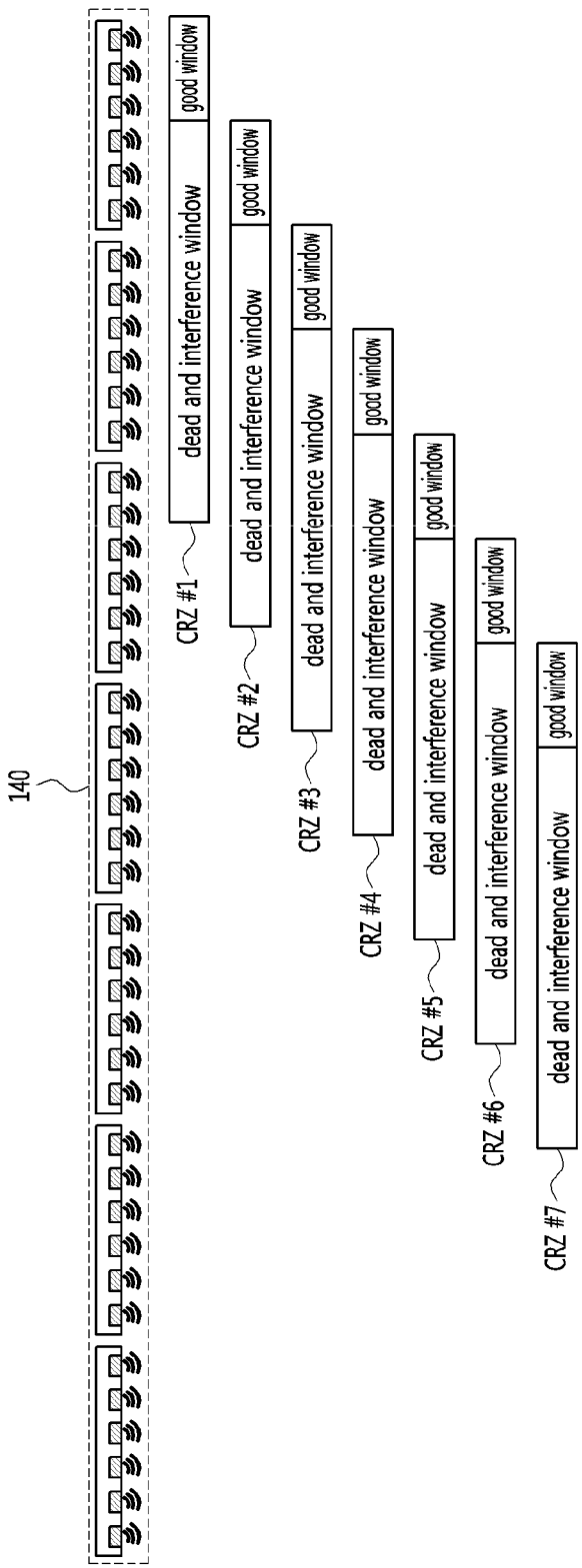
FIG. 64 is a conceptual diagram illustrating uplink CRZs arranged in units of a good window.
Figure 65:
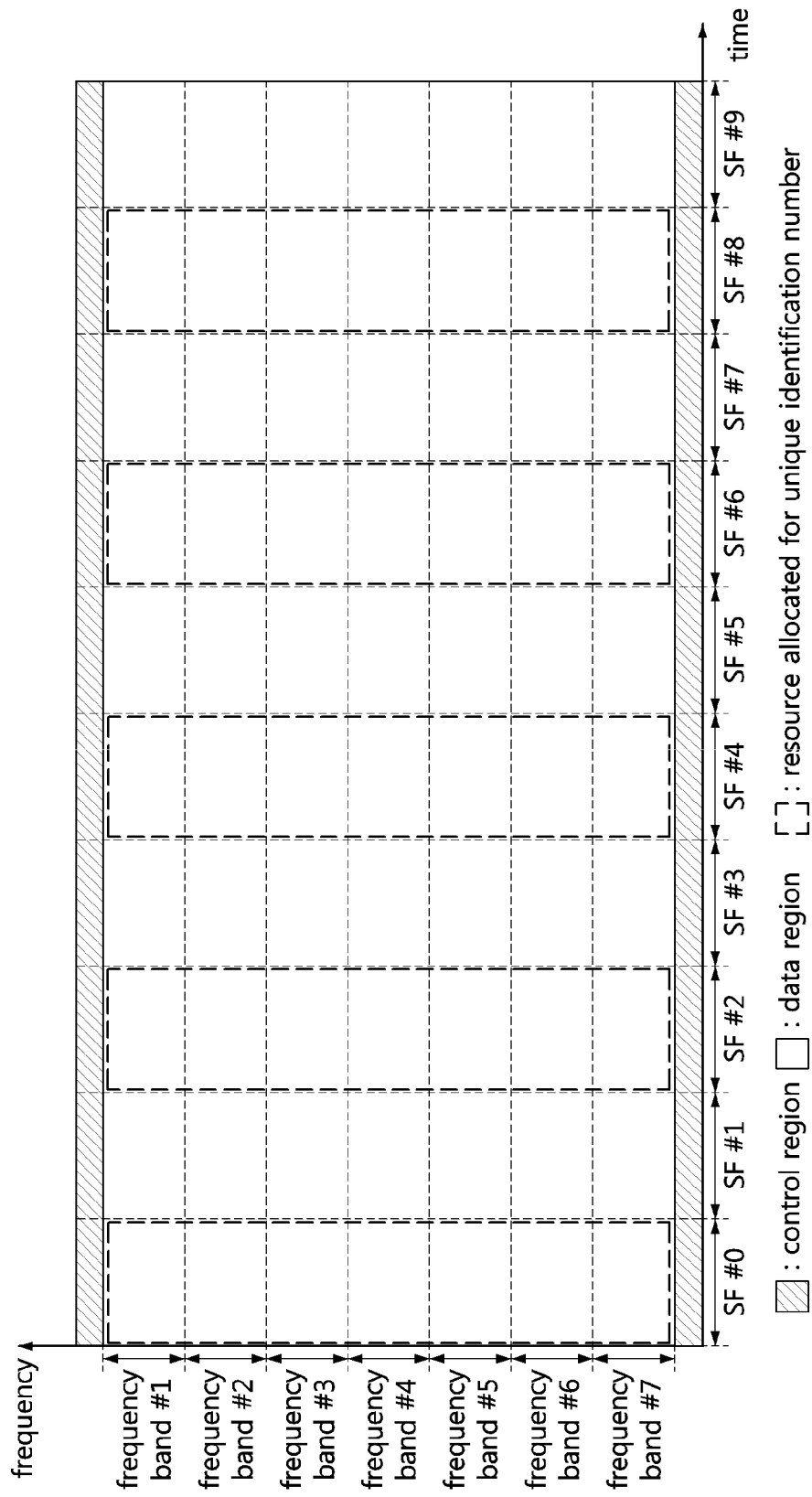
FIG. 65 is a conceptual diagram illustrating a fourth embodiment of a method for transmitting a unique identification number.

FIG. 64 is a conceptual diagram illustrating uplink CRZs arranged in units of a good window, and FIG. 65 is a conceptual diagram illustrating a fourth embodiment of a method for transmitting a unique identification number.

Referring to FIGS. 64 and 65, the vehicle belonging to the good window of CRZ #1 may transmit the signal including the unique identification number using a frequency band #1, the vehicle belonging to the good window of CRZ #2 may transmit the signal including the unique identification number using a frequency band #2, the vehicle belonging to the good window of CRZ #3 may transmit the signal including the unique identification number using a frequency band #3, and the vehicle belonging to the good window of CRZ #4 may transmit the signal including the unique identification number using a frequency band #4. Also, the vehicle belonging to the good window of CRZ #5 may transmit the signal including the unique identification number using a frequency band #5, the vehicle belonging to the good window of CRZ #6 may transmit the signal including the unique identification number using a frequency band #6, and the vehicle belonging to the good window of CRZ #7 may transmit the signal including the unique identification number using a frequency band #7.

The frequency resources for transmission of the unique identification number may be sequentially configured based on the above-described method. In this case, the reception performance of the signal including the unique identification number of the vehicle may be prevented from deteriorating due to the dead window and the interference window. Here, when only the frequency bands #1 to #5 are configured, the reception performance degradation due to the dead window and the interference window may be prevented. However, the frequency bands #1 to #7 may be configured in order to sufficiently cover the dead window and the interference window.

Meanwhile, when time-frequency resources are allocated based on the FDD scheme in the overlapping CRZs, the data region of the overlapping CRZs may be configured in different frequency bands, and the control regions of the overlapping CRZs may be configured in the entire frequency band. In this case, since interference may occur between the CRZs overlapped in the control region, the scheduling information transmitted through the control region may not be received at the vehicle 200. In order to solve this problem, the control region may be configured as follows.

Figure 66:
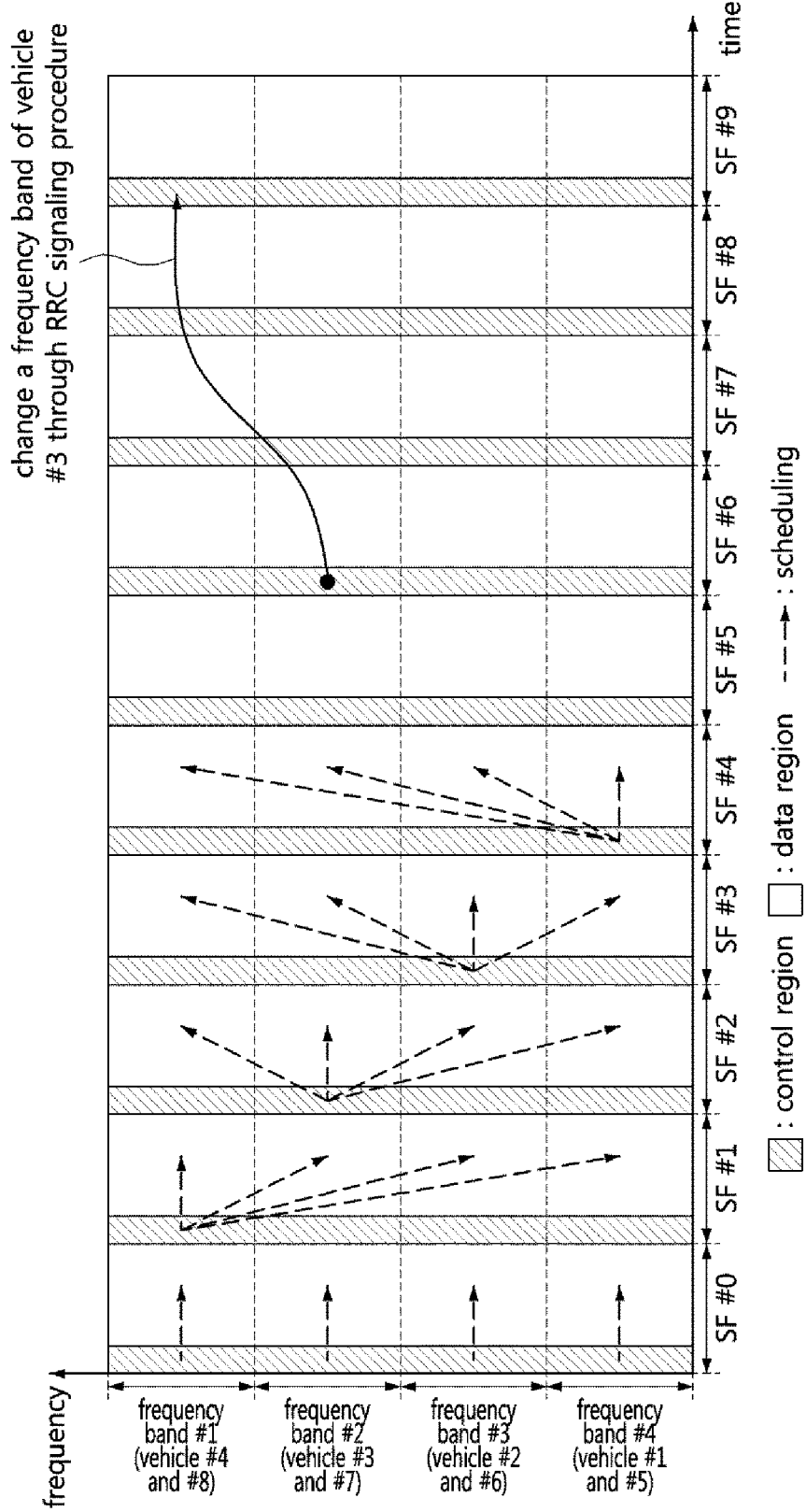
FIG. 66 is a conceptual diagram illustrating a first embodiment of downlink resources configured based on a FDD scheme.

FIG. 66 is a conceptual diagram illustrating a first embodiment of downlink resources configured based on a FDD scheme.

Referring to FIG. 66, since there is a high possibility that CRZs of adjacent vehicles overlap, frequency bands may be allocated according to a departure order of the vehicles. For example, a frequency resource for the vehicle 200-8 in FIG. 52 may be set to a frequency band #1, a frequency resource for the vehicle 200-7 in FIG. 52 may be set to a frequency band #2, a frequency resource for the vehicle 200-6 in FIG.

52 may be set to a frequency band #3, and a frequency resource for the vehicle 200-5 in FIG. 52 may be set to a frequency band #4. Also, a frequency resource for the vehicle 200-4 in FIG. 52 may be set to a frequency band #1, a frequency resource for the vehicle 200-3 in FIG. 52 may be set to a frequency band #2, a frequency resource for the vehicle 200-2 in FIG. 52 may be set to a frequency band #3, and a frequency resource for the vehicle 200-1 in FIG. 52 may be set to a frequency band #4.

The frequency band #1 may include a control region #1 and a data region #1, and scheduling information for the data region #1 may be transmitted through the control region #1. The frequency band #2 may include a control region #2 and a data region #2, and scheduling information for the data region #2 may be transmitted through the control region #2. The frequency band #3 may include a control region #3 and a data region #3, and scheduling information for the data region #3 may be transmitted through the control region #3. The frequency band #4 may include a control region #4 and a data region #4, and scheduling information for the data region #4 may be transmitted through the control region #4.

However, when the CRZs are not overlapped, a cross scheduling scheme may be used. For example, scheduling information for the data regions #1 to #4 may be transmitted through the control region #1. That is, even when the frequency band #1 is allocated for the vehicle 200-4, the communication system 100 may transmit the scheduling information for the data regions #1 to #4 to the vehicle 200-4 through the control region #1.

Meanwhile, when an emergency situation occurs during the operation of the vehicles 200-1, 200-2, 200-3, 200-4, 200-5, 200-6, 200-7, and 200-8, a specific vehicle may evacuate to an emergency space as follows.

Figure 67:
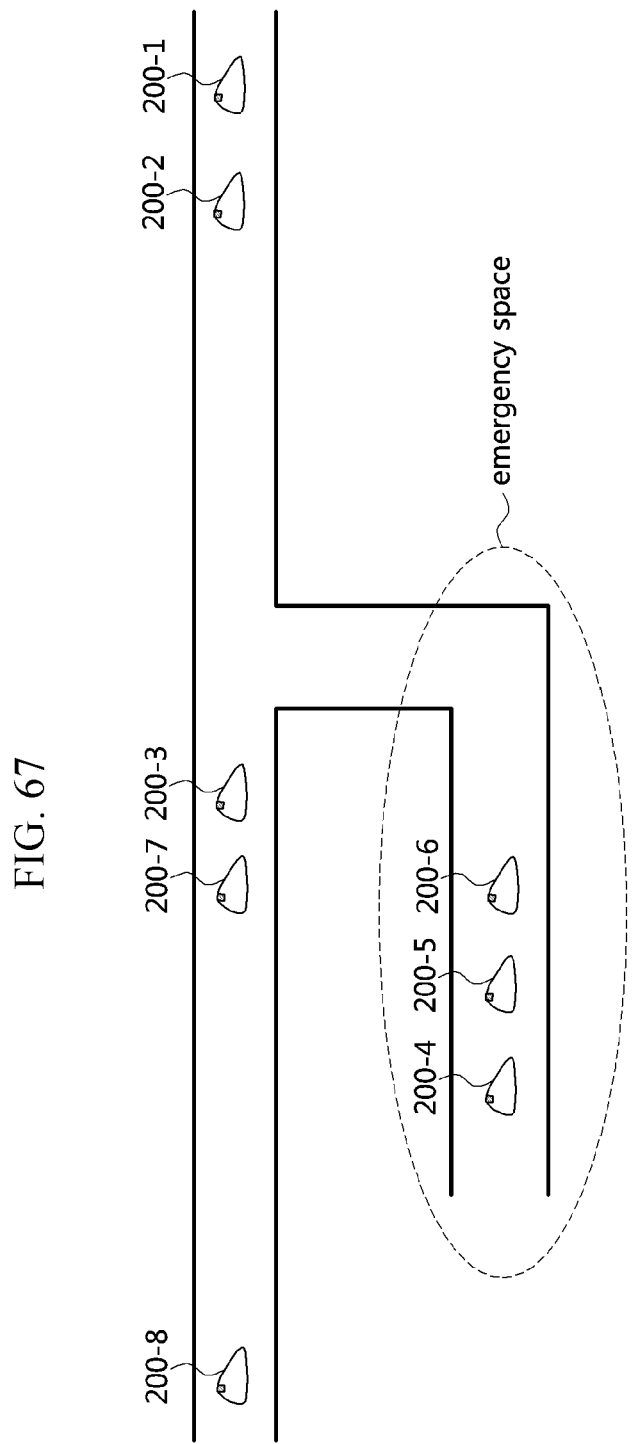
FIG. 67 is a conceptual diagram illustrating a first embodiment of a vehicle operation method when an emergency situation occurs.

FIG. 67 is a conceptual diagram illustrating a first embodiment of a vehicle operation method when an emergency situation occurs.

Referring to FIG. 67, when an emergency situation occurs during the operation of the vehicles 200-1, 200-2, 200-3, 200-4, 200-5, 200-6, 200-7, and 200-8, the vehicle 200-4, the vehicle 200-5, and the vehicle 200-6 may evacuate to an emergency space. In this case, the CRZ #3 of the vehicle 200-3 may be overlapped with the CRZ of the vehicle 200-7, and the vehicle 200-3 and the vehicle 200-7 uses the same frequency band (e.g., frequency band #2 in FIG. 66) so that interference may occur. In this case, the control region allocated to the vehicle 200-3 may be changed from the frequency band #2 to the frequency band #1 through an RRC signaling procedure. A message used for the RRC signaling procedure may include information requesting the change of the C-RNTI of the vehicle 200-3 (or, information indicating that the C-RNTI of the vehicle 200-3 is used for the frequency band #1), information indicating a time point (e.g., SF #9) at which the frequency band is changed, and the like. When the C-RNTIs are configured so as not to overlap in the entire frequency band, the C-RNTI may not be changed even when the control region is changed.

Meanwhile, the communication system 100 described above with reference to FIGS. 1 to 67 may be referred to as a 'distributed unit (DU) based communication system'. The DU-based communication system may support the following functions.

Function #1: Transmission and reception of control packets for controlling the operation of the vehicle 200
Function #2: Transmission and reception of service packets for the passenger of the vehicle 200
Function #3: Wireless communication function with a communication node (e.g., a sensor) installed in a movement path (e.g., hyperloop tube) of the vehicle 200
Function #4: Position measurement function based on radio communication The communication between the CCN of the DU-based communication system and the CCN inside the vehicle 200 may be performed, and the communication between the PSN of the DU-based communication system and the PSN inside the vehicle 200 may be performed. The DU-based communication system may also be connected to a communication node (e.g., a sensor) installed in the movement path (e.g., hyperloop tube) of the vehicle 200, may support control functions and data uploading functions for the corresponding communication node, and may measure the position of the vehicle 200 using the corresponding communication node. In the communication between the DU-based communication system and the vehicle 200, a sliding window for the vehicle 200 may be moved according to the moving speed of the vehicle 200, so that a pseudo-fixed cell environment may be created. In this case, the minimum movement unit of the sliding window may be a DU unit. The DU may comprise at least one LA2M 140 or at least one antenna. The LA2M 140 of the DU-based communication system and the CA2M of the vehicle 200 may be configured as follows.

Figure 68:
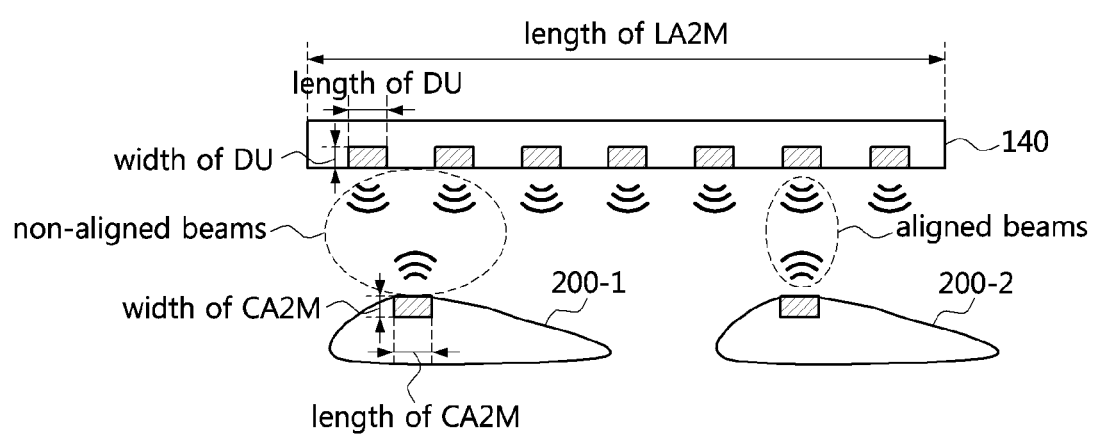
FIG. 68 is a conceptual diagram illustrating a first embodiment of an LA2M of a DU-based communication system and a CA2M of a vehicle.

FIG. 68 is a conceptual diagram illustrating a first embodiment of an LA2M of a DU-based communication system and a CA2M of a vehicle.

Referring to FIG. 68, when the LA2M 140 of the DU-based communication system and the CA2M of the vehicle 200 use a high frequency (e.g., millimeter wave), the LA2M 140 of the DU-based communication system may be composed of n×m elements, and the CA2M of the vehicle may be composed of p×q elements. Herein, each of n, m, p and q may be a positive integer. The LA2M 140 of the DU-based communication system and the CA2M of the vehicle 200 may be composed of small-sized antennas. When the LA2M 140 of the DU-based communication system is composed of a plurality of elements, the LA2M 140 may be referred to as AAC. Alternatively, when the LA2M 140 of the DU-based communication system supports only antenna functions, the LA2M 140 may be referred to as a remote radio head (RRH).

The LA2M 140 of the DU based communication system may include an entity supporting an analog RF switching function (e.g., P2M or M2P selection function), or an entity supporting an optical switching function (e.g., radio over fiber/Ethernet (RoF/E)). The RoF/E may be used as a wired interface between the LA2M 140 and the VA2C 130 in the DU based communication system. In the LA2M 140 of the DU based communication system, one port (e.g., a higher port) may be connected to the entire DU ports (e.g., lower ports), and the entire DU ports may be connected to one port, so that a soft combining function can be performed. Alternatively, in the LA2M 140 of the DU-based communication system, the ports may be connected in a point-to-multipoint (P2MP) scheme, and the DU ports may be designed to selectively perform a soft combining function. Alternatively, in the LA2M 140 of the DU-based communication system, the DU ports may be independently connected to the VA2C 130.

A beam width supported by the antenna of the DU-based communication system may be different from a beam width supported by the antenna of the vehicle 200. When the beam of the vehicle 200 is aligned with the beam of the DU-based communication system, a signal to interference plus noise ratio (SINR) may increase. When the beam of the vehicle 200 is misaligned with the beam of the DU-based communication system, the SINR may be reduced. However, even when the beam of the vehicle 200 is not aligned with the beam of the DU-based communication system, the SINR may increase if the contents are synchronized and the JT scheme is used.

Meanwhile, the VA2C 130 of the DU-based communication system may support a sliding window, may be connected to the upper entity TSU 120, and may be connected to at least one LA2M 140 which is the lower entity. Thus, the VA2C 130 may transmit a signal received from the TSU 120 to the LA2M 140 based on the P2MP scheme. Also, the VA2C 130 may perform soft combining on the signals received from the LA2M 140 based on the MP2P scheme, and may transmit the signal received from the LA2M 140 to the TSU 120. The TSU 120 may be connected to the VA2C 130 through optical fibers, and the VA2C 130 may be connected to the LA2M 140 through optical fibers. In this case, signal loss may occur depending on the length of the optical fiber, and optical repeaters may be used to prevent the signal loss.

The TSU 120 of the DU-based communication system may perform the base station functions of the cellular communication system. The TSU 120 may be connected to the CCU 110 which is the upper entity, and may be connected to at least one VA2C 130 which is the lower entity. The TSU 120 may support a PHY function, a MAC function, a synchronization function, and the like. The MAC layer of the TSU 120 may support a slave MAC function and process MAC related data. The synchronization layer of the TSU 120 may perform the transmission and reception function of the probe request/response packets to measure the time delay of the lower entity. In addition, the synchronization layer and the MAC layer of the TSU 120 may generate a MAC frame based on a downlink data packet, acquire a MAC frame from an uplink PHY packet, and generate an uplink synchronization packet based on the acquired MAC frame. In this case, the synchronization of the downlink contents may be performed based on the synchronization protocol, and the uplink contents may be selected.

The CCU 110 of the DU-based communication system may perform the EPC functions of the cellular communication system, and may support an RRC function, an RLC function, a PDCP function, a synchronization function, a non-access stratum (NAS) function, and the like. The RRC layer of the CCU 110 may support a radio resource control function, and the RLC layer of the CCU 110 may support a data unit segmentation/assembly function, an automatic repeat request (ARQ) function, a redundancy detection function, and the like. The PDCP layer of the CCU 110 may support an IP header compression function, an encryption function, and an integrity protection function. The synchronization layer of the CCU 110 may support the transmission and reception function of the probe request/response packets for measuring the delay of the lower entity, and may support a master MAC function based on semi-static scheduling of the RRC layer.

The synchronization layer of the CCU 110 may transmit a downlink data packet to the TSU 120 considering the operation of the MAC layer of the TSU 120. The synchronization layer of the CCU 110 may select valid uplink data packets from among uplink data packets received from the TSU 120, and may discard invalid valid uplink data packets. The synchronization layer of the CCU 110 may perform a downlink content synchronization function, an uplink content selection function, and the like based on a predefined synchronization protocol. The CCU 110 may perform a matching function between the CCN and the PSN connected to the DU-based communication system. When an emergency occurs, the communication function for the passengers of the vehicle 200 may be supported by the CCN of the DU-based communication system and the CCN of the vehicle 200.

The CE of the vehicle 200 may perform the UE functions of the cellular communication system, and may perform a PHY function, a MAC function, an RLC function, a PDCP function, and the like. In addition, the CE of the vehicle 200 may perform a matching function between the CCN and the PSN connected to the vehicle 200.

On the other hand, in the communication system 100, an LCX may be used instead of the DU, and a communication system using the LCX may be referred to as an 'LCX-based communication system'. The LCX-based communication system may be configured as follows.

Figure 69:
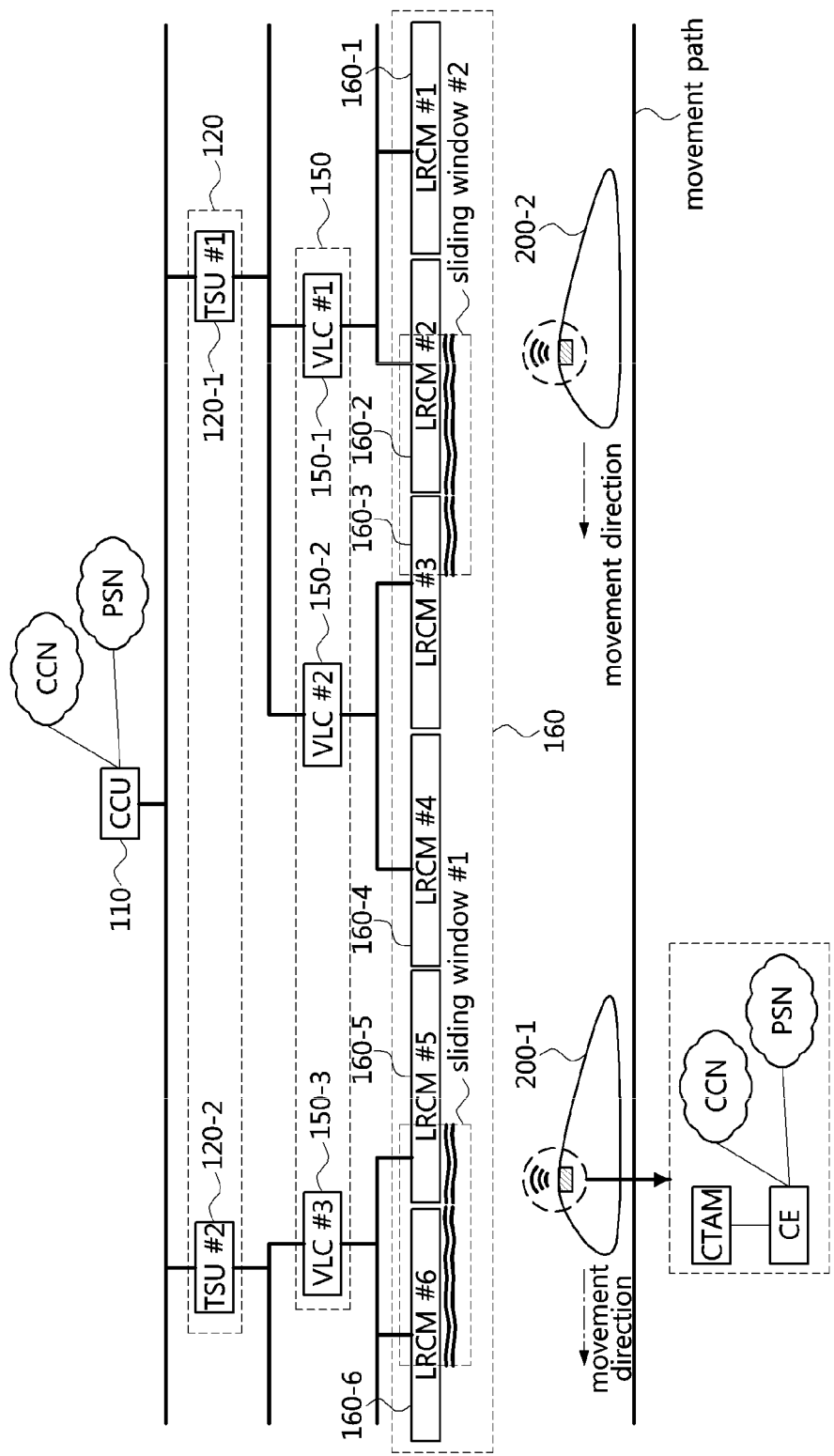
FIG. 69 is a conceptual diagram illustrating a first embodiment of an LCX-based communication system.

FIG. 69 is a conceptual diagram illustrating a first embodiment of an LCX-based communication system.

Referring to FIG. 69, an LCX-based communication system may include the CCU 110, the TSU 120, a virtual linear radiating cable module (LRCM) controller (VLC) 150, an LRCM 160, and the like. The CCU 110 may be connected to the CCN and the PSN, and may be connected to the TSU 120, which is the lower entity. In the LCX-based communication system, the function of the CCU 110 may be the same as or similar to the function of the CCU 110 in the communication system 100 (e.g., DU-based communication system) described above. The TSU 120 may be connected to the CCU 110, which is the upper entity, and may be connected to the VLC 150, which is the lower entity. The functionality of the TSU 120 in the LCX-based communication system may be the same as or similar to that of the TSU 120 in the communication system 100 (e.g., DU-based communication system) described above.

The VLC 150 may be connected to the upper entity TSU 120 and to the lower entity LRCM 160. The functionality of the VLC 150 in the LCX-based communication system may be the same as or similar to the functionality of the VA2C 130 in the communication system 100 (e.g., DU based communication system) described above. The LRCM 160 may be connected to the upper entity VLC 150 and may include a radiating cable (RC) (e.g., a radiating cable segment (RCS)). Communication between the LCX-based communication system and the vehicles 200-1 and 200-2 may be performed through the LRCM. The functionality of the LRCM 160 in the LCX-based communication system may be the same as or similar to the functionality of the LA2M 140 in the communication system 100 (e.g., DU based communication system) described above.

The vehicles 200-1 and 200-2 may include a capsule TRX antenna module (CTAM), a CE, and the like, and the CE may be connected to the CCN and the PSN. A sliding window for the vehicles 200-1 and 200-2 may be configured, and communication between the vehicles 200-1 and 200-2 and the LCX based communication system may be performed within the sliding window.

The LCX-based communication system may support the following functions.

Function #1: Transmission and reception of control packets for controlling the operation of the vehicle 200

Function #2: Transmission and reception of service packets for the passenger of the vehicle 200

Function #3: Position measurement function based on radio communication

The communication between the CCN of the LCX-based communication system and the CCNs inside the vehicles 200-1 and 200-2 may be performed, and the communication between the PSN of the LCX-based communication system and the PSNs inside the vehicles 200-1 and 200-2 may be performed. The LCX-based communication system may also be connected to a communication node (e.g., a sensor) installed in the movement path (e.g., hyperloop tube) of the vehicle 200, may support control functions and data uploading functions for the corresponding communication node, and may measure the position of the vehicle 200 using the corresponding communication node. In the communication between the LCX-based communication system and the vehicle 200, a sliding window for the vehicle 200 may be moved according to the moving speed of the vehicle 200, so that a pseudo-fixed cell environment may be created. In this case, the minimum movement unit of the sliding window may be a LRCM unit.

In the LCX-based communication system, the LRCM 160 may be configured as follows.

Figure 70:
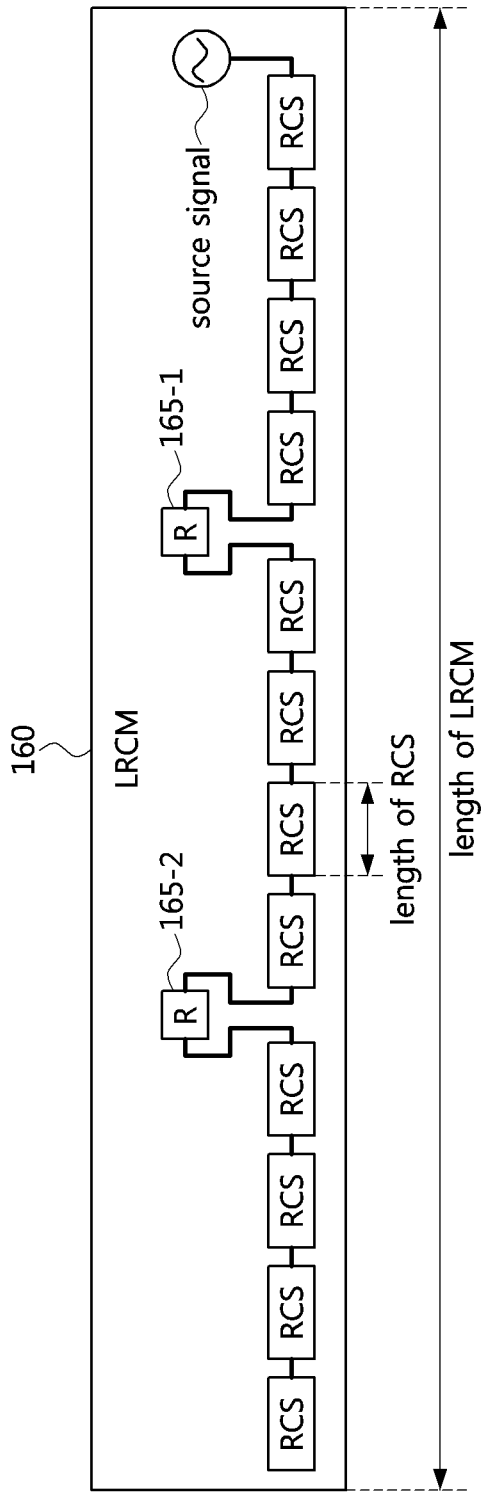
FIG. 70 is a conceptual diagram illustrating an LRCM structure in an LCX-based communication system.

FIG. 70 is a conceptual diagram illustrating an LRCM structure in an LCX-based communication system.

Referring to FIG. 70, the LRCM 160 may comprise a plurality of RCSs having a predefined length (e.g., 150 m), and signals (e.g., source signal) received from the VLC 150 may be transmitted to the plurality of RCSs. The length of the LRCM 160 may be 1.8 km. Since the signal loss increases as the RCS length increases, the signals may be amplified by analog repeaters 165-1 and 165-2. The RCSs may be connected to the ports of the LRCM 160 through optical fibers instead of the analog repeaters 165-1 and 165-2. The LRCM 160 may be connected to the VLC 150 through RoF/E.

Meanwhile, a radiation angle of the RCS may be determined according to arrangement of slots. The radiation angle according to the arrangement of the slots may be as follows.

Figure 71:
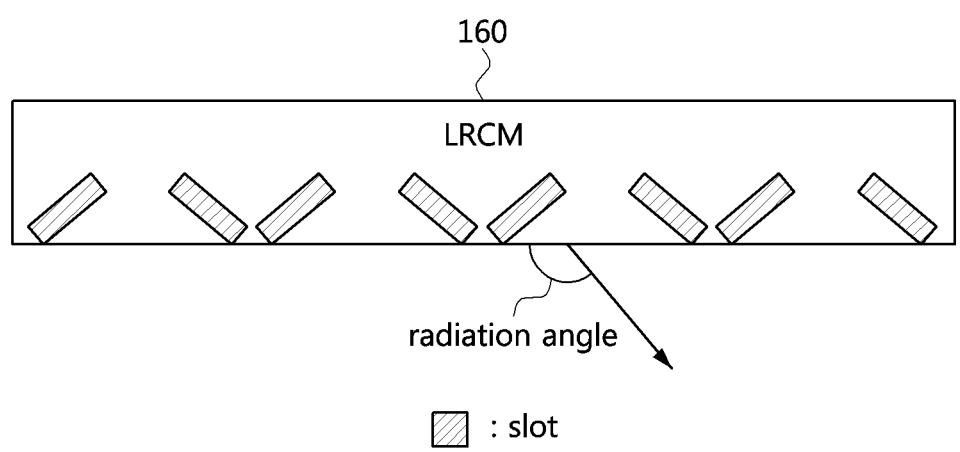
FIG. 71 is a conceptual diagram illustrating a first embodiment of a radiation angle according to an arrangement of slots.

FIG. 71 is a conceptual diagram illustrating a first embodiment of a radiation angle according to an arrangement of slots.

Referring to FIG. 71, a plurality of slots may be located in the LRCM 160, and a radiation angle may be determined according to the arrangement of the plurality of slots.

Referring again to FIG. 69, the VLC 150 of the LCX-based communication system may control and manage the sliding window. The VLC 150 may be connected to the upper entity TSU 120 through optical fibers, and may be connected to the lower entity LRCM 160 through optical fibers. In this case, signal loss may occur depending on the length of the optical fiber, and optical repeaters may be used to prevent the signal loss. The VLC 150 may transmit signals received from the TSU 120 to at least one LRCM 160 based on the P2MP scheme. The VLC 150 may perform soft combining on the signals received by the LRCMs 160 based on the MP2P scheme, and may transmit the signal to the TSU 120.

The TSU 120 of the LCX-based communication system may perform the base station functions of the cellular communication system. The TSU 120 may be connected to the CCU 110 which is the upper entity, and may be connected to the VLC 150 which is the lower entity. The TSU 120 may support a PHY function, a MAC function, a synchronization function, and the like. The MAC layer of the TSU 120 may support a slave MAC function and process MAC related data. The synchronization layer of the TSU 120 may perform the transmission and reception function of the probe request/response packets to measure the time delay of the lower entity. In addition, the synchronization layer and the MAC layer of the TSU 120 may generate a MAC frame based on a downlink data packet, acquire a MAC frame from an uplink PHY packet, and generate an uplink synchronization packet based on the acquired MAC frame. In this case, the synchronization of the downlink contents may be performed based on the synchronization protocol, and the uplink contents may be selected.

The CCU 110 of the LCX-based communication system may perform the EPC functions of the cellular communication system, and may support an RRC function, an RLC function, a PDCP function, a synchronization function, a NAS function, and the like. The RRC layer of the CCU 110 may support a radio resource control function, and the RLC layer of the CCU 110 may support a data unit segmentation/assembly function, an automatic repeat request (ARQ) function, a redundancy detection function, and the like. The PDCP layer of the CCU 110 may support an IP header compression function, an encryption function, and an integrity protection function. The synchronization layer of the CCU 110 may support the transmission and reception function of the probe request/response packets for measuring the delay of the lower entity, and may support a master MAC function based on semi-static scheduling of the RRC layer.

The synchronization layer of the CCU 110 may transmit a downlink data packet to the TSU 120 considering the operation of the MAC layer of the TSU 120. The synchronization layer of the CCU 110 may select valid uplink data packets from among uplink data packets received from the TSU 120, and may discard invalid valid uplink data packets. The synchronization layer of the CCU 110 may perform a downlink content synchronization function, an uplink content selection function, and the like based on a predefined synchronization protocol. The CCU 110 may perform a matching function between the CCN and the PSN connected to the LCX-based communication system. When an emergency occurs, the communication function for the passengers of the vehicle 200 may be supported by the CCN of the LCX-based communication system and the CCN of the vehicle 200.

The CTAMs of the vehicles 200-1 and 200-2 may be antennas communicating with the LRCM 160 of the LCX-based communication system. The CEs of the vehicles 200-1 and 200-2 may perform the UE functions of the cellular communication system, and may perform a PHY function, a MAC function, an RLC function, a PDCP function, and the like. In addition, the CE of the vehicle 200 may perform a matching function between the CCN and the PSN connected to the vehicle 200.

Meanwhile, in the communication system 100, the DU-based communication system and the LCX-based communication system described above, communication methods may be performed as follows.

Figure 72:
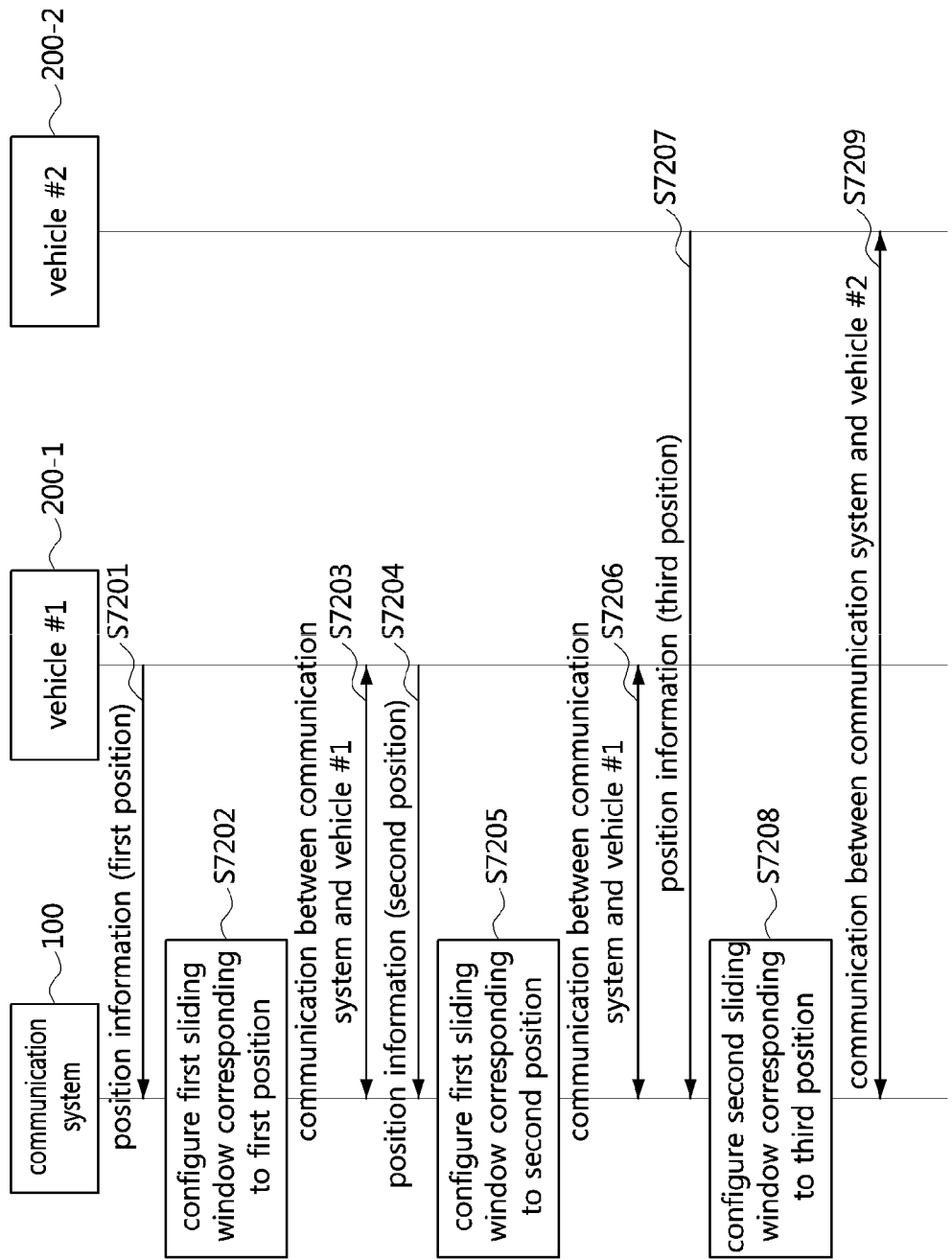
FIG. 72 is a sequence chart illustrating a first embodiment of a communication method between a communication system and a vehicle.
Figure 73:
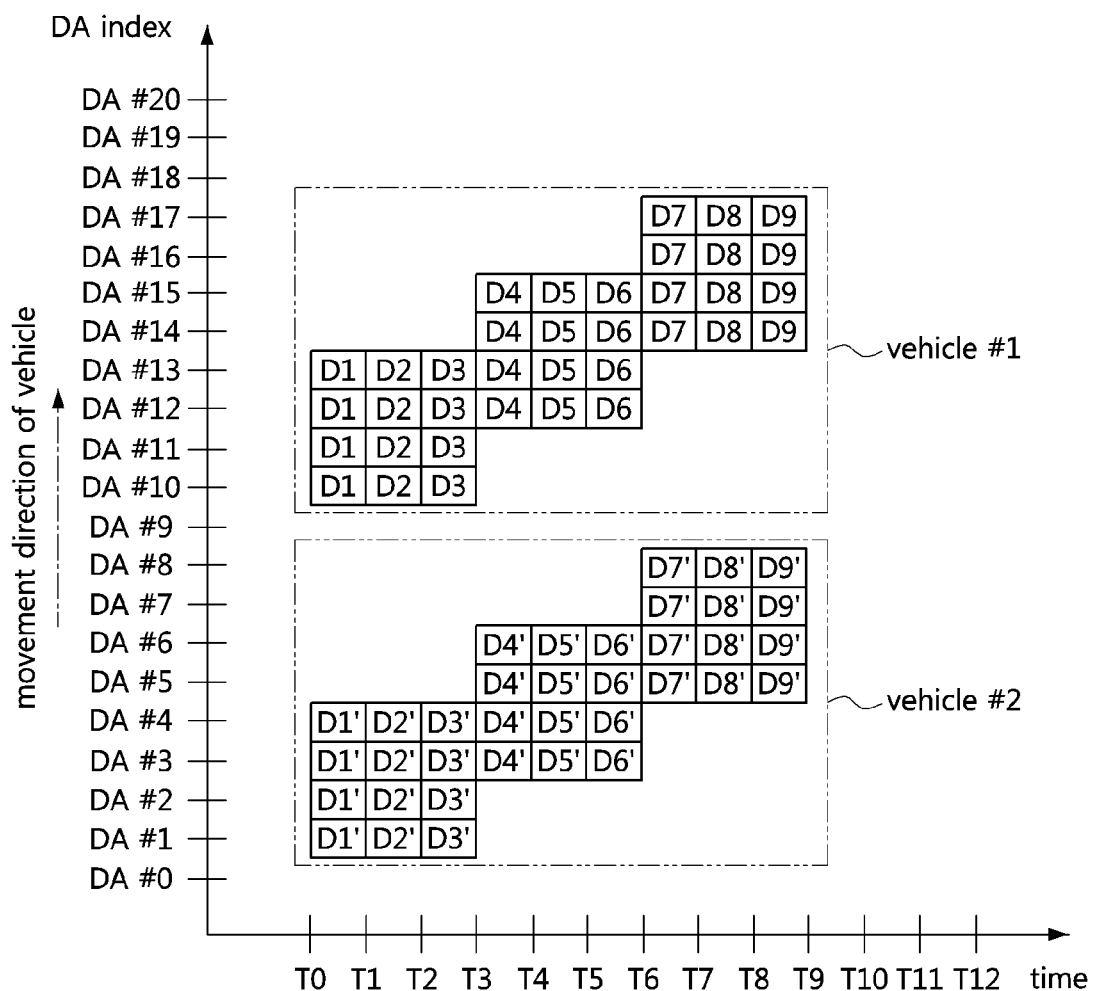
FIG. 73 is a conceptual diagram illustrating a sliding window configured according to the communication method illustrated in FIG. 72.

FIG. 72 is a sequence chart illustrating a first embodiment of a communication method between a communication system and a vehicle, and FIG. 73 is a conceptual diagram illustrating a sliding window configured according to the communication method illustrated in FIG. 72.

Referring to FIGS. 72 and 73, the communication system 100 (e.g., ground communication apparatus) may be the communication system shown in FIG. 1 or FIG. 50. For example, the communication system 100 may comprise the CCU 110, the TSU 120, the VA2C 130, the LA2M 140, and the like, and each of the CCU 110, the TSU 120, the VA2C 130 and the LA2M 140 may be configured to be the same as or similar to the CCU, TSU, VA2C and LA2M shown in FIG. 14. Also, the communication system 100 may be the DU-based communication system or the LCX-based communication system (e.g., the LCX-based communication system shown in FIG. 69). The vehicle 200-1 may be configured to be the same as or similar to the vehicle 200-1 shown in FIG. 50, and the vehicle 200-2 may be configured to be the same as or similar to the vehicle 200-2 shown in FIG. 50. For example, the vehicles 200-1 and 200-2 may include an antenna, a CE, and the like. Alternatively, the vehicle 200-1 may be configured to be the same as or similar to the vehicle 200-1 in FIG. 69, and the vehicle 200-2 may be configured to be the same as or similar to the vehicle 200-2 in FIG. 69. In this case, the vehicles 200-1 and 200-2 may include a CTAM, a CE, and the like.

The vehicle 200-1 may measure its own position and transmit to the communication system 100 position information indicating the position (e.g., a first position) of the vehicle 200-1 (S7201). For example, the vehicle 200-1 may inform the communication system 100 of the first position measured at TO. The position of the vehicle 200-1 may be measured based on the position measurement method described with reference to FIGS. 56 to 60. Alternatively, the position information of the vehicle 200-1 may be obtained from a GPS. The communication system 100 may obtain the position information from the vehicle 200-1. Alternatively, the communication system 100 may measure the position of the vehicle 200-1 based on the position measurement method described with reference to FIG. 61. The position of the vehicle 200-1 may be periodically measured, and the position information of the vehicle 200-1 may be periodically transmitted to the communication system 100.

The communication system 100 may configure a first sliding window based on the position information of the vehicle 200-1 (S7202). The first sliding window may include n DAs (e.g., antennas, RCSs) installed in a region corresponding to the position of the vehicle 200-1. Here, n may be an integer of 2 or more. For example, when n is 4 and the first position of the vehicle 200-1 corresponds to a position where a DA #10 is disposed, the first sliding window configured according to the first position of the vehicle 200-1 may include DAs #10 to #13. In addition, the communication system 100 may configure the first sliding window in consideration of the good window, the dead window, and the interference window described with reference to FIGS. 47 to 49.

After the configuration of the sliding window is completed, communication between the communication system 100 and the vehicle 200-1 may be performed (S7203). For example, the communication system 100 may transmit downlink signals (e.g., D1, D2, D3) to the vehicle 200-1 through the DA #10 to #13 belonging to the first sliding window, and the vehicle 200-1 may receive the downlink signals (e.g., D1, D2, D3) from the communication system 100. Resources used for the downlink communication between the communication system 100 and the vehicle 200-1 may be the downlink resources shown in FIGS. 15 to 19 and FIG. 27. When the downlink communication is performed, the communication system 100 may transmit semi-static scheduling information through a control region and may transmit data through a data region indicated by the semi-static scheduling information. The vehicle 200-1 may receive the semi-static scheduling information from the communication system 100, and may receive the data through the data region indicated by the semi-static scheduling information. When the downlink communication is performed based on the RLC AM, the downlink retransmission procedure described with reference to FIG. 29 may be performed. In this case, a C-RNTI for initial downlink transmission, a C-RNTI for transmission of RLC status messages, and a C-RNTI for downlink retransmission may be independently configured.

Also, the vehicle 200-1 may transmit uplink signals (e.g., D1, D2, D3) to the communication system 100, and the communication system 100 may receive the uplink signals (e.g., D1, D2, D3) from the vehicle 200-1 through the DAs #10 to #13 belonging to the first sliding window. Resources used for the uplink communication between the communication system 100 and the vehicle 200-1 may be the uplink resources shown in FIGS. 22 to 25 and FIG. 28. When the uplink communication is performed, the communication system 100 may transmit semi-static scheduling information through a control region. The vehicle 200-1 may receive the semi-static scheduling information from the communication system 100, and may transmit data through a data region indicated by the semi-static scheduling information. The communication system 100 may receive the data through the data region indicated by the semi-static scheduling information. When the uplink communication is performed based on the RLC AM, the uplink retransmission procedure described with reference to FIG. 30 may be performed. In this case, a C-RNTI for initial uplink transmission, a C-RNTI for transmission of RLC status messages, and a C-RNTI for uplink retransmission may be independently configured.

Before the communication between the communication system 100 and the vehicle 200-1 is performed, the communication nodes 110, 120, 130, and 140 included in the communication system 100 may be synchronized with each other based on the delay probe procedure described with reference to FIGS. 33 to 40. For example, the synchronization procedures may be performed by exchanging probe request packets and probe response packets among the communication nodes 110, 120, 130, and 140. That is, the synchronization among the DAs #10 to #13 belonging to the first sliding window may be maintained by the CCU 110 included in the communication system 100. When the synchronization procedures are completed, the DAs #10 to #13 belonging to the first sliding window may transmit the same signals at the same time. Alternatively, when the synchronization procedures are completed, a time offset between reception time points of the signals received through the DAs #10 to #13 belonging to the first sliding window may be within a predefined range (e.g., a cyclic prefix (CP)).

Also, RBs (e.g., SRB and DRB) may be configured for the communication between the communication system 100 and the vehicle 200-1. For example, SRB #1, DRB #1, DRB #2, DRB #3, DRB #4 and DRB #5 shown in FIG. 55 may be configured for the communication between the communication system 100 and the vehicle 200-1, and the step S7203 may be performed using SRB #1, DRB #1, DRB #2, DRB #3, DRB #4 and DRB #5.

Meanwhile, when the position of the vehicle is periodically measured, the vehicle 200-1 may measure its own position at T3, and may transmit to the communication system 100 position information indicating the position (e.g., a second position) of the vehicle 200-1 (S7204). The communication system 100 may obtain the position information from the vehicle 200-1.

The communication system 100 may reconfigure the first sliding window based on the position information of the vehicle 200-1 (S7205). The first sliding window may include m DAs (e.g., antennas, RCSs) installed in a region corresponding to the position of the vehicle 200-1. Here, m may be an integer of 2 or more. For example, when m is 4 and the second position of the vehicle 200-1 corresponds to a position where the DA #12 is disposed, the first sliding window reconfigured according to the second position of the vehicle 200-1 may include DAs #12 to #15. One or more DAs among m DAs included in the first sliding window reconfigured in the step S7205 may be equal to one or more DA among n DAs included in the first sliding window configured in the step S7202.

After the reconfiguration of the sliding window is completed, communication between the communication system 100 and the vehicle 200-1 may be performed (S7206). For example, the communication system 100 may transmit downlink signals (e.g., D4, D5, D6) to the vehicle 200-1 through the DAs #12 to #15 belonging to the first sliding window, and the vehicle 200-1 may receive the downlink signals (e.g., D4, D5, D6) from the communication system 100. The synchronization among the DAs #12 to #15 belonging to the first sliding window may be maintained by the CCU 110 included in the communication system 100. Therefore, the DAs #12 to #15 belonging to the first sliding window may transmit the same signals at the same time. Alternatively, a time offset between reception time points of the signals received from the DAs #12 to #15 belonging to the first sliding window may be within a predefined range. Also, the vehicle 200-1 may transmit uplink signals (e.g., D4, D5, D6) to the communication system 100, and the communication system 100 may receive the uplink signals (e.g., D4, D5, D6) from the vehicle 200-1 through the DAs #12 to #15 belonging to the first sliding window.

Meanwhile, the communication system 100 may perform communication with not only the vehicle 200-1 but also other vehicles (e.g., vehicle 200-2). In this case, the vehicle 200-2 may transmit position information indicating its own position (e.g., a third position) to the communication system 100 (S7207). The communication system 100 may obtain the position information from the vehicle 200-2.

The communication system 100 may configure a first sliding window based on the position information of the vehicle 200-2 (S7208). The second sliding window may include k DAs (e.g., antennas, RCSs) installed in a region corresponding to the position of the vehicle 200-2. Here, k may be an integer of 2 or more. For example, when k is 4 and the third position of the vehicle 200-2 corresponds to a position where the DA #10 is disposed, the second sliding window configured according to the third position of the vehicle 200-2 may include DAs #1 to #4. The k DAs included in the second sliding window configured in the step S7208 may not be overlapped with the n DAs included in the first sliding window configured in the step S7202 or the m DAs included in the first sliding window configured in the step S7205.

After the configuration of the sliding window is completed, communication between the communication system 100 and the vehicle 200-2 may be performed (S7209). For example, the communication system 100 may transmit downlink signals (e.g., D1', D2', D3') to the vehicle 200-2 through the DAs #1 to #4 belonging to the second sliding window, and the vehicle 200-2 may receive the downlink signals (e.g., D1', D2', D3') from the communication system 100. The synchronization among the DAs #1 to #4 belonging to the second sliding window may be maintained by the CCU 110 included in the communication system 100. Therefore, the DAs #1 to #4 belonging to the second sliding window may transmit the same signals at the same time. Alternatively, a time offset between reception time points of the signals received from the DAs #1 to #4 belonging to the second sliding window may be within a predefined range. Also, the vehicle 200-2 may transmit uplink signals (e.g., D1', D2', D3') to the communication system 100, and the communication system 100 may receive the uplink signals (e.g., D1', D2', D3') from the vehicle 200-2 through the DAs #1 to #4 belonging to the second sliding window.

When the position of the vehicle 200-2 is changed, the communication between the communication system 100 and the vehicle 200-2 may be performed the reconfigured second sliding window, as in the embodiment according to the above-described steps S7204 to S7206. For example, when the position of the vehicle 200-2 is changed from the third position corresponding to the DA #1 to a fourth position corresponding to the DA #3, the second sliding window may be reconfigured to include the DAs #3 to #6, and the communication between the communication system 100 and the vehicle 200-2 may be performed using the DAs #3 to #6 included in the second sliding window. Also, the embodiment according to steps S7207 to S7209 may be performed simultaneously with the embodiment according to steps S7201 to S7203 or the embodiment according to steps S7204 to S7206.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A communication apparatus performing communication with a first mobile apparatus, the communication apparatus comprising a processor performing a radio resource control function for the communication between the communication apparatus and the first mobile apparatus, a plurality of distributed antennas (DAs) located along a movement path of the first mobile apparatus, which transmit and receive signals under control of the processor, and a memory storing at least one instruction executed by the processor, wherein the at least one instruction is configured to:

configure a first sliding window comprising n DAs corresponding to a first position of the first mobile apparatus among the plurality of DAs;

perform communication with the first mobile apparatus located at the first position using the n DAs;

reconfigure the first sliding window to include m DAs corresponding to a second position among the plurality of DAs, when the first mobile apparatus moves from the first position to the second position;

perform communication with the first mobile apparatus located at the second position using the m DAs;

configure a second sliding window comprising k DAs corresponding to a third position of a second mobile apparatus moving along the movement path among the plurality of DAs; and perform communication with the second mobile apparatus located at the third position by using the k DAs, wherein one or more DAs among the n DAs are identical to one or more DAs among the m DAs, each of n, m, and k is an integer equal to or greater than 2, the first position, the second position, and the third position belong to the movement path, and the k DAs are not overlapped with the n DAs or the m DAs.

2. The communication apparatus according to claim 1, wherein, when the communication with the first mobile apparatus located at the first position is performed, the n DAs transmit and receive a same signal using a same radio resource.

3. The communication apparatus according to claim 1, wherein, when the communication with the first mobile apparatus located at the second position is performed, the m DAs transmit and receive a same signal using a same radio resource.

4. The communication apparatus according to claim 1, wherein a position of the first mobile apparatus is estimated based on a signal received from the first mobile apparatus.

5. The communication apparatus according to claim 1, wherein a plurality of radio bearers (RBs) are configured for the communication between the communication apparatus and the first mobile apparatus, and a cell-radio network temporary identifier (C-RNTI) for each of the RBs is configured independently.

6. The communication apparatus according to claim 1, wherein a dedicated cell formed by the second sliding window is different from a dedicated cell formed by the first sliding window.

7. The communication apparatus according to claim 1, wherein the communication using the k DAs is performed simultaneously with the communication using the n DAs or the communication using the m DAs.

8. A communication method performed by a mobile apparatus moving along a movement path, the communication method comprising:

when the mobile apparatus is located at a first position in the movement path, performing communication with a communication apparatus including a plurality of distributed antennas (DAs) through a sliding window comprising n DAs corresponding to the first position among the plurality of DAs located along the movement path; and when the mobile apparatus moves from the first position to a second position in the movement path, performing communication with the communication apparatus through the sliding window comprising m DAs corresponding to the second position among the plurality of DAs located along the movement path, wherein one or more DAs among the n DAs are identical to one or more DAs among the m DAs, each of n and m is an integer equal to or greater than 2, and a dedicated cell formed by the sliding window configured for the mobile apparatus located at the first position is identical to a dedicated cell formed by the sliding window configured for the mobile apparatus located at the second position.

9. The communication method according to claim 8, wherein, in the communication between the mobile apparatus located at the first position and the n DAs, a same signal is received from the n DAs by using a same radio resource.

10. The communication method according to claim 8, wherein, in the communication between the mobile apparatus located at the second position and the m DAs, a same signal is received from the m DAs by using a same radio resource.

11. The communication method according to claim 8, wherein information used for estimating a position of the mobile apparatus is transmitted from the mobile apparatus to the communication apparatus, and the first position and the second position are estimated based on the information by the communication apparatus.

12. The communication apparatus according to claim 1, wherein synchronization of downlink signals which are transmitted through the n DAs or the m DAs belonging to the first sliding window is maintained by the processor.

* * * * *